(12) United States Patent
Horai et al.

(10) Patent No.: US 11,724,652 B2
(45) Date of Patent: Aug. 15, 2023

(54) PROTECTION MECHANISM FOR WORKING VEHICLE, AND WORKING VEHICLE INCLUDING THE SAME

(71) Applicant: KUBOTA CORPORATION, Osaka (JP)

(72) Inventors: Satoru Horai, Sakai (JP); Takuya Nishikubo, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/547,417

(22) Filed: Dec. 10, 2021

(65) Prior Publication Data

US 2022/0097626 A1  Mar. 31, 2022

Related U.S. Application Data

(63) Continuation of application No. PCT/JP2020/004280, filed on Feb. 5, 2020.

(30) Foreign Application Priority Data

Jun. 11, 2019  (JP) .................................. 2019-109107

(51) Int. Cl.
*B60R 11/04*  (2006.01)
*B62D 25/04*  (2006.01)
(Continued)

(52) U.S. Cl.
CPC .............. *B60R 11/04* (2013.01); *B62D 25/04* (2013.01); *A01B 59/042* (2013.01); *B60J 5/0487* (2013.01);
(Continued)

(58) Field of Classification Search
CPC .... B62D 25/04; B62D 33/0617; B62D 33/06; B62D 33/073; B60R 11/04;
(Continued)

(56) References Cited

U.S. PATENT DOCUMENTS

2019/0317521 A1  10/2019  Nishi et al.

FOREIGN PATENT DOCUMENTS

DE  202004014778 U1 *  3/2006  ............... B60R 1/12
EP  3 666 977 A1  6/2020
(Continued)

OTHER PUBLICATIONS

Official Communication issued in International Patent Application No. PCT/JP2020/004280, dated Mar. 17, 2020.
(Continued)

*Primary Examiner* — Dennis H Pedder
(74) *Attorney, Agent, or Firm* — Keating and Bennett, LLP

(57) ABSTRACT

A protection mechanism for a working vehicle includes a roof provided above an operator's seat, a pillar extending upward from a vehicle body and supporting the roof, a camera with a predetermined viewing direction, and a support stay which is connected to the pillar, orients the predetermined viewing direction of the camera sideways, and supports the camera below a peripheral portion of the roof. The protection mechanism includes a front pillar supporting a front portion of the roof and a rear pillar supporting a rear portion of the roof. The support stay is connected to the rear pillar.

20 Claims, 32 Drawing Sheets

(51) Int. Cl.
*A01B 59/042* (2006.01)
*B60J 5/04* (2006.01)
*B60R 11/00* (2006.01)
*B62D 25/06* (2006.01)
*B62D 49/06* (2006.01)

(52) U.S. Cl.
CPC ... *B60R 2011/004* (2013.01); *B60R 2011/005* (2013.01); *B62D 25/06* (2013.01); *B62D 49/06* (2013.01)

(58) Field of Classification Search
CPC ....... B60R 2011/0085; B60R 2011/004; B60R 2011/005
USPC .............................. 296/190.01, 190.08, 1.07
See application file for complete search history.

(56) References Cited

FOREIGN PATENT DOCUMENTS

| | | | |
|---|---|---|---|
| JP | H0280040 U | * | 6/1990 |
| JP | H07367 Y2 | * | 11/1995 |
| JP | 2005-238904 A | | 9/2005 |
| JP | 2018-114925 A | | 7/2018 |
| JP | WO2019/031318 A1 | | 9/2020 |
| WO | WO-2018189342 A1 | * | 10/2018 |

OTHER PUBLICATIONS

"What is the unmanned agricultural robot that appears in "Downtown Rocket"?", Motor Fan illustrated editorial department, https:motorfan.jp/tech/10004630, Nov. 24, 2018, 9 pages.

* cited by examiner

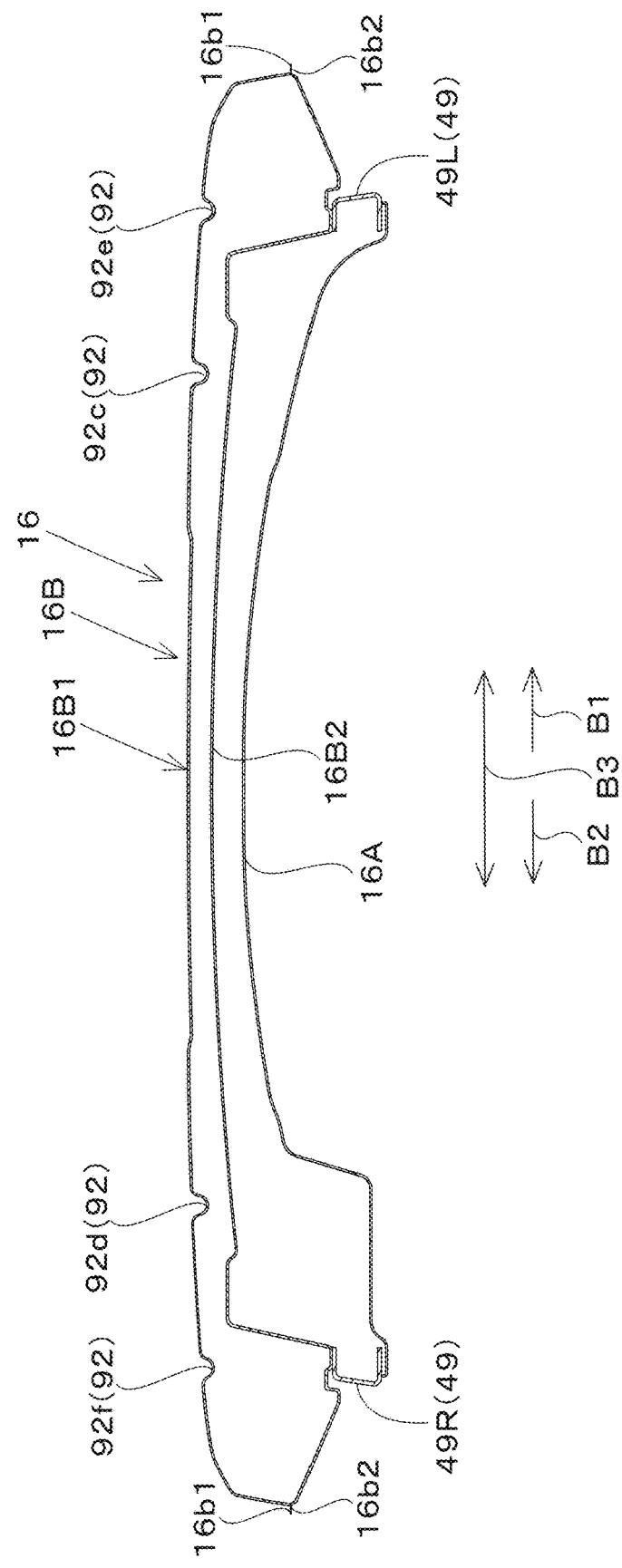

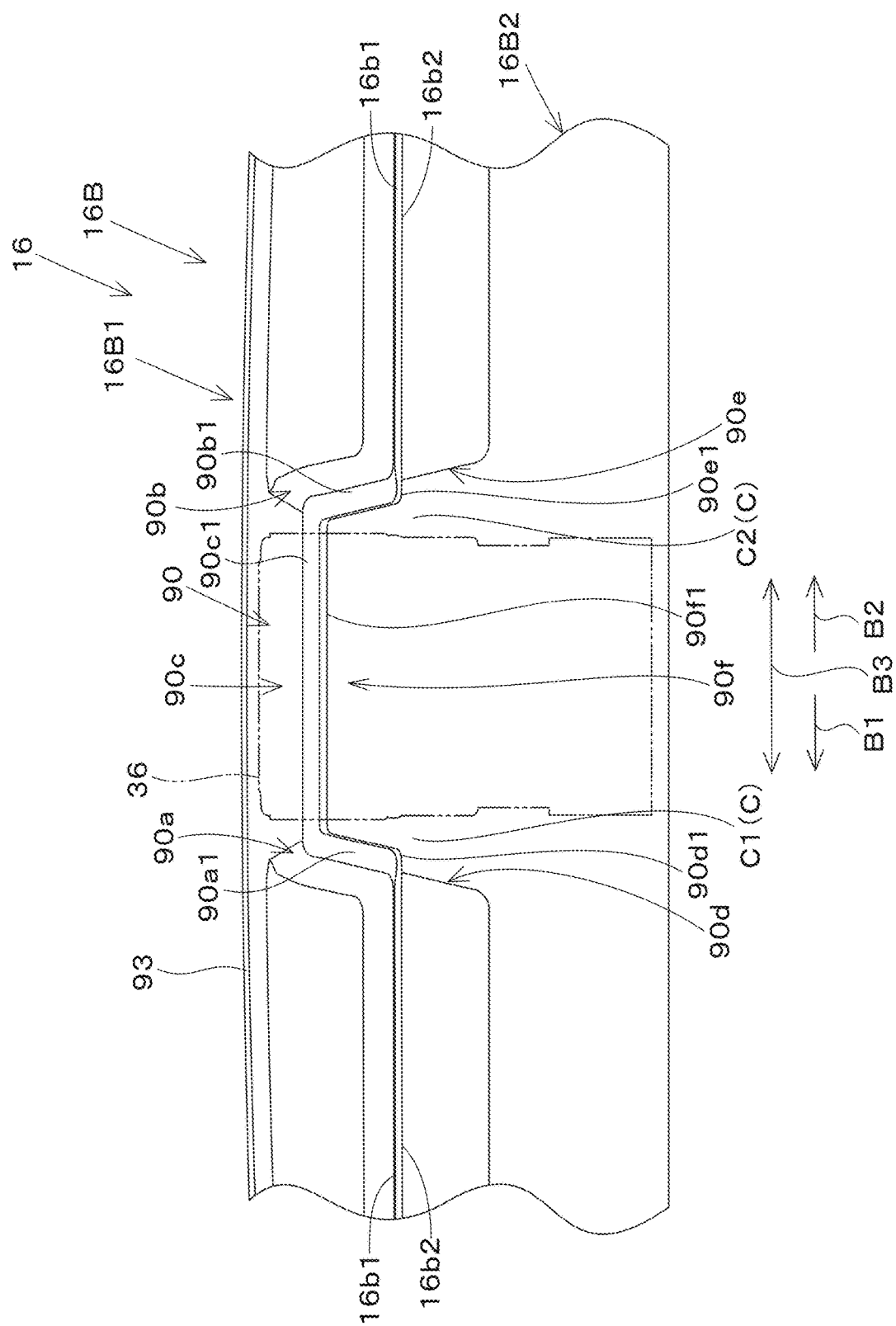

Fig.13
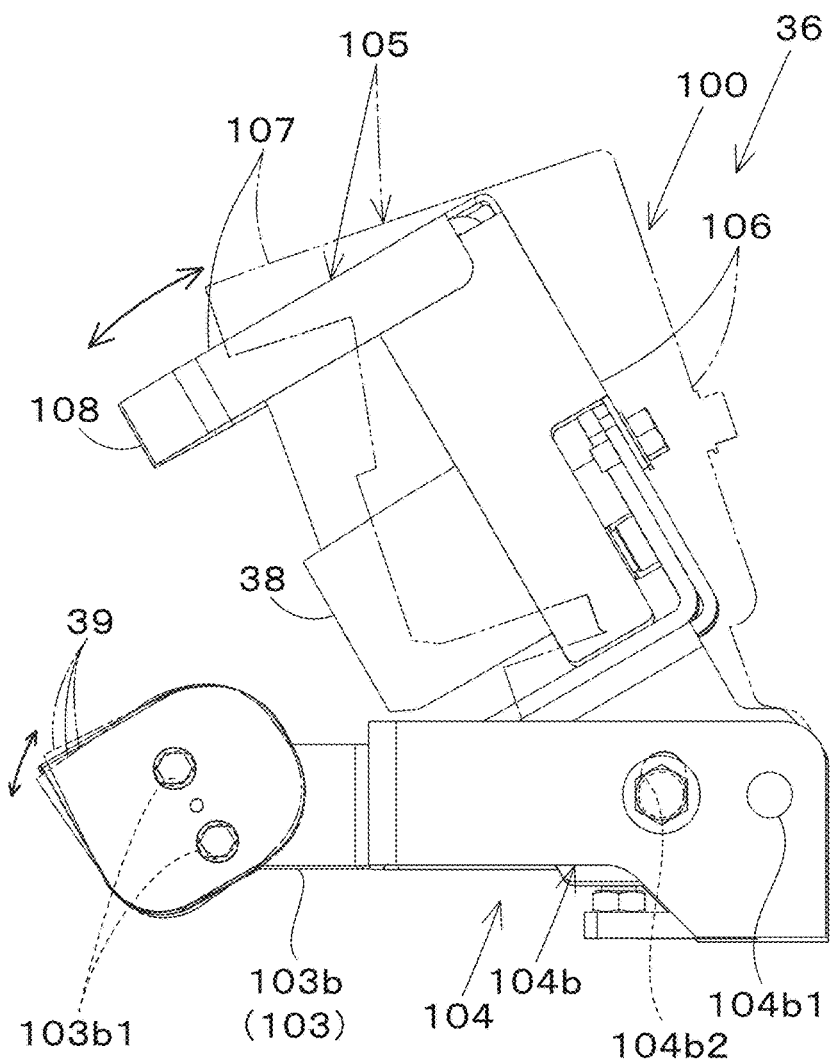
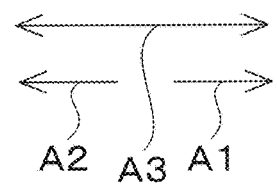

PROTECTION MECHANISM FOR WORKING VEHICLE, AND WORKING VEHICLE INCLUDING THE SAME

CROSS REFERENCE TO RELATED APPLICATIONS

This application is a continuation application of International Application No. PCT/JP2020/004280, filed on Feb. 5, 2020, which claims the benefit of priority to Japanese Patent Application No. 2019-109107, filed on Jun. 11, 2019. The entire contents of each of these applications are hereby incorporated herein by reference.

BACKGROUND OF THE INVENTION

1. Field of the Invention

The present invention relates to a protection mechanism for a working vehicle, and a working vehicle including the protection mechanism.

2. Description of the Related Art

Conventionally, a protection mechanism for a working vehicle disclosed in Japanese Unexamined Patent Application Publication No. WO2019/031318 includes: a roof provided above an operator's seat; a frame including a pillar which extends upward form the vehicle body and which supports a roof; and a camera unit which is disposed below a peripheral portion of the roof and which captures an image of surroundings of the vehicle body.

SUMMARY OF THE INVENTION

In cases where only working vehicles with limited height can enter a storage space for a working vehicle due to the roof height or the entrance height of the storage space, it is necessary that a camera be disposed lower than the uppermost part of the roof. However, in the protection mechanism for a working vehicle in Japanese Unexamined Patent Application Publication No. WO2019/031318, the camera unit is attached to an upper portion of the rear of the roof of a canopy, and therefore the working vehicle is difficult to store in the above-described storage space. Furthermore, even in cases where the camera is attached to a lower portion of the roof or between a peripheral portion of the roof and the frame, the camera unit is difficult to attach if that space is small.

PREFERRED EMBODIMENTS OF THE PRESENT INVENTION provide protection mechanisms for working vehicles each facilitating attachment of a camera below a peripheral portion of a roof.

A protection mechanism for a working vehicle according to an aspect of a preferred embodiment of the present invention includes a roof provided above an operator's seat, a pillar which extends upward from a vehicle body and supports the roof, a camera with a predetermined viewing direction, and a support stay which is connected to the pillar, orients the predetermined viewing direction of the camera sideways, and supports the camera below a peripheral portion of the roof.

A protection mechanism for a working vehicle according to an aspect of a preferred embodiment of the present invention may include a plurality of the pillars including a front pillar which supports a front portion of the roof and a rear pillar which supports a rear portion of the roof, and the support stay may be connected to the rear pillar.

A protection mechanism for a working vehicle according to an aspect of a preferred embodiment of the present invention may include a plurality of the pillars including a front pillar which supports a front portion of the roof, a rear pillar which supports a rear portion of the roof, and an intermediate pillar which is located between the front pillar and the rear pillar and which supports the roof, and the support stay may be connected to the intermediate pillar.

A protection mechanism for a working vehicle according to an aspect of a preferred embodiment of the present invention may include a support frame which connects the pillars, defines an opening together with the vehicle body and the pillars, and supports the roof, wherein the support stay extends from one of the pillars to an area above the opening and supports the camera above the opening.

A protection mechanism for a working vehicle according to an aspect of a preferred embodiment of the present invention may include an entry/exit door to open and close the opening, wherein the support stay extends outside a range of opening/closing movement of the entry/exit door.

In a protection mechanism for a working vehicle according to an aspect of a preferred embodiment of the present invention, the support stay may include a guide to route a transmission line from the pillar to the roof.

In a protection mechanism for a working vehicle according to an aspect of a preferred embodiment of the present invention, the support stay may include a fixed portion which is fixed to the pillar, an intermediate portion which extends from the fixed portion toward the roof, and a supporting portion which is provided on the intermediate portion and which supports the camera, and the guide includes a first guide portion which is attached to the intermediate portion and which routes the transmission line along the intermediate portion, and a second guide portion which is attached to the supporting portion and which routes the transmission line.

In a protection mechanism for a working vehicle according to an aspect of a preferred embodiment of the present invention, the support stay may include a cover which is attached to the pillar, which routes the transmission line on the pillar, and which covers the transmission line, wherein the transmission line is routed to the roof along the cover and the support stay.

A working vehicle according to an aspect of a preferred embodiment of the present invention includes the protection mechanism according to one of the above-described preferred embodiments, a vehicle body, and a linkage to link a working device to a rear of the vehicle body.

The above-described protection mechanisms for working vehicles make it possible to easily attach a camera below a peripheral portion of a roof.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 5B is a cross-sectional view of the roof as viewed from the front.

FIG. 7A is an enlarged view of a cutout in the roof as viewed from the rear.

FIG. 13 is a right side view showing how the obstacle detector and the camera unit swing.

DETAILED DESCRIPTION OF THE PREFERRED EMBODIMENTS

Figure 1:
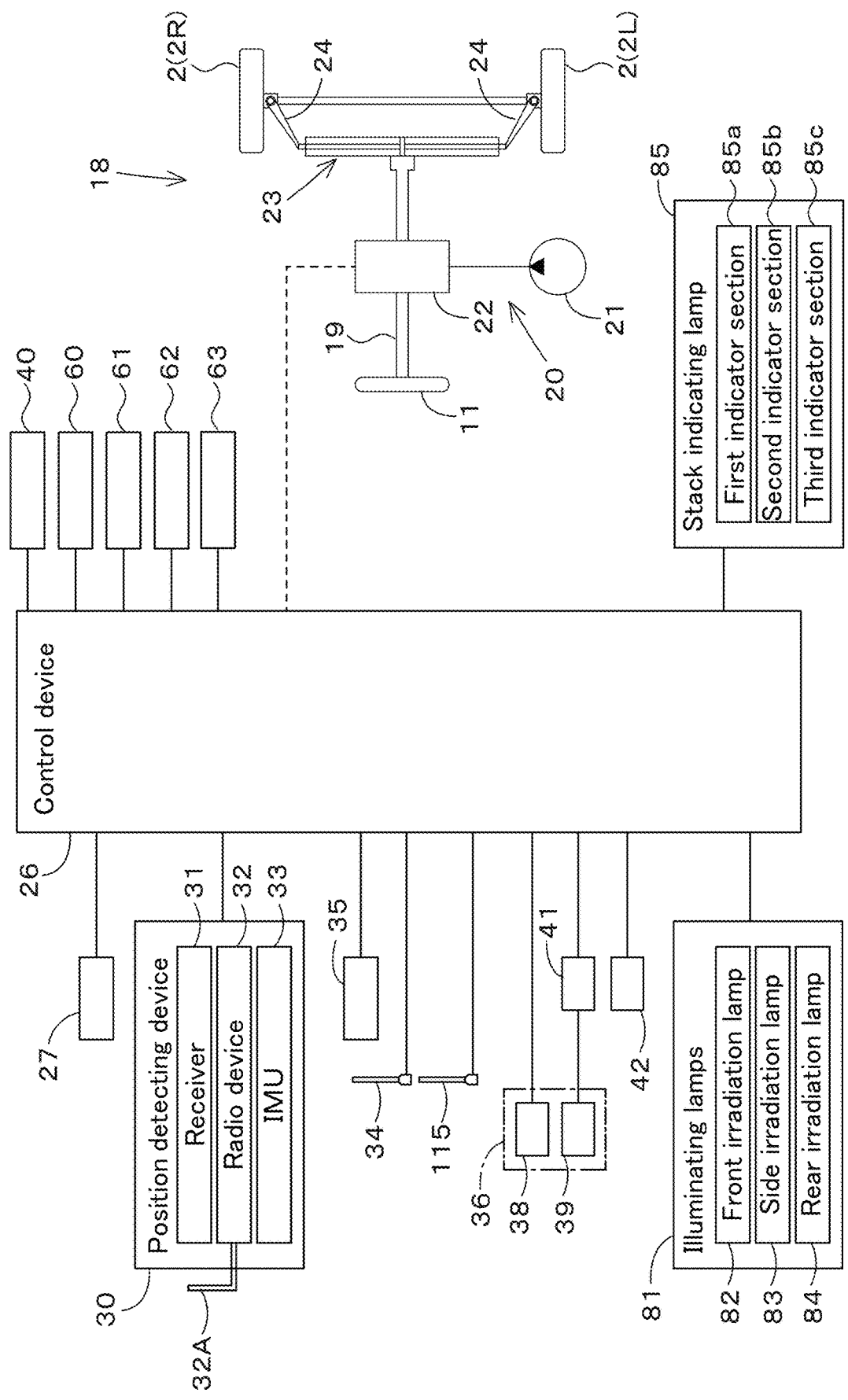
FIG. 1 shows a portion of a configuration of a working vehicle and a control system block diagram.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to drawings.

Figure 28:
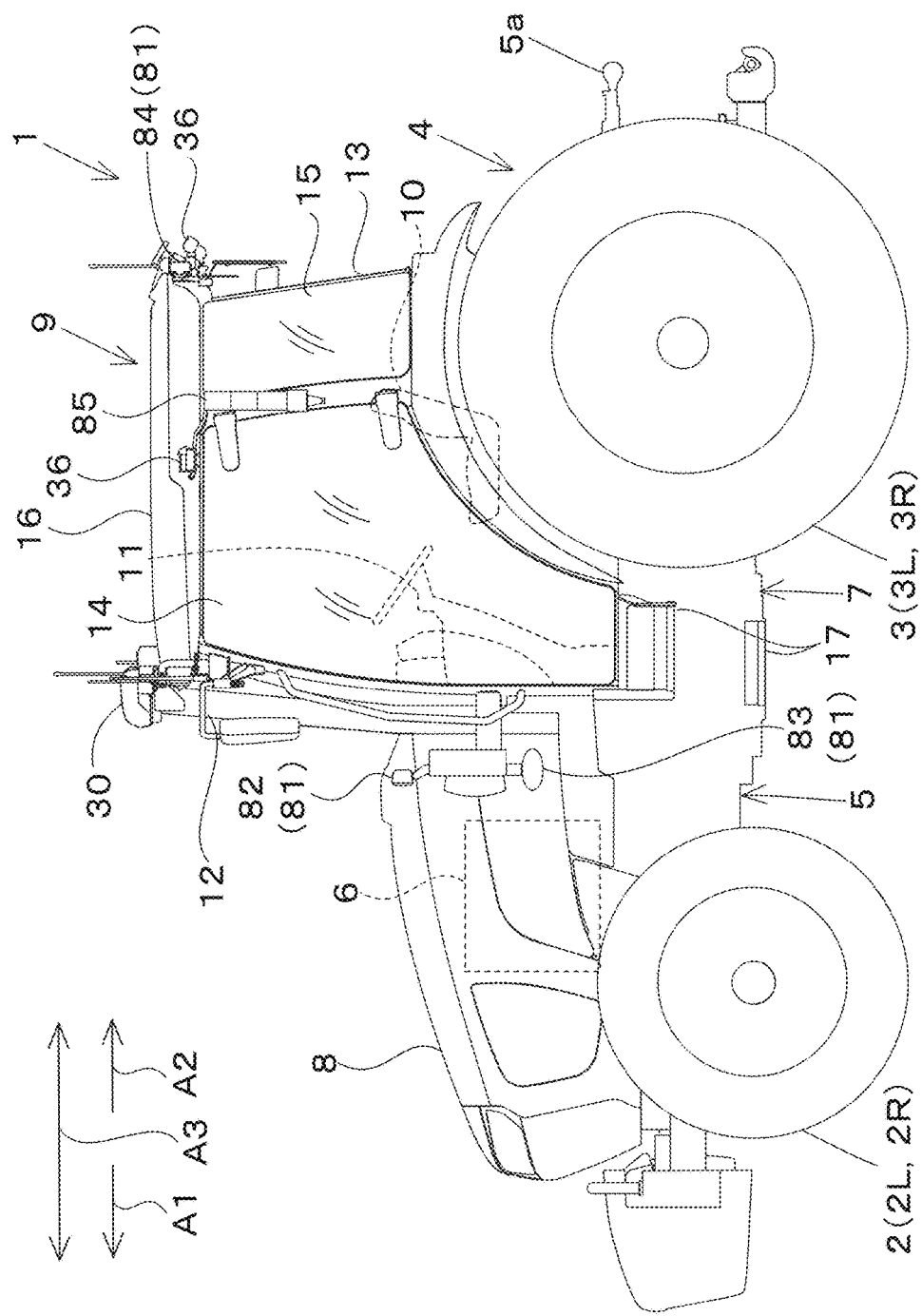
FIG. 28 is a side view of a working vehicle.
Figure 29:
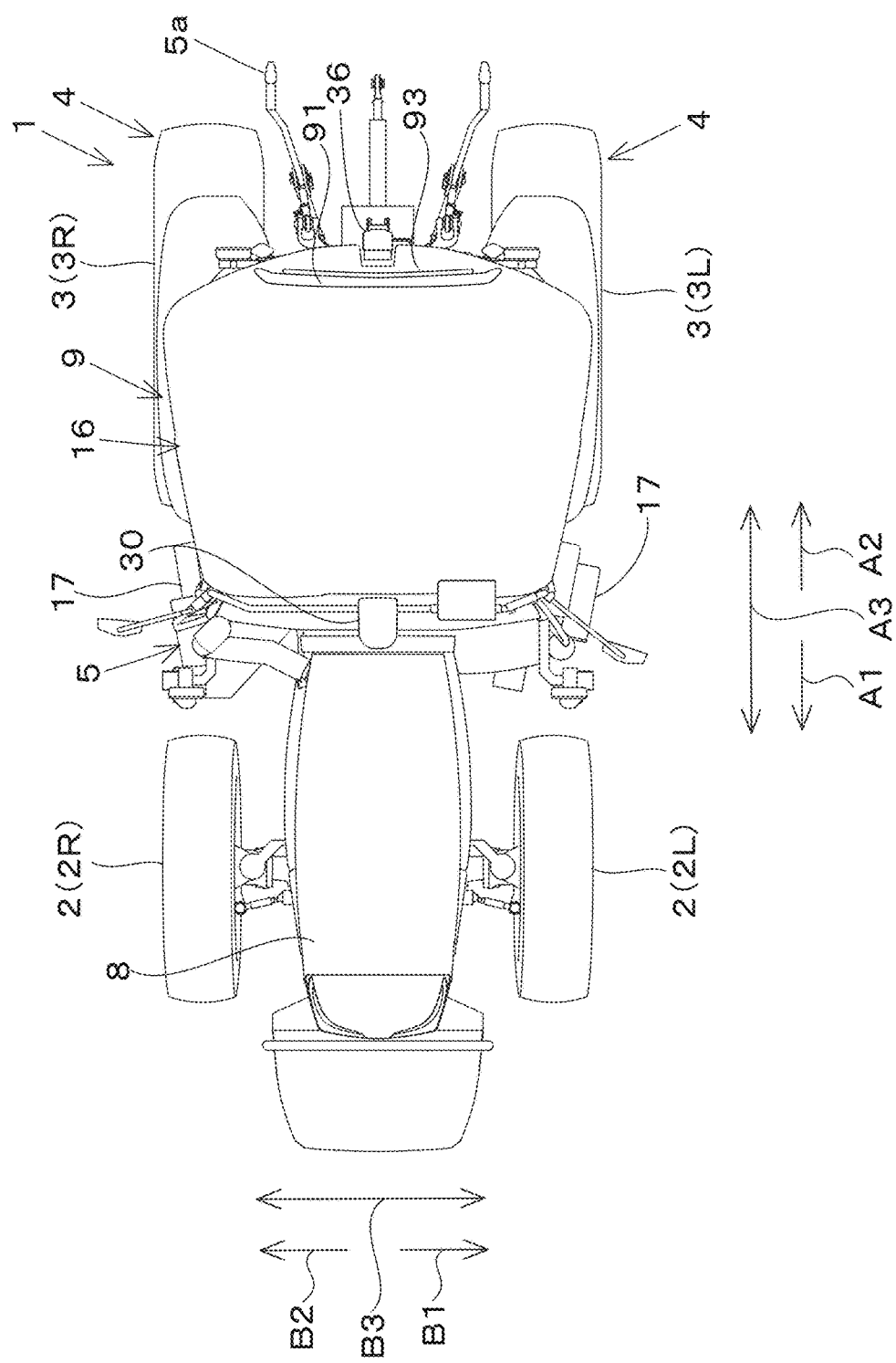
FIG. 29 is a plan view of the working vehicle.

FIG. 28 is a side view schematically illustrating a general configuration of a working vehicle 1 according to the present preferred embodiment. FIG. 29 is a plan view schematically illustrating the working vehicle 1. In the present preferred embodiment, a tractor is described as an example of the working vehicle 1.

In the present preferred embodiment, the description is based on the assumption that a direction indicated by arrow A1 in FIGS. 28 and 29 (direction in which the working vehicle 1 travels forward) is a forward direction, a direction indicated by arrow A2 in FIGS. 28 and 29 (direction in which the working vehicle 1 travels rearward) is a rearward direction, and a direction indicated by arrow A3 in FIGS. 28 and 29 is "front-rear direction A3". Accordingly, the near side in FIG. 28 is left (direction indicated by arrow B1 in FIG. 29), and the far side in FIG. 28 is right (direction indicated by arrow B2 in FIG. 29). The description is also based on the assumption that a horizontal direction perpendicular to the front-rear direction A3 is vehicle-body-width direction B3 (hereinafter may be referred to as "vehicle-width direction", direction indicated by arrow B3 in FIG. 29) which is a width direction of the working vehicle (tractor) 1. The description is based on the assumption that a rightward direction or leftward direction from the center of the working vehicle 1 in the vehicle-width direction B3 is "outward widthwise direction". In other words, the "outward widthwise direction" is a direction away from the widthwise center of the working vehicle 1 in the vehicle-width direction B3. The description is based on the assumption that the opposite direction to the outward widthwise direction is "inward widthwise direction". In other words, the "inward widthwise direction" is a direction toward the widthwise center of the working vehicle 1 in the vehicle-width direction B3. The description is also based on the assumption that an outward direction from the center of a roof 16 of a protection mechanism 9 of the working vehicle 1 in the front-rear direction A3 and the vehicle-width direction B3 is the "horizontal outward direction". In other words, the "horizontal outward direction" is a direction away horizontally from the center of the roof 16 in the front-rear direction A3 and the vehicle-width direction B3. The description is also based on the assumption that the opposite direction to the horizontal outward direction is the "horizontal inward direction". In other words, the "horizontal inward direction" is a direction horizontally toward the center of the roof 16 in the front-rear direction A3 and the vehicle-width direction B3.

As illustrated in FIG. 28, the working vehicle 1 includes a vehicle body 5, and the vehicle body 5 has a prime mover 6, a transmission casing 7, and a linkage unit 5a. The prime mover 6 is a diesel engine. The prime mover 6 may be a gasoline engine or an electric motor, and may be a hybrid prime mover including an engine and an electric motor. The prime mover 6 is located in a front portion of the working vehicle 1 and is covered by a hood 8.

The transmission casing 7 includes, for example, a flywheel housing which houses a flywheel, a clutch housing which houses a clutch configured to transmit and stop transmitting power transmitted from the prime mover 6 via the flywheel, a transmission case which houses a transmission to change speed stages regarding the power transmitted via the clutch, and/or the like which are directly connected together.

The linkage unit 5a links a working device to the rear of the vehicle body 5. The linkage unit 5a is swingably provided on the rear of the vehicle body 5, and can have a working device (not illustrated) attached thereto and detached therefrom. Linking a working device to the linkage unit 5a makes it possible for the vehicle body 5 to tow the working device. The working device is, for example, a cultivator for cultivation, a fertilizer applicator for applying fertilizer, a pesticide applicator for applying pesticide, a harvester for harvesting, a mower for mowing grass or the like, a tedder for tedding grass or the like, a rake for raking grass or the like, or a baler (roll baler) for baling grass or the like.

As illustrated in FIGS. 28 and 29, the vehicle body 5 is, for example, supported by a wheel-type traveling device 4 including a plurality of wheels 2 and 3 such that the vehicle body 5 can travel. The plurality of wheels 2 and 3 include front wheels 2 (2L, 2R) on the left and right sides of a front portion of the vehicle body 5, and rear wheels 3 (3L, 3R) on the left and right sides of a rear portion of the vehicle body 5.

As illustrated in FIGS. 28 and 29, the working vehicle includes the protection mechanism 9 mounted on the rear portion of the vehicle body 5. The protection mechanism 9 is, for example, a cabin covering an operator's seat 10 on which an operator is to be seated. The protection mechanism 9 includes the roof 16 which defines a ceiling at the top thereof and which is provided above the operator's seat 10. Below the protection mechanism 9, there are entry/exit steps 17 on which the operator stands when entering and exiting the protection mechanism 9. The entry/exit steps 17 are provided below each of entry/exit doors 14 on the right and left sides. Note that the protection mechanism 9 may be a canopy which covers the operator's seat 10 from the upper side, and a configuration thereof is not limited to a cabin. A steering wheel 11 for operation of the front wheels 2 (2L,2R) is provided in front of the operator's seat 10.

The following description discusses a general configuration of a travel system of the working vehicle 1 and a general configuration of a control system of the working vehicle 1 with reference to FIG. 1.

As illustrated in FIG. 1, the working vehicle 1 includes a steering unit 18. The steering unit 18 is a unit configured to perform manual steering in which the vehicle body 5 is steered by the operator's operation, and automatic steering in which the vehicle body 5 is steered automatically without the operator's operation. The steering unit 18 includes the steering wheel 11, and a rotation shaft (steering axle) 19 which rotates as the steering wheel 11 rotates. The steering unit 18 also includes an assist mechanism (power steering mechanism) 20 to assist steering performed using the steering wheel 11. Specifically, the assist mechanism 20 includes a hydraulic pump 21, a control valve 22 supplied with hydraulic fluid discharged from the hydraulic pump 21, and a steering cylinder 23 which is caused to function by the control valve 22. The control valve 22 is, for example, a three-way switching valve which achieves multi-position switching by movement of a spool or the like, and switches positions according to the direction in which the rotation shaft 19 is rotated by steering operation (direction of rotation). The control valve 22 is also a solenoid valve which functions according to a control signal. The steering cylinder 23 is connected to arms (knuckle arms) 24 which change the orientation of the front wheels 2.

Once the operator has held the steering wheel 11 and operated it in one direction or the opposite direction, the position and the degree of opening of the control valve 22 are changed to those corresponding to the direction of rotation of the steering wheel 11, and a piston rod of the steering cylinder 23 moves rightward or leftward according to the position and the degree of opening of the control valve 22. This makes it possible to change the steering direction of the front wheels 2. That is, the vehicle body 5 is configured to change its traveling direction to the left or right by manual steering using the steering wheel 11. Note that the foregoing steering unit 18 is an example, and the foregoing configuration does not imply limitation.

As illustrated in FIG. 1, the working vehicle 1 includes a control device 26. The control device 26 includes a microprocessor including a central processing unit (CPU), an electrically erasable programmable read-only memory (EEPROM), and/or the like.

The control device 26 performs various types of control regarding the working vehicle 1. The control device 26 has connected thereto a state detecting device 27 which detects a drive state and the like of the working vehicle 1. The state detecting device 27 is, for example, a device to detect the state of the travel system or the like, and detects, for example, the state of a crank sensor, a cam sensor, an engine rotation sensor, an accelerator sensor, a vehicle speed sensor, a steering angle sensor, a position detecting device 30 (described later), and/or the like. Note that the state detecting device 27 may be a raising/lowering lever sensor, a PTO rotation sensor, or the like, other than the state of the travel system. The control device 26 controls the travel system of the working vehicle 1 and controls a work system of the working vehicle 1. The control device 26 controls, for example, the rotation speed of the prime mover (engine) 6, vehicle speed, the steering angle of the steering unit 18, and the like, on the basis of the state detected by the state detecting device 27. Furthermore, the state detecting device 27 controls the swinging movement of the linkage unit 5a, the rotation speed of the PTO, and the like, on the basis of the state detected by the state detecting device 27.

The control device 26 has connected thereto a transmission 60, a forward/rearward travel switching device 61, a PTO clutch 62, and a brake device 63. The control device 26, the transmission 60, the forward/rearward travel switching device 61, the PTO clutch 62, and the brake device 63 are connected via an on-board LAN such as a controller area network (CAN) or a communication channel. This makes it possible for the control device 26 to control the operation of the transmission 60, the forward/rearward travel switching device 61, the PTO clutch 62, and the brake device 63.

The control device 26 has connected thereto a position detecting device 30 which detects the position of the vehicle body 5 (working vehicle 1). The control device 26 is configured to acquire the position detected by the position detecting device 30. The position detecting device 30 is a device to detect the position thereof (measured position information including latitude and longitude) using a satellite positioning system (positioning satellites). Specifically, the position detecting device 30 receives signals (positions of positioning satellites, time of transmission, correction information, and/or the like) from positioning satellites, and detects the position (for example, latitude and longitude) on the basis of the received signals.

The position detecting device 30 determines the position and heading of the vehicle body 5 using a well-known global positioning system (GPS), which is an example of global navigation satellite system (GLASS). The present preferred embodiment preferably uses RTK-GPS, which is suitable for measuring the position of a mobile object.

As illustrated in FIG. 1, the position detecting device 30 includes a receiver 31, a radio device 32, and an inertial measurement unit (IMU) 33.

The receiver 31 includes an antenna and the like, and receives signals from the positioning satellites.

The radio device 32 includes an antenna 32A and communicates with a base station (reference station) located at a known position. The base station transmits, to the position detecting device 30, measured position data (correction information) obtained by receiving radio waves from the positioning satellites. The position detecting device 30 receives radio waves (signals) from the positioning satellites and receives the measured position data (signals) from the base station, and detects the position thereof (latitude and longitude) based on measured position data obtained by receiving radio waves from the positioning satellites and on the measured position data from the base station.

The inertial measurement unit 33 includes an acceleration sensor to detect acceleration, a gyroscope sensor to detect angular velocity, and/or the like. The inertial measurement unit 33 makes it possible to detect the roll angle, pitch angle, yaw angle, and/or the like of the vehicle body 5.

The control device 26 is configured to control automatic travel of the working vehicle 1 (vehicle body 5) (perform automatic travel control). The control device 26 is configured to switch between an automatic travel mode and a manual travel mode.

In the case of the automatic travel mode, the control device 26 sets the position and the degree of opening of the control valve 22 so that the position at which the vehicle body 5 is traveling (position detected by the position detecting device 30) and a predetermined planned travel route (travel route) at least match each other. Specifically, in the case of the automatic travel mode, the control device 26 compares the position at which the vehicle body 5 is traveling and the position indicated by the planned travel route (position on the planned travel route) and, if the position at which the vehicle body 5 is traveling and the position on the planned travel route match each other, maintains the steering angle and the steering direction of the steering wheel 11 of the steering unit 18 (steering angle and steering direction of front wheels 2) without making changes (maintains the degree of opening and the position of the control valve 22 without making changes). If the position at which the vehicle body 5 is traveling and the position on the planned travel route do not match each other, the control device 26 changes the steering angle and/or steering direction of the steering wheel 11 of the steering unit 18 (changes the degree of opening and/or the position of the control valve 22) so that the deviation (the amount of deviation) between the position at which the vehicle body 5 is traveling and the position on the planned travel route would be zero.

Note that, although the control device 26 changes the steering angle of the steering unit 18 on the basis of the deviation between the position at which the vehicle body 5 is traveling and the position on the planned travel route in the automatic travel control in the above-described preferred embodiment, this does not imply limitation. For example, the following configuration may be used. If the heading of the planned travel route and the heading of the traveling direction (direction of travel) of the working vehicle 1 (vehicle body 5) (heading of the vehicle body 5) differ from each other, the control device 26 sets the steering angle so that the heading of the vehicle body 5 would match the heading of the planned travel route.

The following configuration may also be used. In the automatic travel control, the control device 26 sets a final steering angle in the automatic travel control on the basis of the steering angle determined based on the deviation (location deviation) and the steering angle determined based on the heading deviation.

Settings of the steering angle in the automatic travel control in the above-described preferred embodiment are examples, and do not imply limitation.

The control device 26 has connected thereto a communication antenna 34 and a transmitter 35. The communication antenna 34 exchanges, via wireless communication, various types of information such as a command to start automatic travel and a command to stop the automatic travel (including pausing the automatic travel) with a remote controller which controls the working vehicle 1 remotely from a distant location. The transmitter 35 is, for example, a wireless communication device which transmits various types of signals via a wireless communication network constructed between the wireless communication device and a wireless communication terminal such as a mobile or a personal computer.

The control device 26 has also connected thereto a display device 40 which is configured to display various information about the working vehicle 1. Note that the display device 40 may be operable and configured to change settings of the working vehicle 1 via the control device 26.

As illustrated in FIG. 1, the working vehicle 1 includes an electric device 36. The electric device 36 is, for example, a monitoring device 36 to monitor surroundings of the vehicle body 5, and detects obstacles which make it difficult for the working vehicle 1 to travel. A plurality of such monitoring devices 36 are provided around the vehicle body 5 and have respective different viewing directions. The monitoring devices 36 include at least one of the following: a laser unit (obstacle detector) 38 including a laser scanner to detect obstacles around the vehicle body 5 using light waves; and a camera unit 39 including a camera (moving picture camera, imaging device) to capture an image of surroundings of the vehicle body 5.

Specifically, the monitoring devices 36 provided at the front and rear of the working vehicle 1 include both the laser unit 38 and the camera unit 39. On the other hand, the monitoring devices 36 provided at the left and right of the working vehicle 1 include the camera unit 39. That is, for example, the laser units 38 detect obstacles present in the range from nearby to distant areas forward and rearward of the vehicle body 5, and the camera units 39, which are provided at the front, rear, left, and right of an upper portion of the protection mechanism 9, respectively, capture images of an area surrounding the vehicle body 5. Note that the monitoring devices 36 are not limited to the foregoing configuration, and may include, as the obstacle detector 38, a distance measuring sensor other than the laser unit instead of or in addition to the laser unit. For example, the monitoring devices 36 may include a sonar unit (obstacle detector) including one or more sonars to detect obstacles around the vehicle body 5 using sound waves (ultrasonic waves). In such a case, for example, two such sonar units are provided on each of the front, rear, left and right portions of the working vehicle 1, and detect obstacles present in a nearby area substantially surrounding the vehicle body 5.

The control device 26 has also connected thereto an image processing device 41 and a monitoring/control device (referred to as a monitoring ECU) 42.

The laser units 38 are connected to the control device 26. Each laser scanner determines, for example, whether or not there is an approaching obstacle in the nearby area around the vehicle body 5 on the basis of the period between the emission of laser and the reception of the laser, and outputs the result of determination to the control device 26.

The image processing device 41 has the camera units 39 connected thereto. The image processing device 41 processes images captured by the camera units 39 and outputs the result thereof to the control device 26.

The monitoring ECU 42 includes a CPU, an electric circuit, an electronic circuit, or the like. The monitoring ECU 42 acquires the result of detection of an obstacle from the control device 26, and controls automatic travel on the basis of the result of detection of the obstacle. For example, if no obstacles are detected by any of the monitoring devices 36, the monitoring ECU 42 continues the automatic travel, whereas, if an obstacle is detected by any of the monitoring devices 36, the monitoring ECU 42 stops the automatic travel. More specifically, the monitoring ECU 42 stops the working vehicle 1 to stop the automatic travel if an obstacle is detected by the monitoring devices 36 and if the distance between the obstacle and the working vehicle 1 is equal to or less than a predetermined distance.

The following description discusses control performed by the monitoring ECU 42 if an obstacle is detected by any of the monitoring devices 36 (if it is determined that an obstacle is approaching the vehicle body 5). The monitoring ECU 42 controls the operation of the transmission 60, the forward/rearward travel switching device 61, the PTO clutch 62, and the brake device 63 via the control device 26 connected to the monitoring ECU 42. Specifically, the monitoring ECU 42 reduces vehicle speed by shifting the transmission 60 to a slowdown position. Furthermore, the monitoring ECU 42 switches the forward/rearward travel switching device 61 to a neutral state, and activates the brake device 63. This stops the automatic travel of the working vehicle 1. Furthermore, the monitoring ECU 42 switches the PTO clutch 62 to an OFF state and interrupts transmission of power from the PTO shaft of the working vehicle 1 to the working device. This stops the working device from being driven.

As illustrated in FIGS. 1 and 28, the working vehicle 1 includes lamps which light up in the vicinity of the vehicle body 5. These lamps include illuminating lamps (working lamps) 81 and a stack indicating lamp 85.

The illuminating lamps 81 are lamps to illuminate the surroundings of the vehicle body 5 when, for example, work is performed in the evening, during nighttime, or the like. The illuminating lamps 81 are also referred to as working lamps. The illuminating lamps 81 are configured to illuminate areas forward, sideward, and rearward of the vehicle body 5. Specifically, the illuminating lamps 81 include a front irradiation lamp 82 which illuminates an area forward of the vehicle body 5, side irradiation lamps 83 which illuminate areas sideward of the vehicle body 5 (areas lying in outward widthwise directions), and a rear irradiation lamp 84 which illuminates an area rearward of the vehicle body 5.

The stack indicating lamp 85 is an indicating lamp which indicates, for example, the operating condition of the vehicle body 5 in the automatic travel mode such that the operation condition is visually recognizable from outside. The stack indicating lamp 85 includes a plurality of (in the present preferred embodiment, three) indicator sections 85*a*, 85*b*, and 85*c* which have respective different indication modes. The plurality of indicator sections 85*a*, 85*b*, and 85*c* are in the shape of, for example, vertically elongated cylinders arranged along the top-bottom direction (vertical direction). As illustrated in FIG. 28, the stack indicating lamp 85 is attached to, for example, an intermediate portion of an intermediate pillar 47 in the top-bottom direction, is located outward of the intermediate pillar 47 in the outward widthwise direction, and extends upward. The plurality of indicator sections 85*a*, 85*b*, and 85*c* provide indication in different modes according to a signal inputted from the control device 26. The plurality of indicator sections 85*a*, 85*b*, and 85*c* are, for example, lamps which provide indication in different modes by lighting up and going dark independently. The plurality of indicator sections 85*a*, 85*b*, and 85*c* are a first indicator section 85*a* which lights up in green, a second indicator section 85*b* which lights up in yellow, and a third indicator section 85*c* which lights up in red. The first indicator section 85*a* lights up when the vehicle body 5 is in the automatic travel mode, the second indicator section 85*b* lights up when the vehicle body 5 is paused by the automatic travel mode. The third indicator section 85*c* lights up when the vehicle body 5 is stopped in an emergency by the automatic travel mode and blinks when the position detecting device does not stably receive signals from the positioning satellites.

Figure 2:
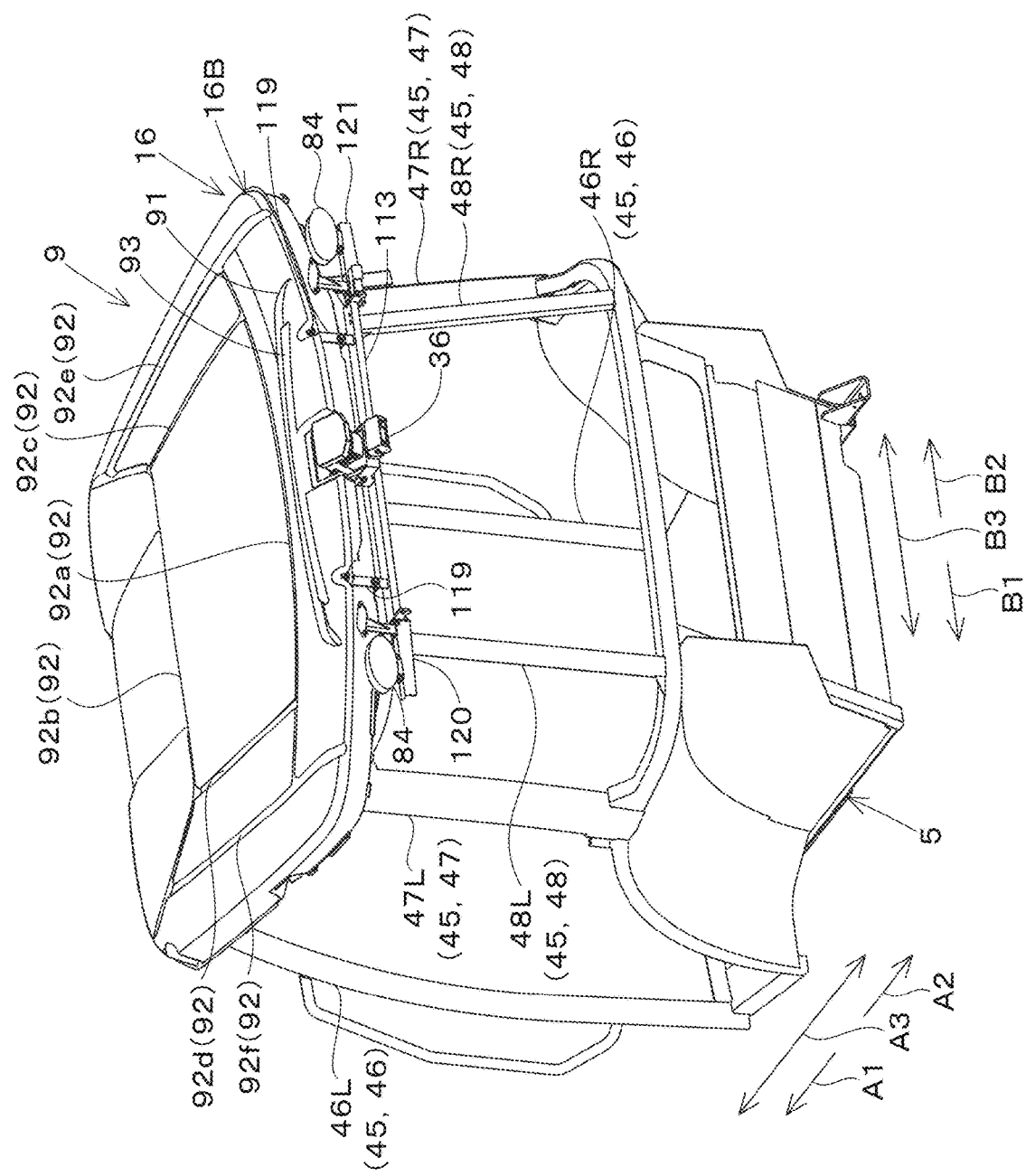
FIG. 2 is a perspective view of a protection mechanism as viewed from the rear left side.

As illustrated in FIG. 2, the protection mechanism 9 includes a frame (protection mechanism frame) 44 which defines the framework of the protection mechanism 9. The protection mechanism frame 44 includes a plurality of pillars 45 and a support frame 49. The plurality of pillars 45 include a pair of front pillars 46, a pair of intermediate pillars (center pillars, quarter pillars) 47, and a pair of rear pillars 48.

Figure 3:
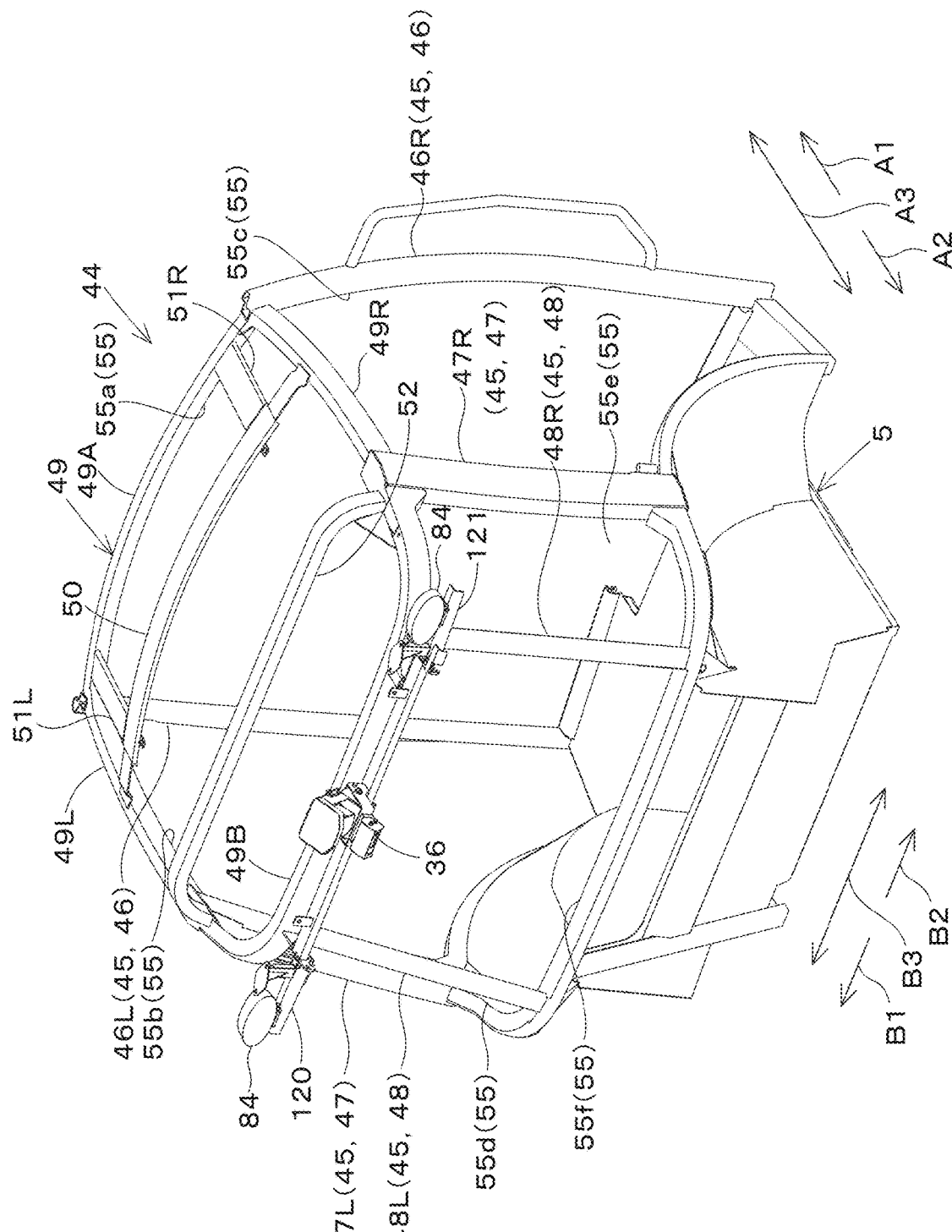
FIG. 3 is a perspective view of a protection mechanism frame as viewed from the rear right side.

As illustrated in FIGS. 2 and 3, the pair of front pillars 46 are provided on the vehicle body 5 such that the front pillars 46 are spaced apart from each other along the vehicle-width direction B3 and extend upward, are provided above the entry/exit steps 17 (positioned higher than the entry/exit steps 17), and are located in a front portion of the protection mechanism 9. The pair of front pillars 46 include a first front pillar 6L and a second front pillar 46R. The first front pillar 6L is located on one of the opposite sides (left side) of the front portion of the protection mechanism frame 44 (protection mechanism 9) in the vehicle-width direction B3. The second front pillar 46R is located on the other of the opposite sides (right side) of the front portion of the protection mechanism frame 44 (protection mechanism 9) in the vehicle-width direction B3.

As illustrated in FIGS. 2 and 3, the pair of rear pillars 48 are provided on the vehicle body 5 such that the rear pillars 48 are spaced apart from each other along the vehicle-width direction B3 and extend upward, and are located in a rear portion of the protection mechanism 9. The pair of rear pillars 48 include a first rear pillar 48L and a second rear pillar 48R. The first rear pillar 48L is located on one of the opposite sides of a back surface of the protection mechanism frame 44. The second rear pillar 48R is located on the other of the opposite sides of the back surface of the protection mechanism frame 44.

As illustrated in FIGS. 2 and 3, the pair of intermediate pillars 47 are provided on the vehicle body 5 such that the rear pillars 47 are spaced apart from each other along the vehicle-width direction B3 and extend upward, and are located between the pair of front pillars 46 and the pair of rear pillars 48. Specifically, the pair of intermediate pillars 47 are located in an intermediate portion of the protection mechanism 9 in the front-rear direction A3. The pair of intermediate pillars 47 include a first intermediate pillar 47L and a second intermediate pillar 47R. The first intermediate pillar 47L is located in an intermediate portion of a side surface (left side surface) of the protection mechanism frame 44 in the front-rear direction A3. The second intermediate pillar 47R is located in an intermediate portion of the opposite side surface (right side surface) of the protection mechanism frame 44 in the front-rear direction A3.

Note that, although the plurality of pillars 45 in the present preferred embodiment include the pair of front pillars 46, the pair of intermediate pillars 47, and the pair of rear pillars 48, a configuration of the plurality of pillars 45 is not limited to that described above. For example, the following configuration may be used: the plurality of pillars 45 include the pair of front pillars 46 and the pair of rear pillars 48 but do not include the pair of intermediate pillars 47.

As illustrated in FIG. 3, the support frame 49 connects upper portions of the plurality of pillar 45. That is, the support frame 49 connects upper portions of the pair of front pillars 46, upper portions of the pair of intermediate pillars 47, and upper portions of the pair of rear pillars 48. The support frame 49 has the roof 16 attached thereto, and supports the roof 16 from front to rear. As illustrated in FIG. 3, the support frame 49, together with the vehicle body 5 and the plurality of pillars 45, defines openings 55. Specifically, the support frame 49 includes a front support frame 49A, a first side support frame 49L, a second side support frame 49R, and a rear support frame 49B.

The front support frame 49A connects together the upper portions of the first front pillar 6L and the second front pillar 46R, and the front support frame 49A supports a front portion of the roof 16. The front support frame 49A, together with the vehicle body 5, the first front pillar 6L, and the second front pillar 46R, defines an opening 55 (front opening 55a).

The first side support frame 49L connects together the upper portions of the first front pillar 6L and the first intermediate pillar 47L, and supports one of the opposite sides (left side) of the roof 16 in the vehicle-width direction B3 (width direction of the vehicle body 5). The first side support frame 49L, together with the vehicle body 5, the first front pillar 6L, and the first intermediate pillar 47L, defines an opening 55 (left side opening 55b).

The second side support frame 49R connects together the upper portions of the second front pillar 46R and the second intermediate pillar 47R, and supports the other of the opposite sides (right side) of the roof 16 in the vehicle-width direction B3. The second side support frame 49R, together with the vehicle body 5, the second front pillar 46R, and the second intermediate pillar 47R, defines an opening 55 (right side opening 55c).

The rear support frame 49B connects together the upper portions of the first intermediate pillar 47L and the second intermediate pillar 47R, connects together the upper portions of the first rear pillar 48L and the second rear pillar 48R, and supports a rear portion of the roof 16. The rear support frame 49B, together with the vehicle body 5, the first intermediate pillar 47L, and the first rear pillar 48L, defines an opening 55 (left rear opening 55d). The rear support frame 49B, together with the vehicle body 5, the second intermediate pillar 47R, and the second rear pillar 48R, defines an opening (right rear opening 55e). The rear support frame 49B, together with the vehicle body 5, the first rear pillar 48L, and the second rear pillar 48R, defines an opening 55 (rear opening 55f).

As illustrated in FIG. 3, the support frame 49 has, at the front, a front frame 50 which bridges the first side support frame 49L and the second side support frame 49R. The front frame 50 has one end portion connected to the front support frame 49A by a first reinforcing frame 51L, and has the opposite end portion connected to the front support frame 49A by a second reinforcing frame 51R. The support frame 49 has, at the rear, a rear frame 52 which bridges right and left end portions of the rear support frame 49B.

Figure 16:
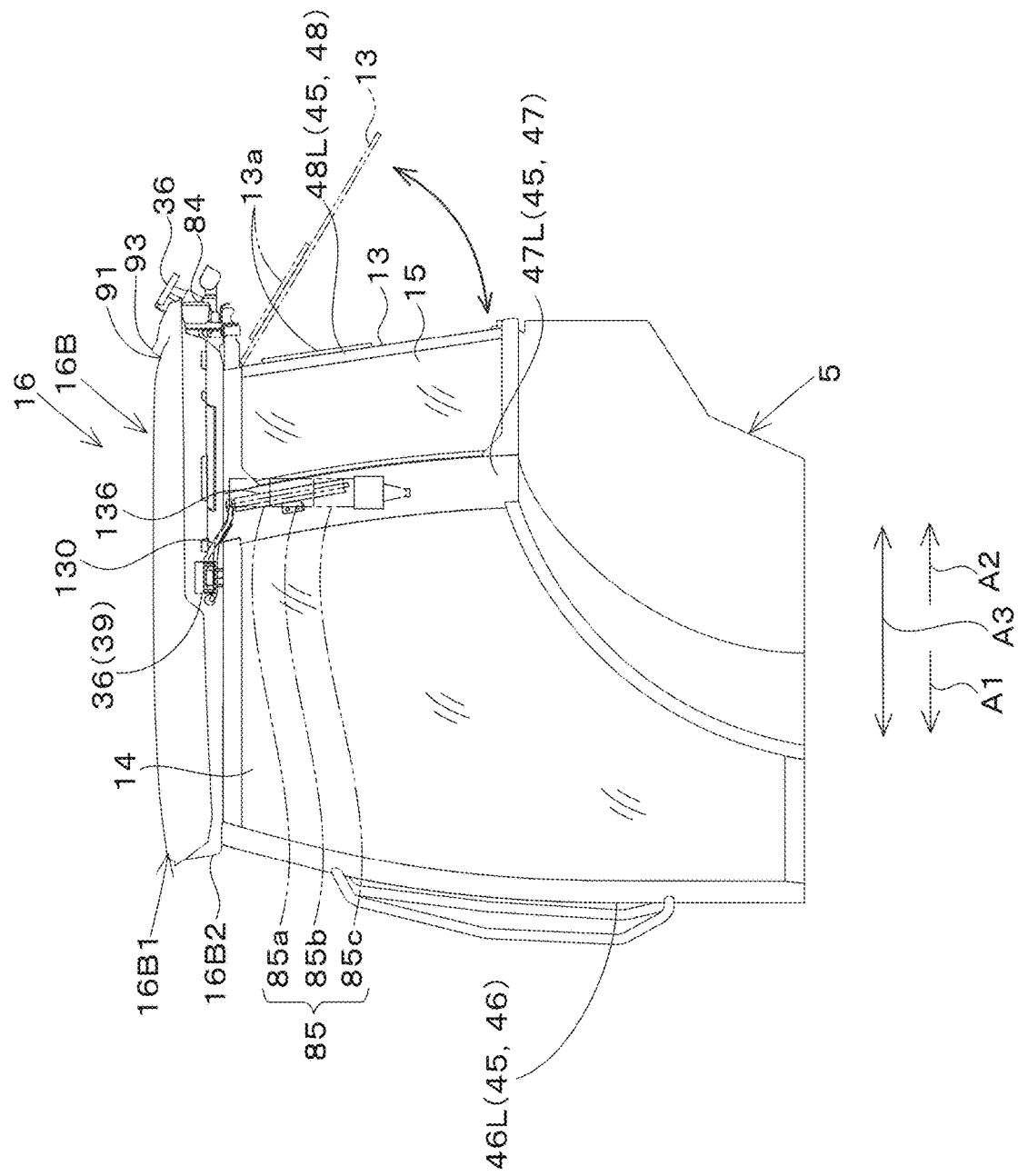
FIG. 16 is a left side view of the protection mechanism.

As illustrated in FIG. 28, the protection mechanism 9 includes a windshield glass (front window) 12, a rear window glass (rear window) 13, and quarter glasses (rear side glasses) 15. The windshield glass 12 is located between the first front pillar 6L and the second front pillar 46R and covers the front opening 55a. The rear window glass 13 is located between the first rear pillar 48L and the second rear pillar 48R and covers the rear opening 55f. The rear window glass 13 has an upper edge thereof swingably attached to the rear support frame 49B, and is configured to be opened and closed. As illustrated in FIG. 16, the rear window glass 13 is provided with, at an upper portion of the backside thereof, a wiper 13a which moves to and fro while in contact with the outer surface of the rear window glass 13 and which wipes rainwater or water droplets off the outer surface. One of the quarter glasses 15 is located between the first intermediate pillar 47L and the first rear pillar 48L and covers the left rear opening 55d, and the other is located between the second intermediate pillar 47R and the second rear pillar 48R and covers the right rear opening 55e.

The protection mechanism 9 is provided with the entry/exit doors 14 to open and close the left side opening 55b and the right side opening 55c. One of the entry/exit doors 14 to open and close the left side opening 55b is swingably attached with a hinge provided on the first intermediate pillar 47L, and is configured to be opened and closed. On the other hand, the other of the entry/exit doors 14 to open and close the right side opening 55c is swingably attached with a hinge provided on the second intermediate pillar 47R, and is configured to be opened and closed.

Figure 4:
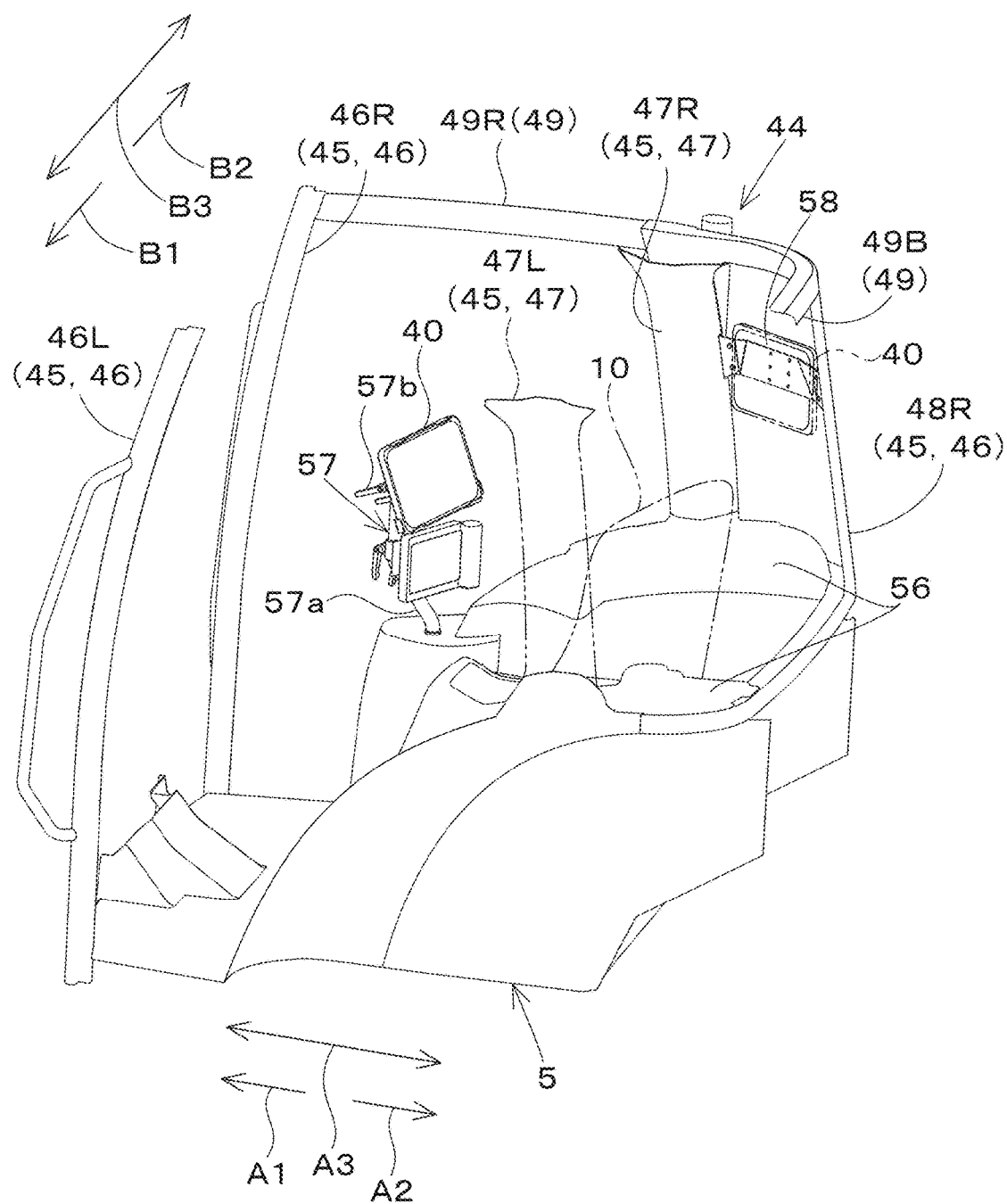
FIG. 4 is a perspective view of the interior of the protection mechanism as viewed from the left side.

The following description discusses the operator's seat 10 and its surroundings inside the protection mechanism. As illustrated in FIG. 4, console boxes (operation bases) 56, a supporting/mounting unit 57, and an auxiliary mounting part 58 are provided in the vicinity of the operator's seat 10. A pair of the console boxes 56 are located sideward of the operator's seat 10, i.e., the pair of the console boxes 56 are located on the opposite sides of the operator's seat 10 in a machine-body-width direction. Each console box 56 is provided with, for example, an operation device for operation of the working vehicle 1.

The supporting/mounting unit 57 is fixed to one of the console boxes 56 and supports the display device 40. The supporting/mounting unit 57 includes a supporting column 57a which extends upward from a front portion of the console box 56, and a placement member 57b which is attached to an upper end of the supporting column 57a and which is for placement of the display device 40.

The auxiliary mounting part 58 supports the another display device 40 instead of or in addition to the supporting/mounting unit 57. That is, the display device 40 can be placed on either the supporting/mounting unit 57 or the auxiliary mounting part 58 and, when there are a plurality of the display devices 40, the display devices 40 can be placed on the supporting/mounting unit 57 and the auxiliary mounting part 58, respectively. The auxiliary mounting part 58 is, for example, a member formed by subjecting a thick steel plate to bending, and is provided between an intermediate portion of the second intermediate pillar 47R in the top-bottom direction and an intermediate portion of the second rear pillar 48R in the top-bottom direction. The auxiliary mounting part 58 is attached to the second intermediate pillar 47R and the second rear pillar 48R with fixing means such as fasteners (e.g., bolts). Note that, in the present preferred embodiment, the auxiliary mounting part 58 may be located between an intermediate portion of the first intermediate pillar 47L in the top-bottom direction and an intermediate portion of the first rear pillar 48L in the top-bottom direction, and a configuration thereof is not limited to that as described above.

Figure 5A:
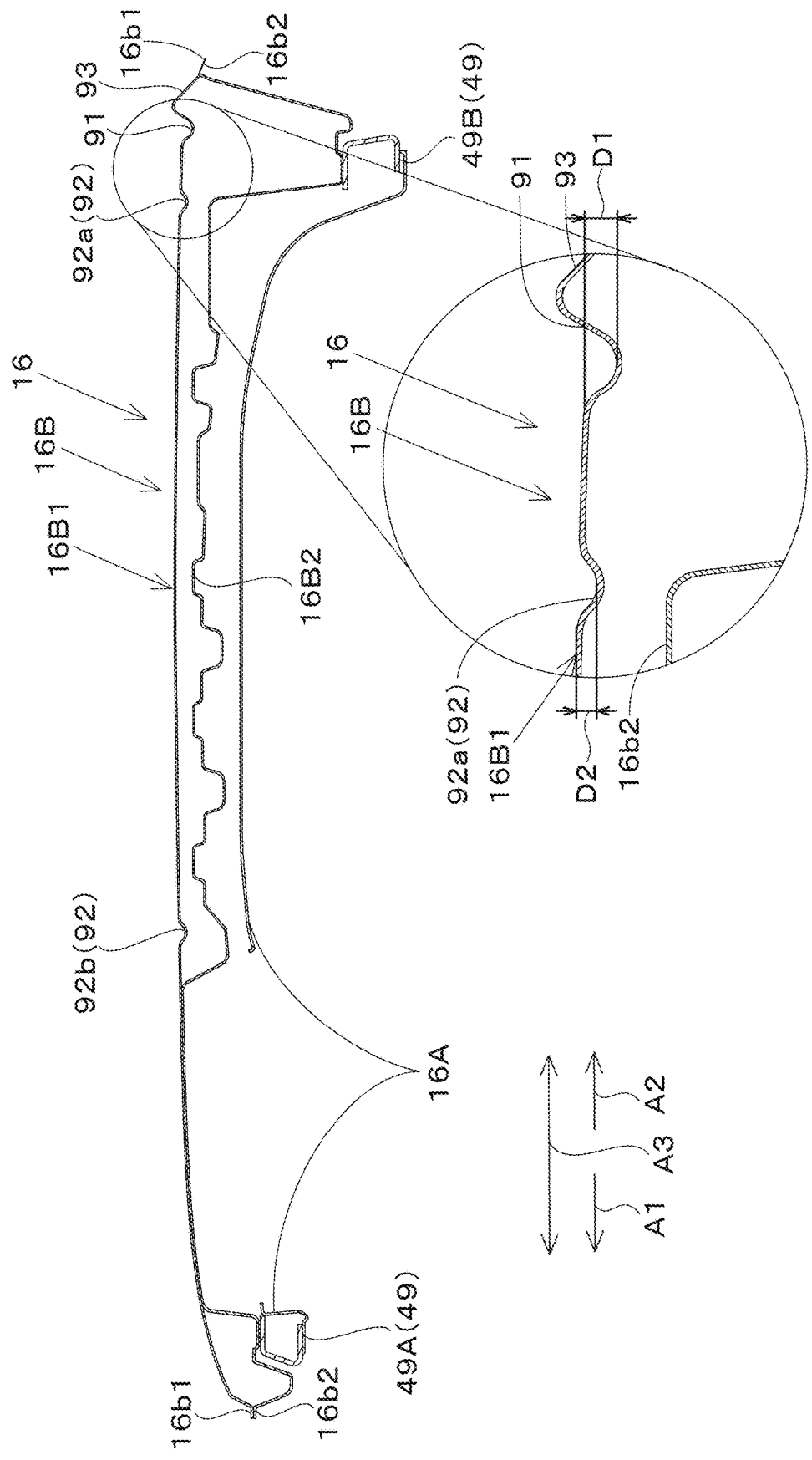
FIG. 5A is a cross-sectional view of a roof as viewed from the left side.

As illustrated in FIGS. 5A and 6A, the roof 16 includes an inner roof 16A and an outer roof 16B.

As illustrated in FIG. 5A, the inner roof 16A is disposed in a lower portion of the roof 16. A front portion of the inner roof 16A is attached to a lower portion of the front support frame 49A. A rear portion of the inner roof 16A is attached to a lower portion of the rear support frame 49B. As illustrated in FIG. 5B, a left portion of the inner roof 16A is attached to a lower portion of the first side support frame 49L. A right portion of the inner roof 16A is attached to a lower portion of the second side support frame 49R.

Figure 6:
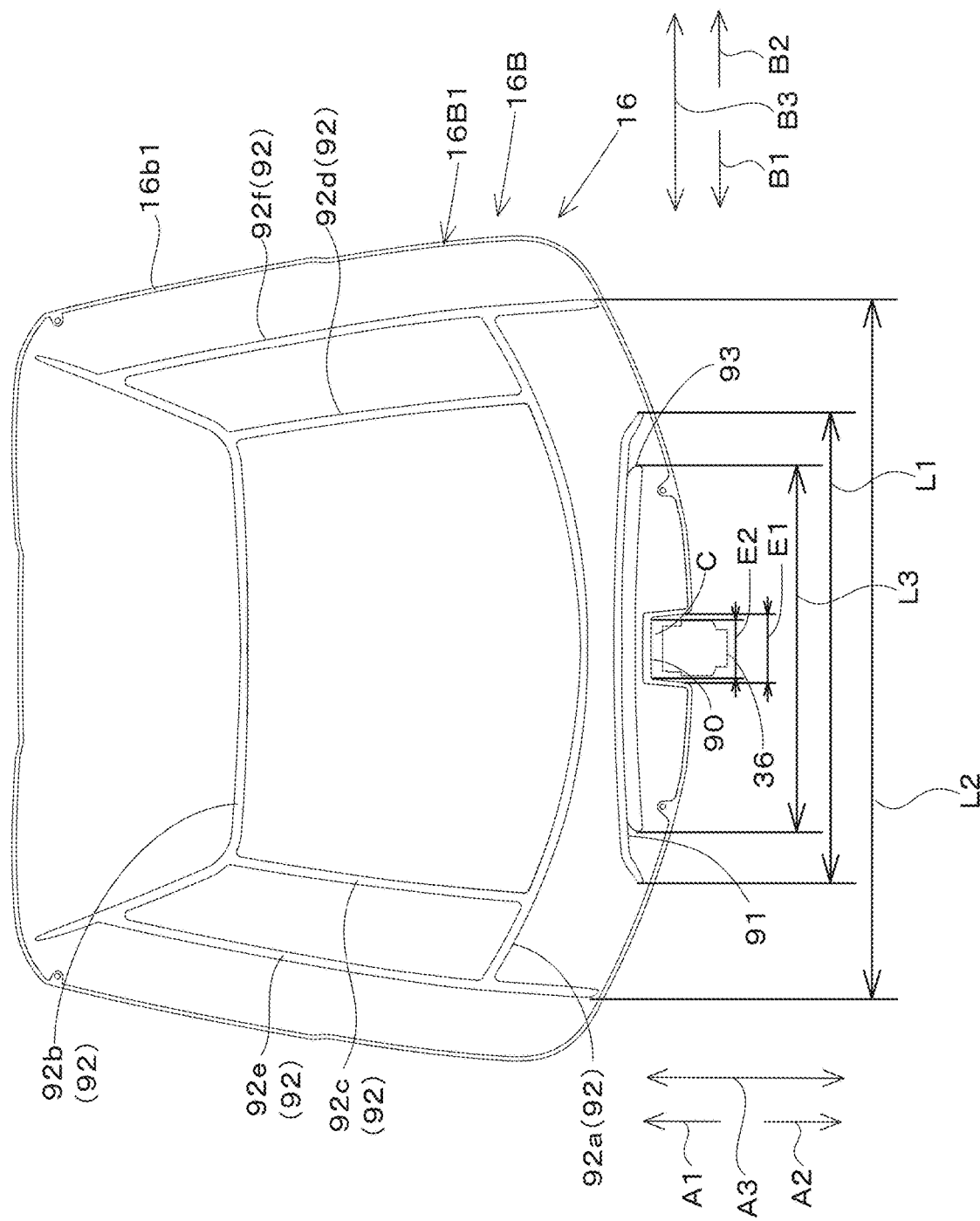
FIG. 6 is a plan view of the roof.

As illustrated in FIGS. 5A and 5B, the outer roof 16B is provided so as to cover the inner roof 16A from above. The outer roof 16B includes an upper member 16B1 and a lower member 16B2. The upper member 16B1 defines an upper surface of the outer roof 16B. As illustrated in FIG. 6, the upper member 16B1 is a member substantially in the shape of a quadrangle in plan view. As illustrated in FIGS. 5A and 5B, the upper member 16B1 slopes downward with increasing distance from the middle toward the periphery, and has outer edges 16b1 projecting in a horizontal outward direction.

The lower member 16B2 defines a lower surface of the outer roof 16B, is a member substantially in the shape of a quadrangle in plan view, and corresponds to the upper member 16B1. As illustrated in FIGS. 5A and 5B, the lower member 16B2 has peripheral portions sloping upward in outward directions, and outer edges 16b2 project in a horizontal outward direction. The outer edges 16b2 of the lower member 16B2 are connected to the outer edges 16b1 of the upper member 16B1 by means of, for example, welding or bolting, and united with the upper member 16B1.

As illustrated in FIG. 5A, a front portion of the outer roof 16B is attached to an upper portion of the front support frame 49A. A rear portion of the outer roof 16B is attached to an upper portion of the rear support frame 49B. As illustrated in FIG. 5B, a left portion of the outer roof 16B is attached to an upper portion of the first side support frame 49L. A right portion of the outer roof 16B is attached to an upper portion of the second side support frame 49R.

As illustrated in FIG. 6, the roof 16 (outer roof 16B) has a cutout 90 in the upper surface thereof. The cutout 90 is a cutout extending along the top-bottom direction, and is a recess depressed from a periphery of the roof 16 toward the center of the roof 16. For example, the monitoring device 36 is disposed in the space of the cutout 90. In the present preferred embodiment, the cutout 90 is formed in the rear of the roof 16, more specifically, formed in the middle of the rear periphery of the roof 16 in the vehicle-width direction B3.

As illustrated in FIG. 6, a dimension E1 of a rear portion of the cutout 90 along the vehicle-width direction B3 is greater than a dimension E2 of a front portion of the cutout 90 along the vehicle-width direction B3. That is, a dimension of the cutout 90 along the vehicle-width direction B3 increases in a front-to-rear direction, and the cutout 90 has opposite sides diverging in the front-to-rear direction in plan view. Note that, although the dimension of the cutout 90 along the vehicle-width direction B3 increases in the front-to-rear direction in the present preferred embodiment, the dimension E1 of the rear portion of the cutout 90 along the vehicle-width direction B3 and the dimension E2 of the front portion of the cutout 90 along the vehicle-width direction B3 may be equal to each other, and the cutout 90 may have a shape in which the dimension along the vehicle-width direction B3 is uniform along the front-to-rear direction (may have a straight shape).

Figure 10:
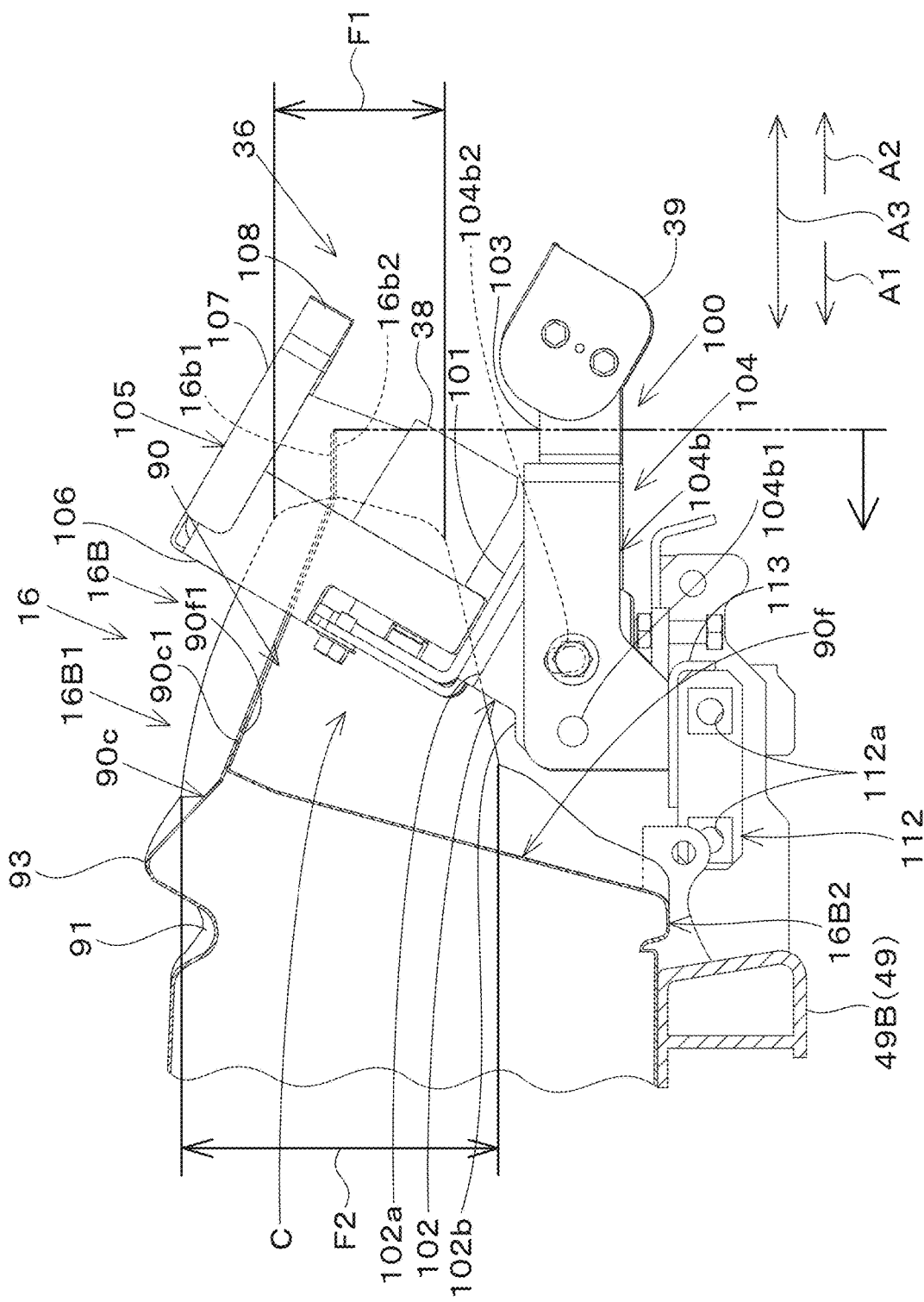
FIG. 10 is a cross-sectional view showing relative positions of a rear portion of the roof and a monitoring device.

Furthermore, as illustrated in FIG. 10, a thickness F1 of the rear portion of the cutout 90 along the top-bottom direction is smaller than a thickness F2 of the front portion of the cutout 90 along the top-bottom direction. That is, the thickness of the cutout 90 along the top-bottom direction decreases in the front-to-rear direction, and the cutout 90 tapers in side view.

As illustrated in FIG. 7A, the monitoring device 36 disposed rearward of the support frame 49 is located in the cutout 90, and at least a portion of the monitoring device 36 is located higher than the upper surface of the roof 16. Note that, although the cutout 90 is formed in the middle of the rear portion of the upper surface of the roof 16 along the vehicle-width direction B3 in the present preferred embodiment, the position of the cutout 90 may be at a location other than the rear portion of the upper surface of the roof 16, provided that at least a portion of the electric device (monitoring device) 36 can be located higher than the upper surface of the roof 16. Furthermore, although the monitoring device 36 as the electric device 36 is disposed in the cutout 90, an electric device 36 other than the monitoring device 36, such as an illuminating lamp 81, may be disposed in the cutout 90.

As illustrated in FIG. 7A, the cutout 90 has a first inner side wall 90a, a second inner side wall 90b, and a first inclined wall 90c which are formed in the upper member 16B1, and has a third inner side wall 90d, a fourth inner side wall 90e, and a second inclined wall 90f which are formed in the lower member 16B2.

As illustrated in FIG. 7A, the first inner side wall 90a is a wall which defines an upper left portion of the cutout 90. The first inner side wall 90a slopes from upper left toward lower right and a wall surface thereof faces upper right at the periphery of the upper member 16B1. At the bottom of the first inner side wall 90a, there is a first fringe portion 90a1 which extends rightward.

As illustrated in FIG. 7A, the second inner side wall 90b is a wall which defines an upper right portion of the cutout 90. The second inner side wall 90b slopes from upper right toward lower left and a wall surface thereof faces upper left at the periphery of the upper member 16B1. That is, the first inner side wall 90a and the second inner side wall 90b are spaced apart from each other along the vehicle-width direction B3. At the bottom of the second inner side wall 90b, there is a second fringe portion 90b1 which extends leftward.

Figure 7B:
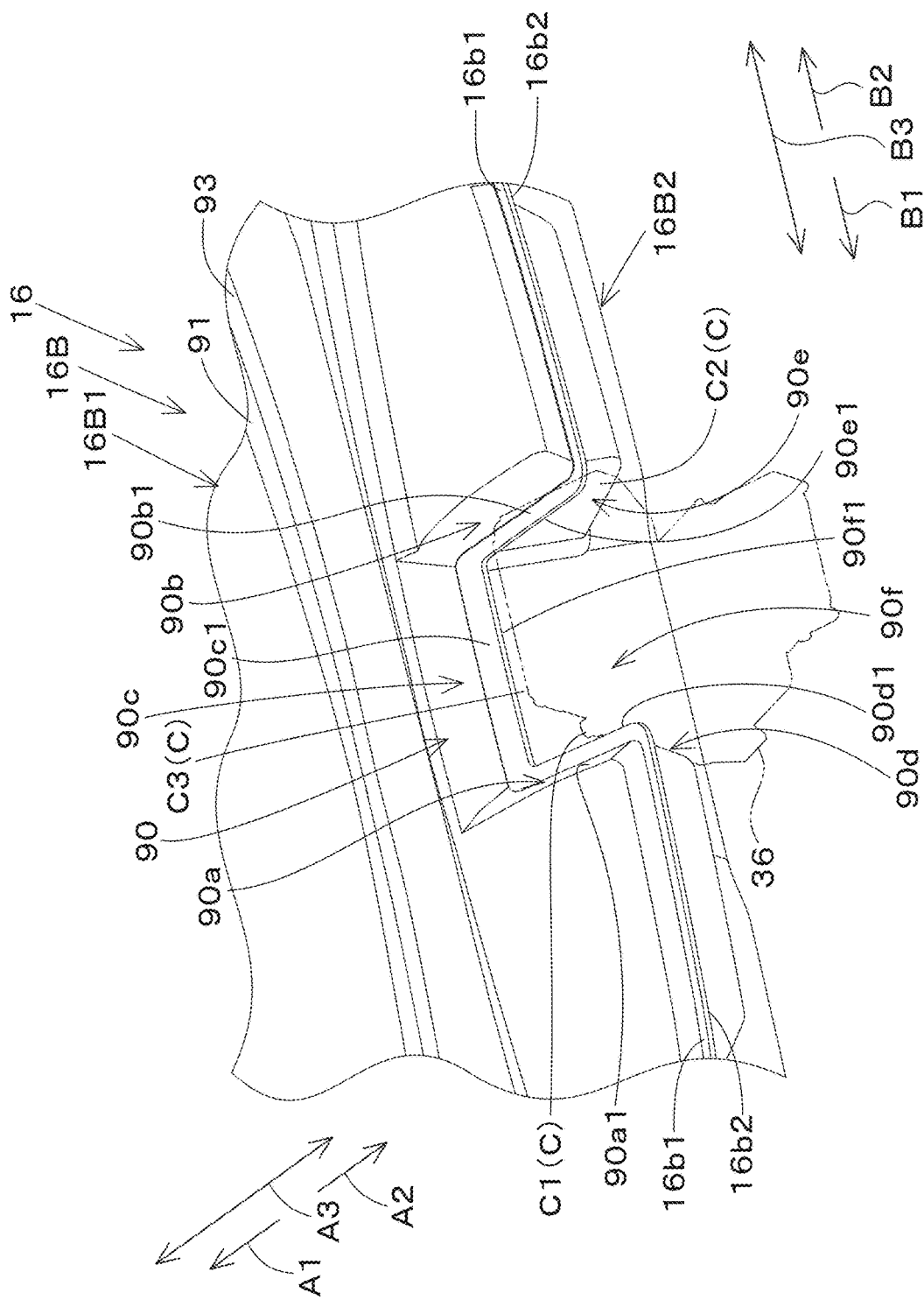
FIG. 7B is a perspective view of the cutout in the roof as viewed from the rear left side.

As illustrated in FIG. 7B, the first inclined wall 90c is a wall which defines an upper front portion of the cutout 90. The first inclined wall 90c slopes from the upper surface of the upper member 16B1 toward lower rear, and a wall surface thereof faces upper rear. That is, the first inclined wall 90c slopes from upper front toward lower rear. At the bottom of the first inclined wall 90c, there is a third fringe portion 90c1 which extends toward lower rear. A left portion of the first inclined wall 90c is connected to a front portion of the first inner side wall 90a, and a right portion of the first inclined wall 90c is connected to a front portion of the second inner side wall 90b. Accordingly, as illustrated in FIG. 7B, the first inner side wall 90a, the second inner side wall 90b, and the first inclined wall 90c define a continuous wall surface and a recess.

As illustrated in FIG. 7A, the third inner side wall 90d is a wall which defines a lower left portion of the cutout 90. The third inner side wall 90d slopes from upper right toward lower left and a wall surface thereof faces lower right at the periphery of the lower member 16B2. At the top of the third inner side wall 90d, there is a fourth fringe portion 90d1 which extends rightward.

As illustrated in FIG. 7A, the fourth inner side wall 90e is a wall which defines an upper right portion of the cutout 90. The fourth inner side wall 90e slopes from upper left toward lower right and a wall surface thereof faces lower left at the periphery of the lower member 16B2. That is, the third inner side wall 90d and the fourth inner side wall 90e are spaced apart from and face each other along the vehicle-width direction B3. At the top of the fourth inner side wall 90e, there is a fifth fringe portion 90e1 which extends leftward.

As illustrated in FIG. 7B, the second inclined wall 90f is a wall which defines a lower front portion of the cutout 90. As illustrated in FIG. 10, the second inclined wall 90f slopes from the lower surface of the lower member 16B2 toward upper rear, and a wall surface thereof faces lower rear. That is, the second inclined wall 90f slopes from lower front toward upper rear. At the top of the second inclined wall 90f, there is a sixth fringe portion 90f1 which extends toward lower rear. A left portion of the second inclined wall 90f is connected to a front portion of the third inner side wall 90d, and a right portion of the second inclined wall 90f is connected to a front portion of the fourth inner side wall 90e. Accordingly, the third inner side wall 90d, the fourth inner side wall 90e, and the second inclined wall 90f form a continuous wall surface, and define a recess.

Note that, although the cutout 90 is formed in the middle of the rear periphery of the roof 16 in the present preferred embodiment, the cutout 90 may be formed in some other portion of the periphery of the roof 16 other than the rear periphery, for example, in a side periphery of the roof 16. In such a case, an electric device such as the monitoring device 36 disposed on a side of the working vehicle 1 can be located in the space of the cutout 90.

Figure 8:
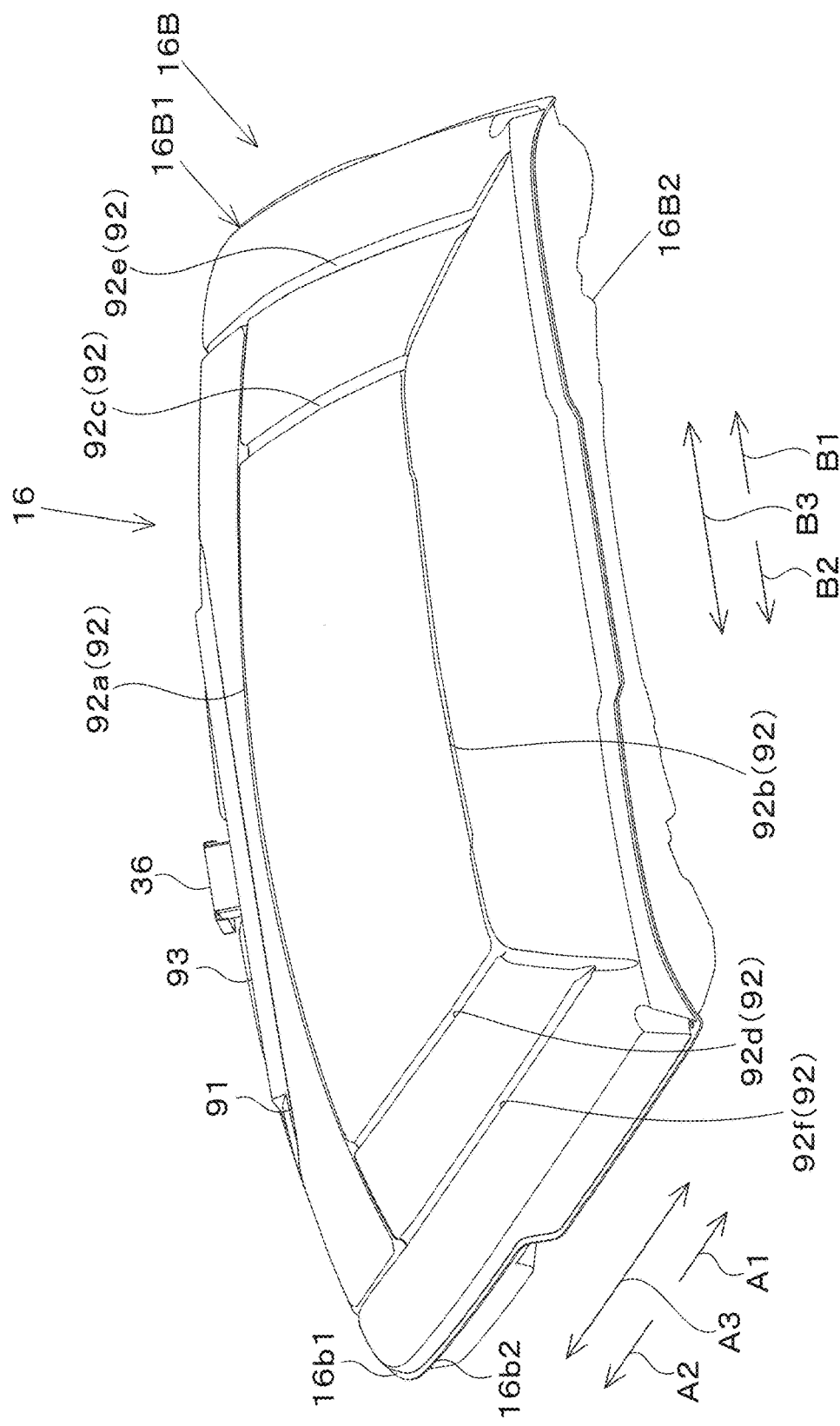
FIG. 8 is a perspective view of the roof as viewed from the front right side.

Furthermore, as illustrated in FIGS. 6 and 8, the roof 16 (outer roof 16B and upper member 16B1) has a first groove 91, a second groove 92, and a flow-stopping portion 93. The first groove 91 and the second groove 92 are grooves depressed downward from the upper surface of the roof 16, and are channels which guide rainwater or the like flowing on the upper surface of the roof 16 toward the periphery of the roof 16. The first groove 91 and the second groove 92 extend along prescribed directions and guide rainwater along such directions.

As illustrated in FIGS. 6 and 8, the first groove 91 is formed in the upper surface of the upper member 16B1 (outer roof 16B, roof 16) on the opposite side of the cutout 90 from the monitoring device 36, and extends in direction(s) away from the cutout 90. Specifically, the first groove 91 is formed between the center of the upper member 16B1 and the cutout 90, and extends in direction(s) away from the monitoring device 36. In the present preferred embodiment, the first groove 91 is formed in the rear portion of the roof 16 in front of the cutout 90, and extends along the vehicle-width direction B3. The first groove 91 curves rearward from front with increasing distance from the middle of the first groove 91 along the vehicle-width direction B3 outward.

Figure 9:
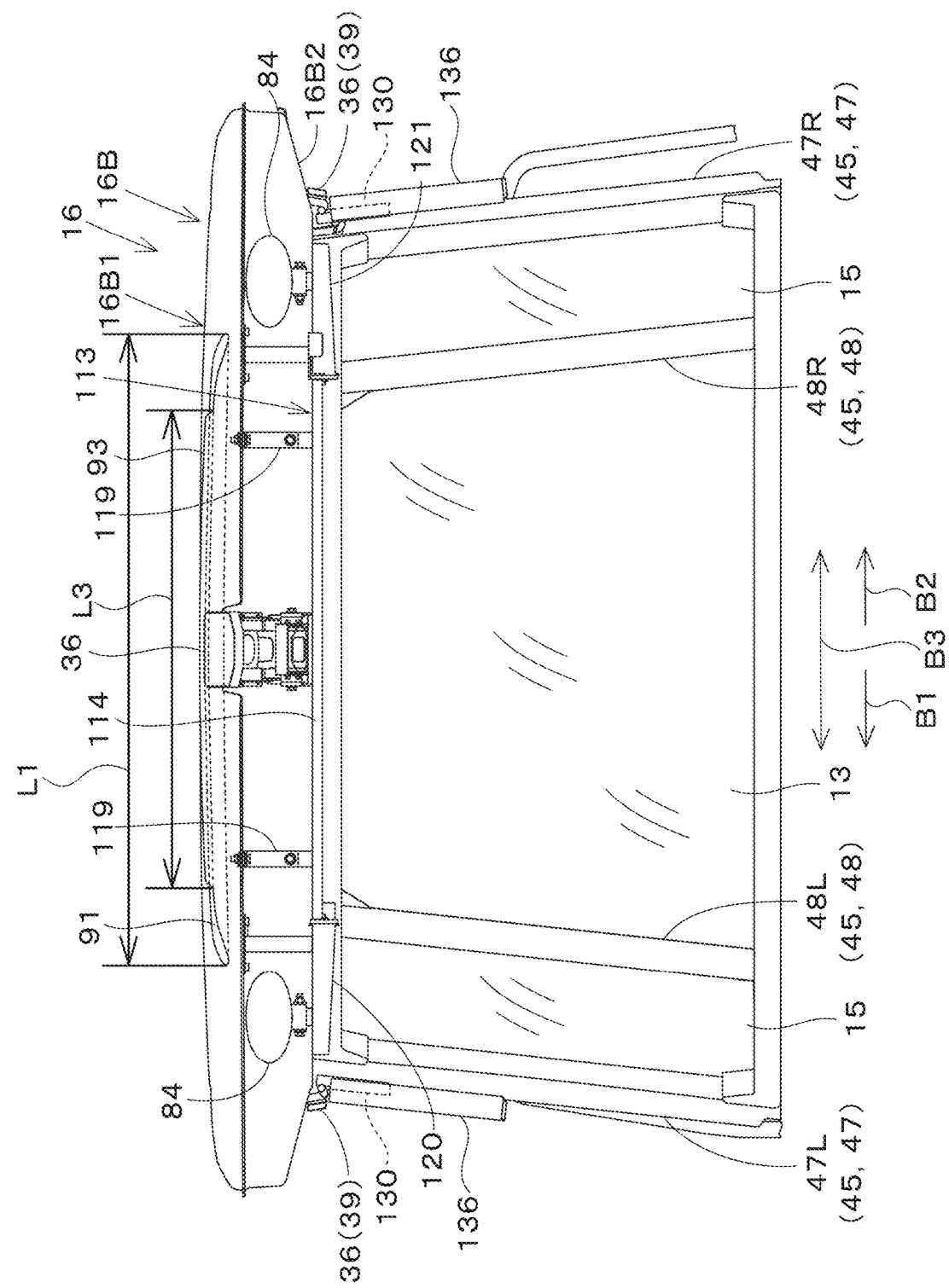
FIG. 9 is a back view of an upper portion of the protection mechanism.

As illustrated in FIG. 9, the first groove 91 extends to portions outward of side edges of a window which is provided between a plurality of pillars 45 and which is configured to be opened and closed. In the present preferred embodiment, the window includes the rear window glass 13, and one of the opposite end portions (left end portion) of the first groove 91 extends to a portion outward (leftward) of the left side edge of the rear window glass 13. On the other hand, the other of the opposite end portions (right end portion) of the first groove 91 extends to a portion outward (rightward) of the right side edge of the rear window glass 13. Furthermore, the first groove 91 extends to a portion outward of one of the plurality of pillars 45 which support the roof 16 and to another portion outward of another of the plurality of pillars 45. In the present preferred embodiment, one of the opposite end portions (left end portion) of the first groove 91 extends to a portion outward (leftward) of the first rear pillar 48L, which is one of the pair of rear pillars 48 supporting the rear portion of the roof 16. On the other hand, the other of the opposite end portions (right end portion) of the first groove 91 extends to a portion outward (rightward) of the second rear pillar 48R, which is the other of the pair of rear pillars 48 supporting the rear portion of the roof 16. Furthermore, as illustrated in FIG. 6, one of the opposite end portions (left end portion) of the first groove 91 curves diagonally leftward and rearward, whereas the other of the opposite end portions (right end portion) of the first groove 91 curves diagonally rightward and rearward.

As illustrated in FIGS. 6 and 8, the second groove 92 is formed in the upper surface of the upper member 16B1 (outer roof 16B, roof 16) on the opposite side of the first groove 91 from the monitoring device 36, and extends in direction(s) away from the monitoring device 36. As illustrated in FIG. 5A, the second groove 92 differs in depth from the first groove 91, and a depth D2 of the second groove 92 is less than a depth D1 of the first groove 91. In other words, the depth D1 of the first groove 91 is greater than the depth D2 of the second groove 92. Furthermore, as illustrated in FIG. 6, a dimension L2 of the second groove 92 along the vehicle-width direction B3 is greater than a dimension L1 of the first groove 91 along the vehicle-width direction B3. Details of the second groove 92 are as follows: the second groove 92 includes a first portion 92a, a second portion 92b, a third portion 92c, a fourth portion 92d, a fifth portion 92e, and a sixth portion 92f. The first portion 92a is provided in front of the first groove 91, and curves forward from rear with increasing distance from the middle of the first portion 92a along the vehicle-width direction B3 outward. In the present preferred embodiment, the first portion 92a curves diagonally leftward and forward and curves diagonally rightward and forward from the middle in the vehicle-width direction B3, and the first portion 92a (second groove 92) curves in directions differing from those of the first groove 91.

As illustrated in FIGS. 6 and 8, the second portion 92b is formed in a front portion of the upper member 16B1 (outer roof 16B, roof 16) and located forward of the first portion 92a. That is, the first groove 91, the first portion 92a, and the second portion 92b are arranged in this order from the rear. The second portion 92b has an intermediate portion extending along the vehicle-width direction B3, a left end portion extending from the left end of the intermediate portion and curving diagonally leftward and forward, and a right end portion extending from the right end of the intermediate portion and curving diagonally rightward and forward.

As illustrated in FIGS. 6 and 8, the third portion 92c, the fourth portion 92d, the fifth portion 92e, and the sixth portion 92*f* are formed in left and right portions of the upper member 16B1 (outer roof 16B, roof 16). The third portion 92*c*, the fourth portion 92*d*, the fifth portion 92*e*, and the sixth portion 92*f* each have a front portion inclined in the inward widthwise direction and a rear portion inclined in the outward widthwise direction. The third portion 92*c* and the fourth portion 92*d* correspond to each other and are spaced apart from each other along the vehicle-width direction B3. The fifth portion 92*e* and the sixth portion 92*f* correspond to each other and are spaced apart from each other along the vehicle-width direction B3.

Specifically, the third portion 92*c* is formed in the left portion of the upper member 16B1 (outer roof 16B, roof 16). The third portion 92*c* extends rearward from the left end of the intermediate portion of the second portion 92*b* to a left end portion of the first portion 92*a*. The fourth portion 92*d* is formed in the right portion of the upper member 16B1 (outer roof 16B, roof 16). The fourth portion 92*d* extends rearward from the right end of the intermediate portion of the second portion 92*b* to a right end portion of the first portion 92*a*.

The fifth portion 92*e* is formed in the left portion of the upper member 16B1 (outer roof 16B, roof 16) and is provided leftward of the third portion 92*c*. The fifth portion 92*e* extends rearward from a left end portion of the second portion 92*b*, connects to the left end of the first portion 92*a*, and extends to the rear periphery of the upper member 16B1. The sixth portion 92*f* is formed in the right portion of the upper member 16B1 (outer roof 16B, roof 16) and is provided rightward of the fourth portion 92*d*. The sixth portion 92*f* extends rearward from a right end portion of the second portion 92*b*, connects to the right end of the first portion 92*a*, and extends to the rear periphery of the upper member 16B1.

As illustrated in 5A, 8, and 10, the flow-stopping portion 93 protrudes upward from the upper surface of the upper member 16B1 (outer roof 16B, roof 16) and stops rainwater from flowing toward the monitoring device 36 on the upper surface of the upper member 16B1. Specifically, the flow-stopping portion 93 extends between the first groove 91 and the cutout 90, and is provided at the upper surface of the upper member 16B1 (outer roof 16B, roof 16). In the present preferred embodiment, the flow-stopping portion 93 is provided in a rear portion of the upper member 16B1, and protrudes upward in front of the first groove 91. As illustrated in FIG. 5A, in the present preferred embodiment, an upper edge of the flow-stopping portion 93 is located higher than the center of the upper member 16B1, and is located higher than, at least, the surface of the upper member 16B1 except the flow-stopping portion 93. That is, the upper edge of the flow-stopping portion 93 is a portion (uppermost portion) located highest in the upper member 16B1 (outer roof 16B, roof 16). Furthermore, as illustrated in FIG. 9, a dimension L3 of the flow-stopping portion 93 along the vehicle-width direction B3 is less than the dimension L1 of the first groove 91 along the vehicle-width direction B3. Specifically, one of the opposite ends (left end) of the flow-stopping portion 93 is located rightward of one of the opposite ends (left end) of the first groove 91, whereas the other of the opposite ends (right end) of the flow-stopping portion 93 is located leftward of the other of the opposite ends (right end) of the first groove 91.

The following description discusses the monitoring devices 36 provided on the working vehicle 1 in detail. First, the following discusses a configuration and attachment of a monitoring device 36 which is provided at the rear of the working vehicle 1 and which monitors an area rearward of the vehicle body 5. As illustrated in FIG. 10, the monitoring device 36 provided at the rear of the working vehicle 1 is located rearward of the support frame 49 and includes a fixing bracket 100 to fix the obstacle detector 38 and the camera unit 39, and a top cover 105 which covers the obstacle detector 38 and the camera unit 39 from an upper side.

Figure 11:
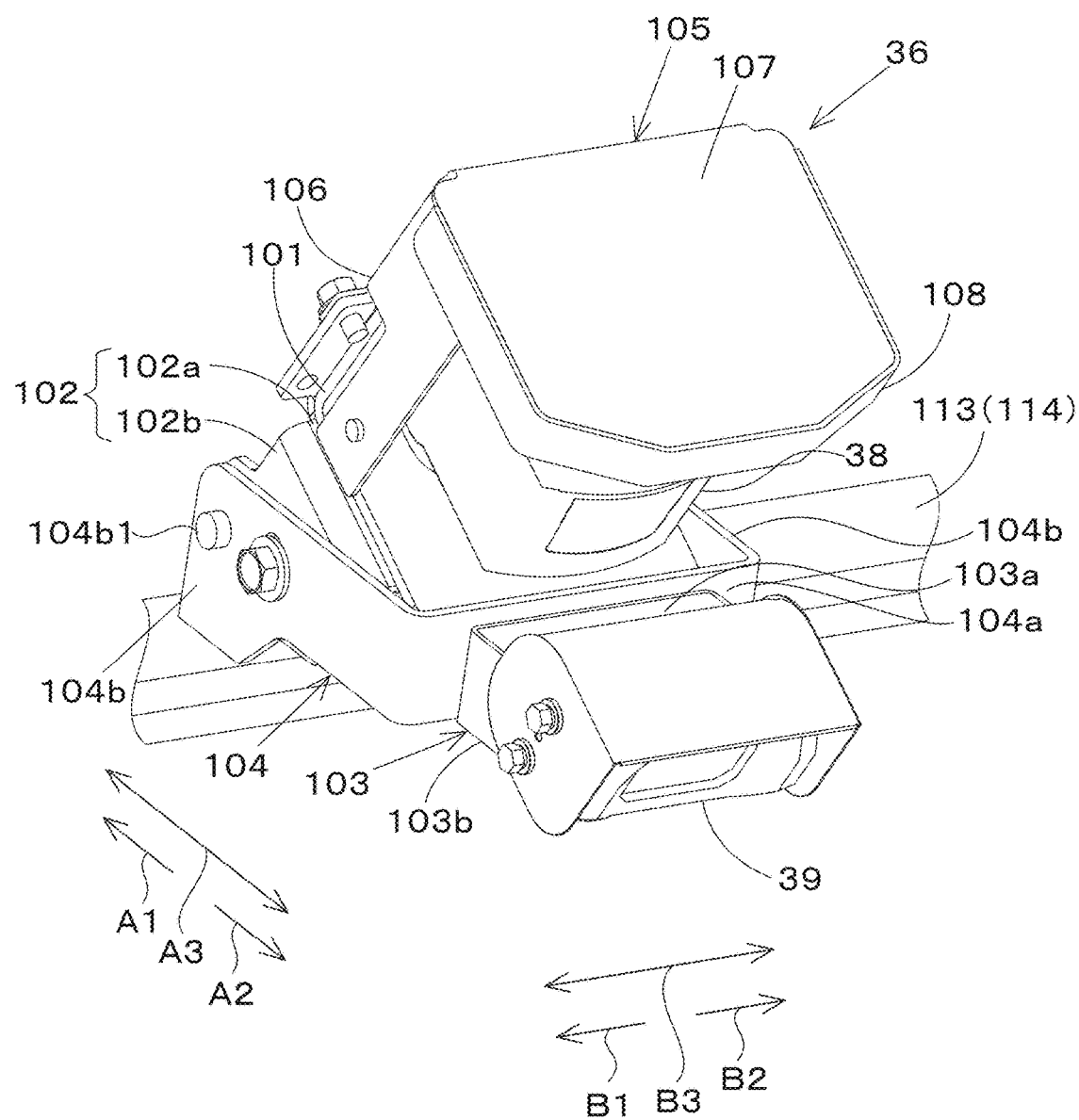
FIG. 11 is a perspective view of the monitoring device as viewed from the rear left side.
Figure 12:
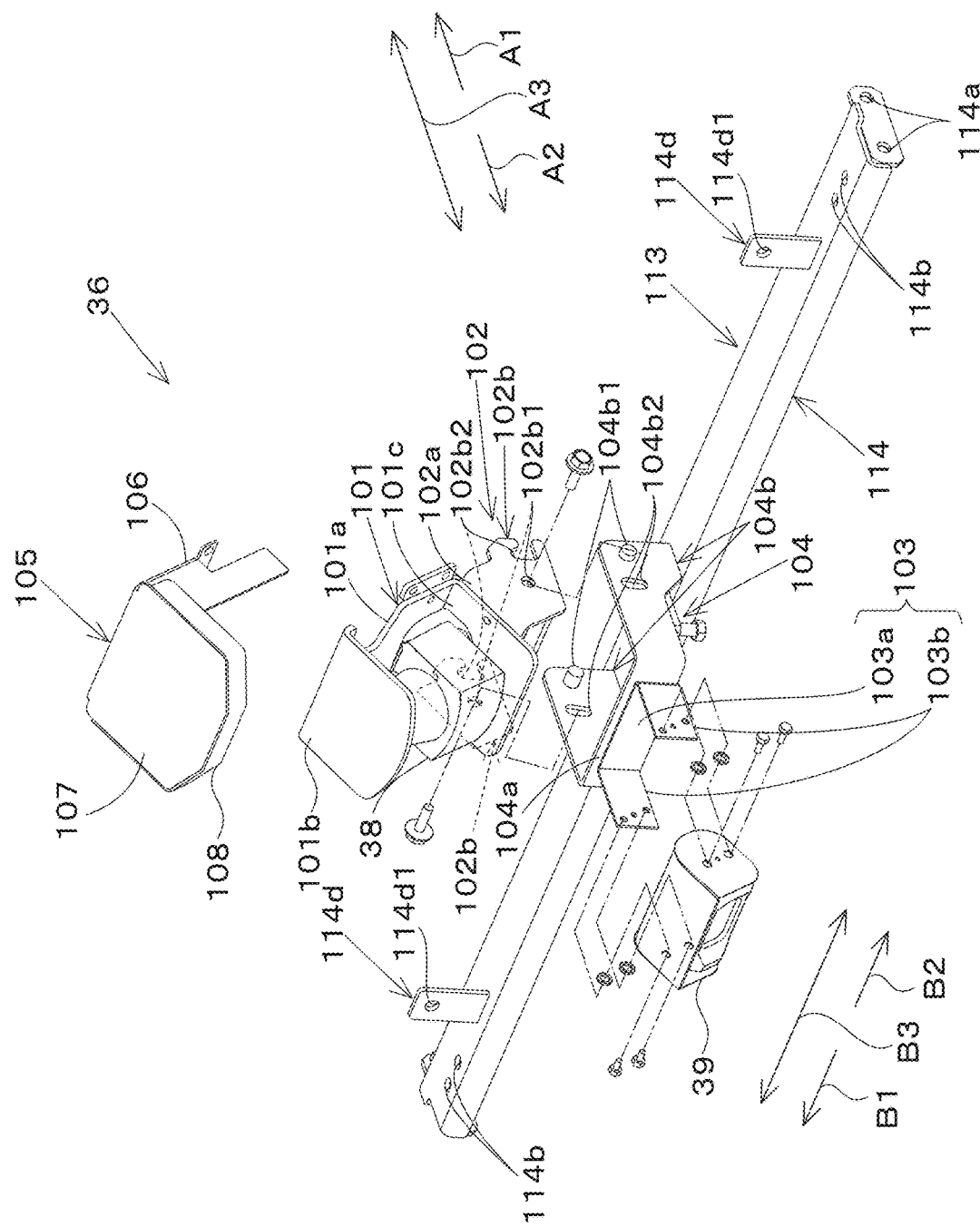
FIG. 12 is a perspective view showing how an obstacle detector, a camera unit, and a top cover are attached, as viewed from the rear right side.

As illustrated in FIGS. 10, 11, and 12, the fixing bracket 100 includes a first holder 101, a second holder 102, a third holder 103, and a fourth holder 104. The first holder 101, the second holder 102, the third holder 103, and the fourth holder 104 are each formed by, for example, subjecting a thick steel plate to bending. As illustrated in FIGS. 11 and 12, the first holder 101 has the obstacle detector 38 fixed thereto, and is, for example, substantially in a square U shape in a side view. The first holder 101 includes a first fixing plate 101*a* to which the obstacle detector 38 is attached with a fastener (e.g., bolt), a second fixing plate 101*b* which extends diagonally rearward and downward from an upper edge of the first fixing plate 101*a*, and a third fixing plate 101*c* which extends diagonally rearward and downward from a lower edge of the first fixing plate 101*a*. That is, the second fixing plate 101*b* and the third fixing plate 101*c* face each other, with the obstacle detector 38 disposed between the second fixing plate 101*b* and the third fixing plate 101*c*.

As illustrated in FIG. 12, the second holder 102 is, for example, substantially in a square U shape in front view, and includes a first fixing plate 102*a*, and second fixing plates 102*b* which extend downward from the opposite ends of the first fixing plate 102*a* in the vehicle-width direction B3. The first fixing plate 102*a* has fixed thereto the third fixing plate 101*c* of the first holder 101 by a fastener (e.g., bolt) or welding. The second fixing plates 102*b* each have, in a central portion thereof, a hole 102*b*1 passing through the second fixing plate 102*b* along the vehicle-width direction B3. Furthermore, the second fixing plates 102*b* each have a locking portion 102*b*2, which is a cutout depressed rearward from front and depressed upward.

As illustrated in FIGS. 11 and 12, the third holder 103 is, for example, substantially in a square U shape in plan view, and includes a first fixing plate 103*a*, and second fixing plates 103*b* which extend rearward from opposite ends of the first fixing plate 103*a* in the vehicle-width direction B3. As illustrated in FIG. 13, the second fixing plates 103*b* each have, in an upper rear portion and a lower rear portion thereof, holes 103*b*1 passing through the second fixing plate 103*b* along the vehicle-width direction B3. The holes 103*b*1 are long holes each extending along the circumference of an imaginary circle centered on the midpoint (pivot axis) between the upper hole 103*b*1 and the lower hole 103*b*1. The camera unit 39 is attached to the third holder 103 with fasteners such as bolts inserted through the holes 103*b*1. Note that, when fasteners are loosened, as illustrated in FIG. 13, the holes 103*b*1 are guided by the fasteners, making it possible to allow the camera unit 39 to pivot on the pivot axis to adjust the optical axis of the camera unit 39.

As illustrated in FIGS. 11 and 12, the fourth holder 104 supports the second holder 102 and the third holder 103, and is, for example, substantially in a square U shape in plan view. The fourth holder 104 includes a first fixing plate 104*a*, and second fixing plates 104*b* which extend forward from opposite ends of the first fixing plate 104*a* in the vehicle-width direction B3. The first fixing plate 104*a* has, fixed to the rear thereof, the first fixing plate 103*a* of the third holder 103 by a fastener (e.g., bolt) or welding. The second fixing plates 104*b* each have, passing through a front portion thereof, a shaft member 104b1 extending along the vehicle-width direction B3. The shaft members 104b1 are fastened to the locking portions 102b2 of the second holder 102. Furthermore, the second fixing plates 104b each have a hole 104b2 passing therethrough along the vehicle-width direction B3 in its portion rearward of the shaft member 104b1. As illustrated in FIG. 13, the holes 104b2 are long holes each extending along the circumference of an imaginary circle centered on the central axis of the shaft member 104b1. Note that, when fasteners are loosened, the holes 104b2 are guided by the fasteners, making it possible to allow the second holder 102 to pivot about the pivot axis to adjust the position and angle of the obstacle detector 38.

Note that a configuration of the fixing bracket 100 is not limited to that as described above, provided that the fixing bracket 100 is configured such that the camera unit 39 and the obstacle detector 38 are pivotably supported and thereby the optical axis of the camera unit 39 and the position and angle of the obstacle detector 38 can be adjusted.

As illustrated in FIGS. 10, 11, and 12, the top cover 105 is formed by, for example, subjecting a thick steel plate to bending, and includes a front wall 106, a rear wall 107, and a peripheral wall 108. As illustrated in FIGS. 11 and 10, the front wall 106 covers the obstacle detector 38 and/or the camera unit 39 from an upper front side. In the present preferred embodiment, the front wall 106 defines a front portion of the top cover 105 and convers the obstacle detector 38 from the upper front side. The front wall 106 slopes from upper rear to lower front, has a plate surface facing diagonally forward and upward, and is fixed to the first fixing plate 101a of the first holder 101. The rear wall 107 covers the obstacle detector 38 and/or the camera unit 39 from an upper rear side. In the present preferred embodiment, the rear wall 107 covers the obstacle detector 38 from the upper rear side. The rear wall 107 defines a rear portion of the top cover 105, slopes from upper front to lower rear, and has a plate surface facing diagonally rearward and upward. The peripheral wall 108 extends from the rear edge, left edge, and right edge of the rear wall 107 diagonally forward and downward, and covers the obstacle detector 38 from the upper rear side, from the upper left side, and from the upper right side.

Figure 14:
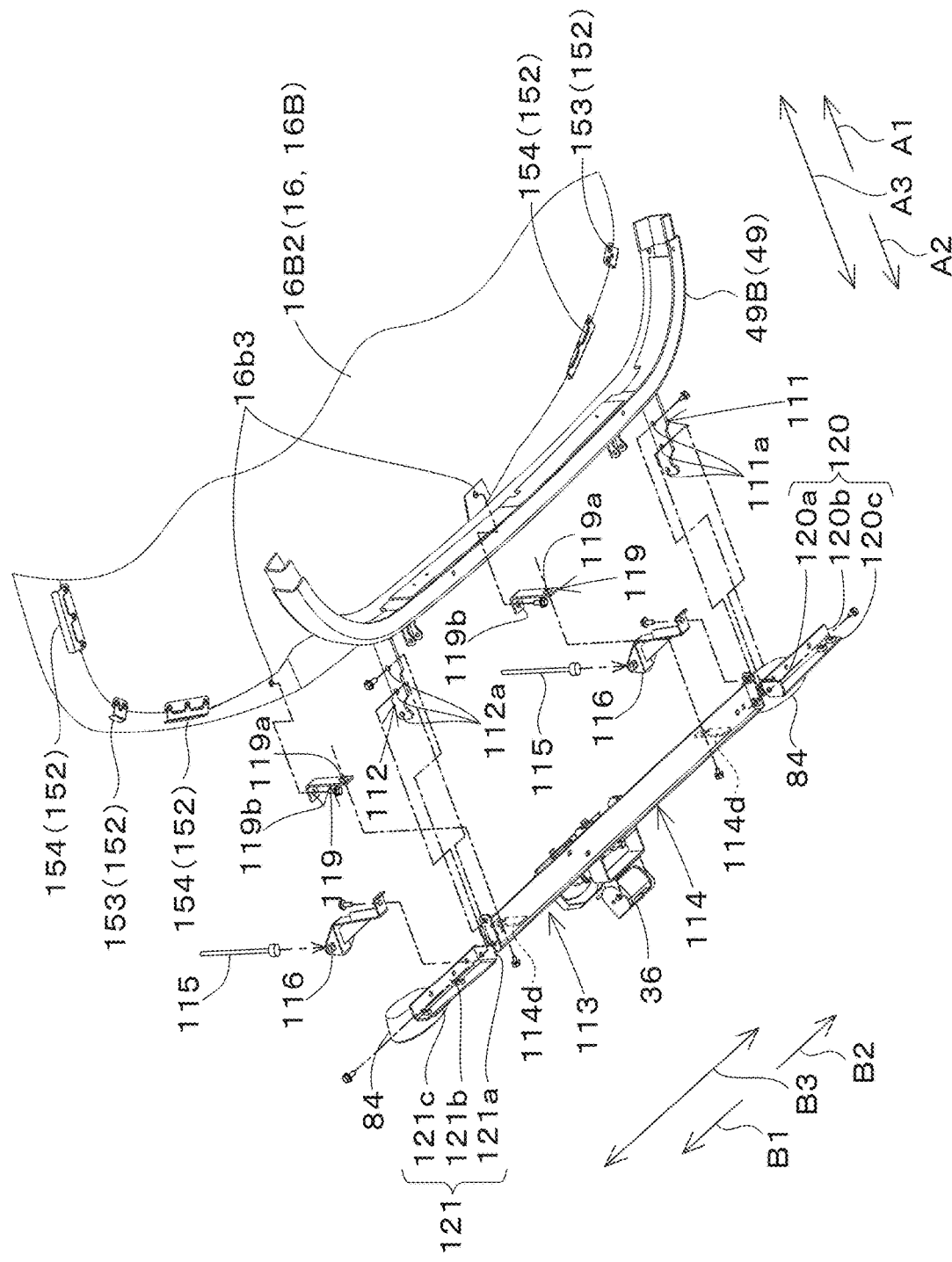
FIG. 14 is a perspective view showing how a connection stay is attached, as viewed from below.

As illustrated in FIG. 14, the protection mechanism 9 includes a first bracket 111, a second bracket 112, and a connection stay 113. The monitoring device 36 provided at the rear of the working vehicle 1 is disposed rearward of the support frame 49 (rear support frame 49B) with the first bracket 111, the second bracket 112, and the connection stay 113 interposed therebetween.

As illustrated in FIG. 14, the first bracket 111 extends rearward from the rear of the protection mechanism 9. Specifically, the first bracket 111 extends rearward of the rear support frame 49B from one of the opposite end portions (left end portion) of the rear support frame 49B in the width direction. The first bracket 111 extends rearward of the rear support frame 49B from the position of the rear support frame 49B that is rightward of the left end of the rear support frame 49B in the width direction. The first bracket 111 extends rearward of the position at which the rear support frame 49B and the roof 16 are attached together. Furthermore, as illustrated in FIG. 10, the rear end of the first bracket 111 is located forward of the rear edge of the roof 16. The front end of the first bracket 111 is attached to the rear support frame 49B by welding or other method or material. The first bracket 111 is a long plate-shaped member that is long in the front-rear direction A3, and is disposed such that a plate surface thereof faces in the vehicle-width direction B3. The first bracket 111 has a plurality of holes 111a which are arranged along the front-rear direction A3 and which pass through the first bracket 111 along the vehicle-width direction B3.

As illustrated in FIG. 14, the second bracket 112 extends rearward from the rear of the protection mechanism 9. Specifically, the second bracket 112 extends rearward of the rear support frame 49B from the other of the opposite end portions (right end portion) of the rear support frame 49B in the width direction. The second bracket 112 extends rearward of the rear support frame 49B from the position of the rear support frame 49B that is leftward of the right end of the rear support frame 49B in the width direction. The second bracket 112 extends rearward of the position at which the rear support frame 49B and the roof 16 are attached together. Furthermore, as illustrated in FIG. 10, the rear end of the second bracket 112 is located forward of the rear edge of the roof 16. The second bracket 112 is spaced apart from the first bracket 111 along the vehicle-width direction B3. The dimensions of the first bracket 111 and the second bracket 112 along the vehicle-width direction B3 are less than the dimension of the support frame 49 along the vehicle-width direction B3, and are less than the dimension of the working vehicle 1 along the vehicle-width direction B3. The front end of the second bracket 112 is attached to the rear support frame 49B by welding or other method or material. The second bracket 112 is a long plate-shaped member that is long in the front-rear direction A3, and is disposed such that a plate surface thereof faces in the vehicle-width direction B3. The second bracket 112 has a plurality of holes 112a which are arranged along the front-rear direction A3 and which pass through the second bracket 112 along the vehicle-width direction B3.

Note that, although the first bracket 111 and the second bracket 112 extend rearward from the support frame 49 in the present preferred embodiment, the positions at which the first bracket 111 and the second bracket 112 are attached are not limited to the support frame 49, provided that the first bracket 111 and the second bracket 112 extend rearward of the protection mechanism 9 from the rear of the protection mechanism 9. For example, the first bracket 111 and the second bracket 112 may extend rearward of the pair of rear pillars 48. In such a case, the first bracket 111 extends rearward of one (left) of the pair or rear pillars 48 which are arranged along the vehicle-width direction B3 (the first rear pillar 48L) from the first rear pillar 48L. On the other hand, the second bracket 112 extends rearward of the other (right) of the pair of rear pillars 48 which are arranged along the vehicle-width direction B3 (the second rear pillar 48R) from the second rear pillar 48R.

As illustrated in FIG. 14, the connection stay 113 bridges the first bracket 111 and the second bracket 112, connects the first bracket 111 and the second bracket 112, and supports the monitoring device 36 on a middle portion thereof in the vehicle-width direction B3. The connection stay 113 also supports the rear portion of the roof 16 separately from the rear support frame 49B. Specifically, the connection stay 113 includes a bridging part 114 and a pair of support brackets 119.

As illustrated in FIG. 12, the bridging part 114 is a long plate-shaped member extending along the vehicle-width direction B3, and is formed by, for example, subjecting a thick steel plate to bending. The bridging part 114 has, in one of the opposite end portions (left end portion) thereof, holes 114a passing through the bridging part 114 along the vehicle-width direction B3. Insertion of fasteners such as bolts into the holes 114a and the holes 111a of the first bracket 111 connects the left end portion of the bridging part 114 and the first bracket 111. The bridging part 114 has, in the other of the opposite end portions (right end portion) thereof, holes 114a passing through the bridging part 114 along the vehicle-width direction B3, similar to the one of the opposite end portions. Insertion of fasteners such as bolts into the holes 114a and the holes 112a of the second bracket 112 connects the right end portion of the bridging part 114 and the second bracket 112. Note that, although the connection connecting the bridging part 114 with the first bracket 111 and the second bracket 112 is fasteners such as bolts in the present preferred embodiment, the fasteners do not imply limitation. The bridging part 114 may be connected to the first bracket 111 and the second bracket 112 by welding or other method or material.

Figure 15:
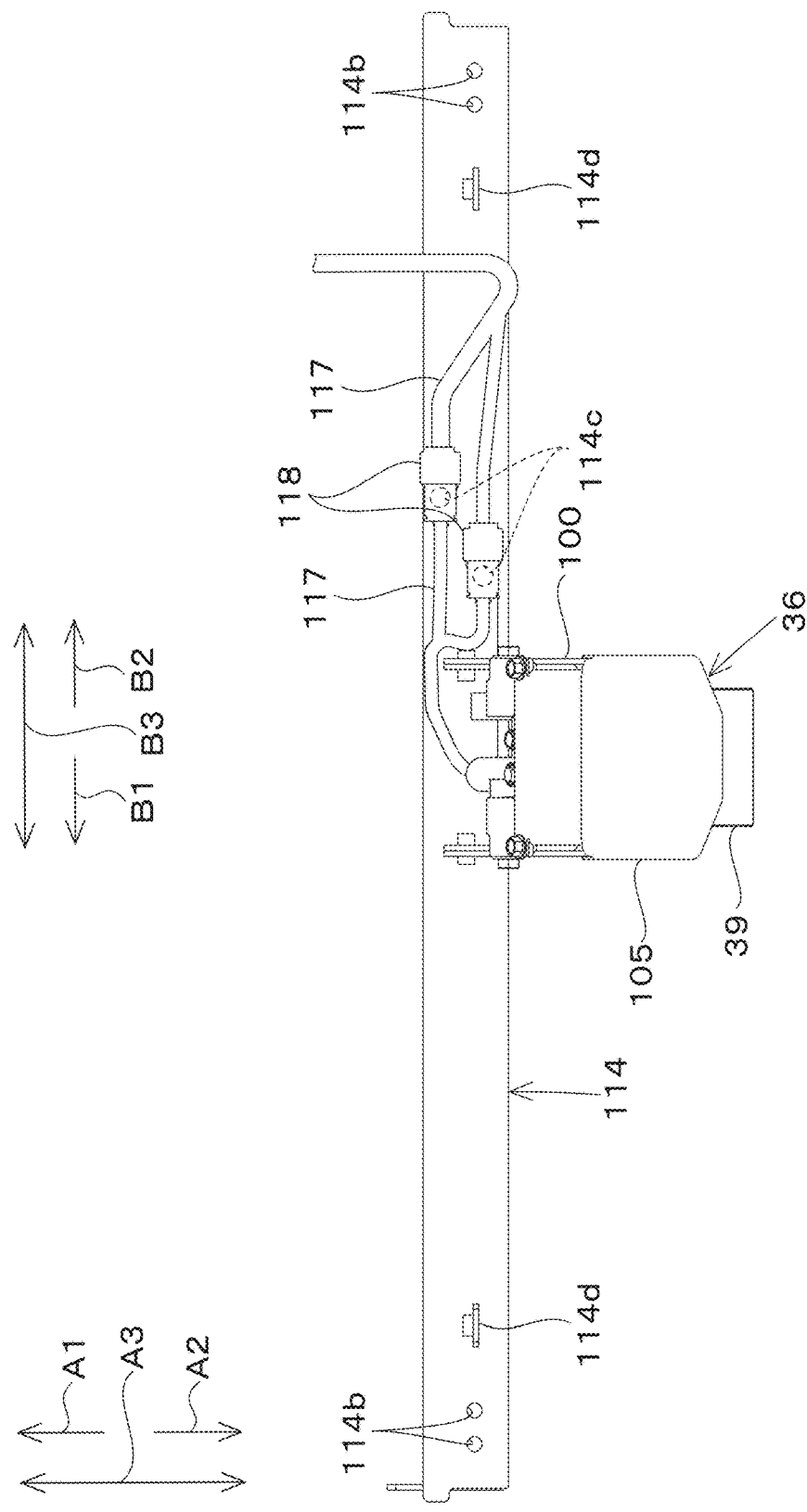
FIG. 15 is a plan view of a monitoring device, a wire, and a bridging part.

As illustrated in FIGS. 12 and 15, the bridging part 114 has the fourth holder 104 fixed to an upper surface of the middle portion thereof in the vehicle-width direction B3 by a fastener (e.g., bolt) or welding, and the monitoring device 36 is supported. Specifically, a lower edge of a front portion of each side surface of the fourth holder 104 and the upper surface of the bridging part 114 are fixed, and the monitoring device 36 projects rearward from the rear edge of the bridging part 114.

Furthermore, the bridging part 114 is configured to have various devices and members attached and fixed thereto. In the present preferred embodiment, the bridging part 114 has a plurality of holes 114b passing through the bridging part 114 along the top-bottom direction. The holes 114b are formed in the opposite end portions of the bridging part 114 in the vehicle-width direction B3 and/or in the middle portion of the bridging part 114. The bridging part 114 is configured to support, for example, an antenna 115 as illustrated in FIG. 14. The antenna 115 is attached to the bridging part 114 via a stand 116 and the holes 114b in the bridging part 114 and a fastener and/or the like. The antenna 115 is, for example, an antenna capable of communication with another working vehicle 1, and may be an antenna capable of communication with another apparatus. Note that a configuration of the antenna 115 is not limited to that as described above, provided that the antenna 115 is attached to the bridging part 114. For example, the following configuration may be used: the antenna 115 is attached to the bridging part 114 via light supporting portions 120 and 121 which are described later.

As illustrated in FIG. 15, the bridging part 114 is configured to have, routed thereon through hole(s) 114c formed in the middle portion thereof, a wire 117 such as an electric wire or a cord which supplies electricity to the monitoring device 36 or connects the monitoring device 36 and the control device 26. Specifically, a connector 118 provided on an intermediate portion of the wire 117 is attached to and fixed to the hole 114c using a fastener or a cable tie. The wire 117 is routed from the monitoring device 36 through a hole in the roof and a grommet 151 attached to the hole. The connector 118 attached to and fixed to the bridging part 114 connects a wire 117 from the monitoring device 36 and a wire 117 from the interior of the roof 16.

The bridging part 114 has, provided on the opposite end portions in the vehicle-width direction B3, attachment members 114d to which a pair of support brackets 119 are attached. The attachment members 114d are provided on the opposite sides (left side and right side) of the fourth holder 104 in the vehicle-width direction B3. That is, the attachment members 114 are provided on the opposite sides of the monitoring device 36 provided at the rear of the working vehicle 1 in the vehicle-width direction B3. The attachment members 114d are, for example, plate-shaped members which are provided inward of the holes 114b in the opposite end portions in the vehicle-width direction B3 and which extend upward. The attachment members 114d are each disposed such that a plate surface faces in the front-rear direction A3, and have a hole 114d1 in an upper portion thereof passing through the attachment member 114d along the front-rear direction A3.

As illustrated in FIG. 9, a pair of the support brackets 119 are provided on the respective attachment members 114d, that is, provided on the respective opposite end portions of the bridging part 114 in the vehicle-width direction B3, and connect the bridging part 114 and the rear portion of the roof 16 to thereby support the rear portion of the roof 16. That is, the pair of support brackets 119 are located on the opposite sides in the vehicle-width direction B3 of the monitoring device 36 provided at the rear of the working vehicle 1. In other words, the monitoring device 36 provided at the rear of the working vehicle 1 is disposed between the pair of support brackets 119. Furthermore, the pair of support brackets 119 support the roof 16 separately from and in addition to supporting of the roof 16 by the support frame 49, thereby more firmly supporting the roof 16. The pair of support brackets 119 are each formed by, for example, subjecting a thick steel plate to bending, and, in side view, each substantially have a letter L shape which has a lower portion extending upward from the bridging part 114, which is bent at an intermediate portion, and which has an upper portion extending forward. The pair of support brackets 119 each have a hole 119a in the lower portion thereof. A fastener such as a bolt is inserted through each hole 119a and the hole 114d1 in a corresponding attachment member 114d of the bridging part 114, and this attaches and fixes the pair of support brackets 119 to the attachment members 114d (bridging part 114). The pair of support brackets 119 each have a hole 119b in an upper portion thereof passing through the support bracket 119 along the top-bottom direction. A fastener such as a bolt is inserted through each hole 119b and a corresponding hole 16b3 in the rear portion of the roof 16, and this connects the pair of support brackets 119 and the roof 16. The holes 16b3 in the rear portion of the roof 16 are formed both in the upper member 16B1 and the lower member 16B2, and the fasteners fasten the attachment members 114d and the upper member 16B1 and the lower member 16B2 of the roof 16 together.

As illustrated in FIGS. 2, 3, and 14, the protection mechanism 9 includes light supporting portion(s) 120 and/or 121. The light supporting portion(s) 120 and/or 121 support(s) rear irradiation lamp(s) 84, which is/are illuminating lamp(s) 81 to illuminate the area rearward of the vehicle body 5. The light supporting portion(s) 120 and/or 121 is/are connected to the first bracket 111 and/or the second bracket 112. In the present preferred embodiment, the protection mechanism 9 includes a pair of the light supporting portions 120 and 121, which are connected to the first bracket 111 and the second bracket 112, respectively. The light supporting portions 120 and 121 are each formed by, for example, subjecting a thick steel plate to bending.

As illustrated in FIG. 14, the light supporting portion 120 which is connected to the first bracket 111 (hereinafter referred to as "first light supporting portion") is connected to one of the opposite sides (left side) of the first bracket 111 in the vehicle-width direction B3 and supports the rear irradiation lamp 84 in a position leftward of the first bracket 111. Specifically, the first light supporting portion 120 includes an attached portion 120a attached to the first bracket 111, an upper plate portion 120b which extends leftward from an upper edge of the attached portion 120a, and a vertical plate portion 120c which connects a rear edge of the attached portion 120a and a rear edge of the upper plate portion 120b. The attached portion 120a is connected to the first bracket 111 by a fastener (e.g., bolt) or welding. The upper plate portion 120b has, on an upper surface thereof, a rear irradiation lamp 84 fixed and attached by a fastener. The vertical plate portion 120c has a hole for attachment of some other device or member. For example, a reflecting plate or the like is attached.

As illustrated in FIG. 14, the light supporting portion 121 which is connected to the second bracket 112 (hereinafter referred to as "second light supporting portion") is connected to the other of the opposite sides (right sides) of the second bracket 112 in the vehicle-width direction B3 and supports the rear irradiation lamp 84 in a position rightward of the second bracket 112. That is, the rear irradiation lamps 84 are disposed by the light supporting portions 120 and 121 outward of the first bracket 111 and the second bracket 112 in outward widthwise directions. Specifically, the second light supporting portion 121 includes an attached portion 121a attached to the second bracket 112, an upper plate portion 121b which extends rightward from an upper edge of the attached portion 121a, and a vertical plate portion 121c which connects a rear edge of the attached portion 121a and a rear edge of the upper plate portion 121b. The attached portion 121a is connected to the second bracket 112 by a fastener (e.g., bolt) or welding. The upper plate portion 121b has, on an upper surface thereof, a rear irradiation lamp 84 attached and fixed by a fastener. The vertical plate portion 121c has a hole for attachment of some other device or member.

The following description discusses the positional relationship between the monitoring device 36 attached at the rear of the working vehicle 1 and the roof 16 and the rear window glass 13. As illustrated in FIGS. 6, 7A, 7B, and 10, front, left, and right portions of the monitoring device 36 are each spaced apart from the periphery of the roof 16 and the cutout 90 with clearance C therebetween. Specifically, the left portion of the top cover 105 is spaced apart from the first fringe portion 90a1 and the fourth fringe portion 90d1 along the vehicle-width direction B3 with a gap C1 therebetween. The right portion of the top cover 105 is spaced apart from the second fringe portion 90b1 and the fifth fringe portion 90e1 along the vehicle-width direction B3 with a gap C2 therebetween. The front portion of the top cover 105 is spaced apart from the third fringe portion 90c1 and the sixth fringe portion 90f1 along the front-rear direction A3 with a gap C3 therebetween.

As illustrated in FIG. 10, at least a portion of the monitoring device 36 is located higher than the upper surface of the roof 16, at least a portion of the monitoring device 36 is located lower than the upper surface of the roof 16, and an upper edge of the monitoring device 36 (top cover 105) is at the same level as the uppermost portion of the roof 16. Specifically, in an area rearward of the middle portion of the cutout 90 in the front-rear direction A3, an upper portion of the front wall 106 of the top cover 105 projects upward relative to the upper surface of the roof 16, and, in an area forward of the middle portion of the cutout 90 in the front-rear direction A3, a lower portion of the front wall 106 of the top cover 105 is located lower than the upper surface of the roof 16 and is located in the space of the cutout 90. Furthermore, the upper edge of the top cover 105 is at the same level as the upper edge of the flow-stopping portion 93, which is the uppermost portion of the roof 16, along the top-bottom direction.

As illustrated in FIG. 10, a lower edge of the camera unit 39 of the monitoring device 36 is located higher than a lower edge of the lower member 16B2. Furthermore, as illustrated in FIG. 16, the lower edge of the camera unit 39 is located higher than a swing shaft about which the rear window glass 13 swing opens and closes, and is located higher than the range of opening/closing movement of the rear window glass 13. More specifically, the lower edge of the camera unit 39 is located higher than the range of movement of the wiper 13a which moves as the rear window glass 13 opens and closes.

The following description discusses the attachment of the monitoring devices 36 which are provided on the left and right sides of the working vehicle 1 and which monitor areas sideward of the vehicle body 5. Note that the monitoring device 36 provided on the left side of the working vehicle 1 and the monitoring device 36 provided on the right side of the working vehicle 1 have the same configuration. Thus, the monitoring device 36 provided on the left side of the working vehicle 1 is described as an example, and the description for the monitoring device 36 provided on the right side of the working vehicle 1 is omitted.

Figure 17:
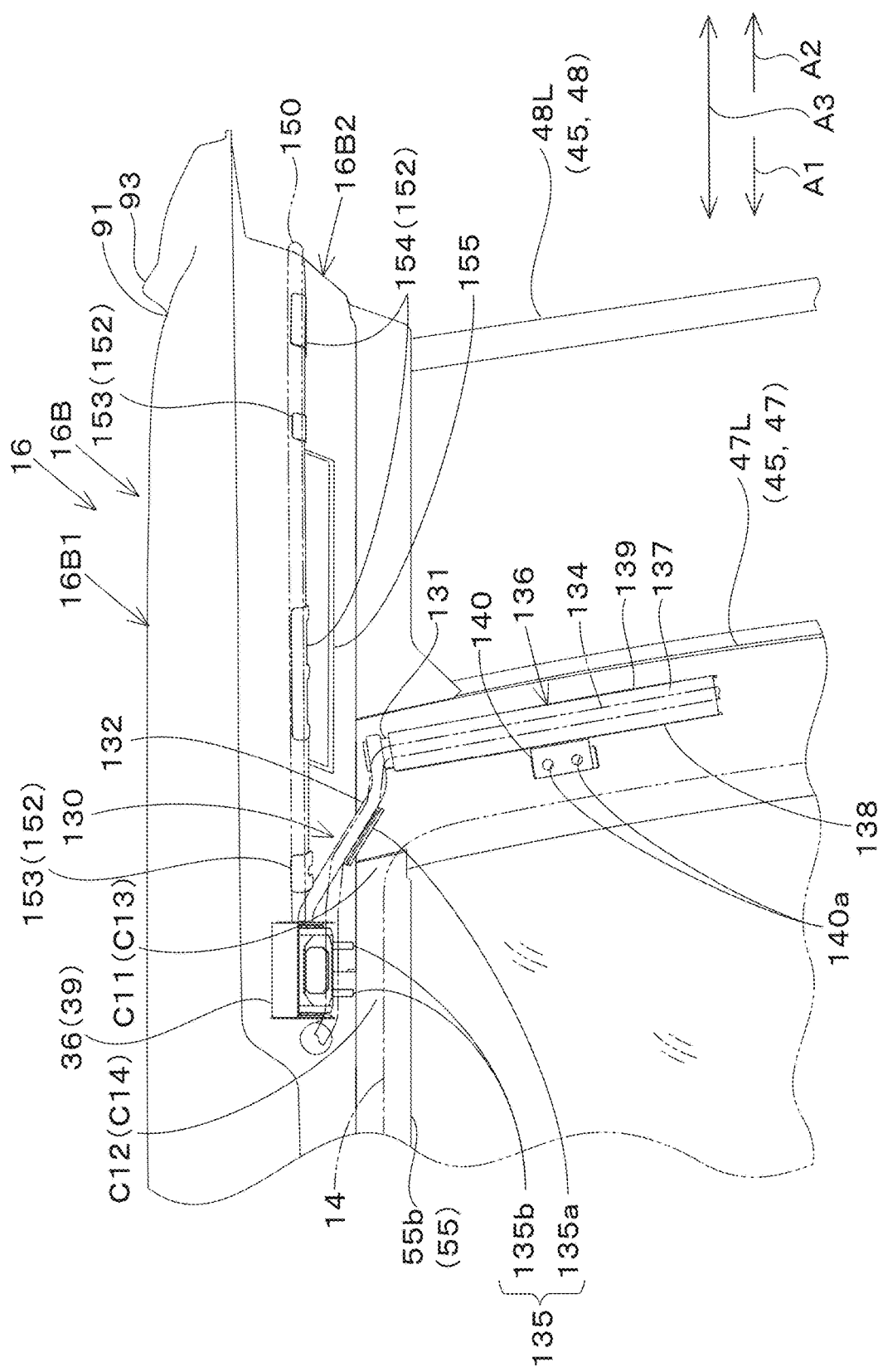
FIG. 17 is a left side view of the roof, an intermediate pillar, a support stay, a camera unit, a cable, and a transmission line.
Figure 18A:
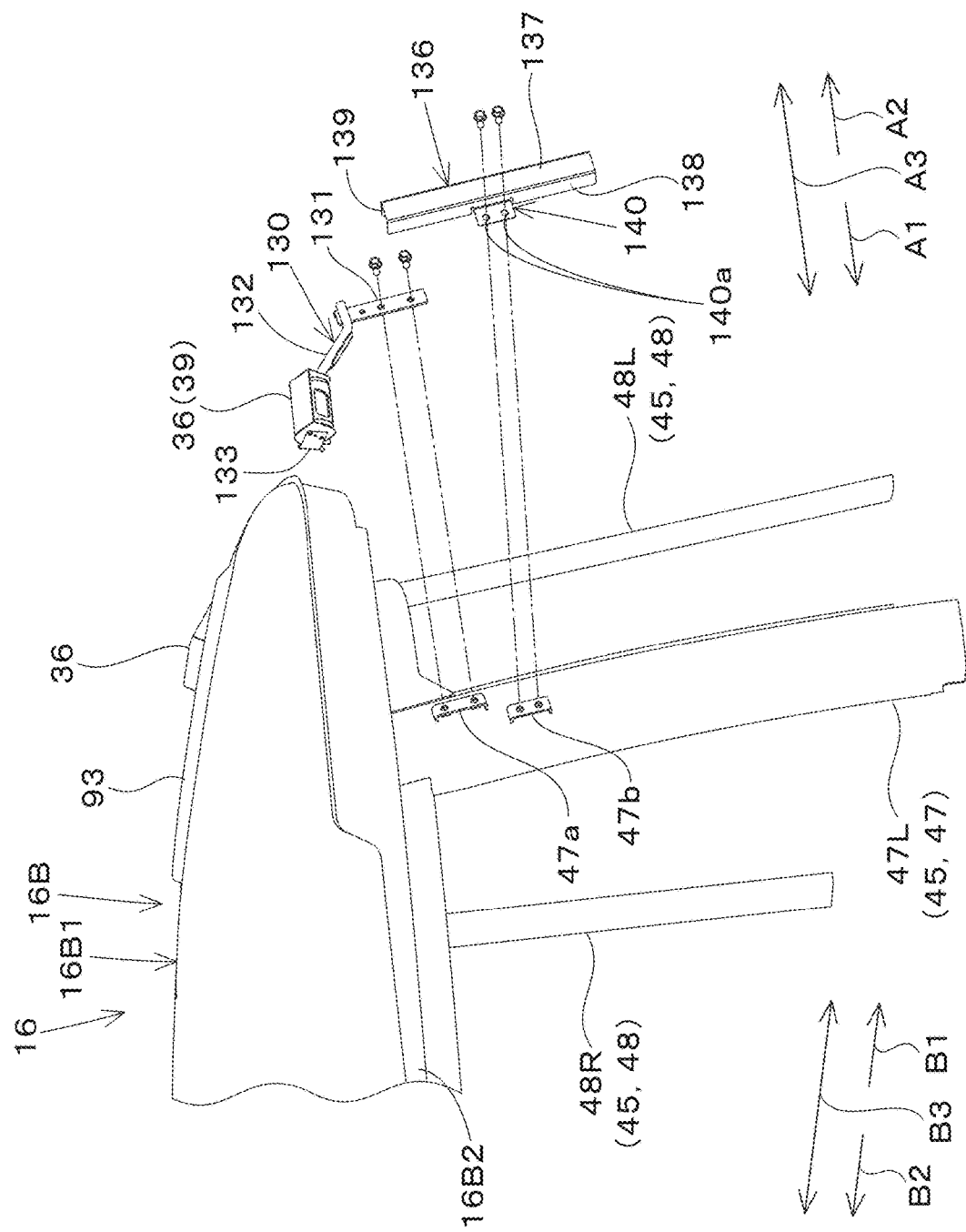
FIGS. 18A and 18B are perspective views showing how the support stay and a cover are attached, in which the support stay is connected to the intermediate pillar and the rear pillar, respectively.
Figure 18B:
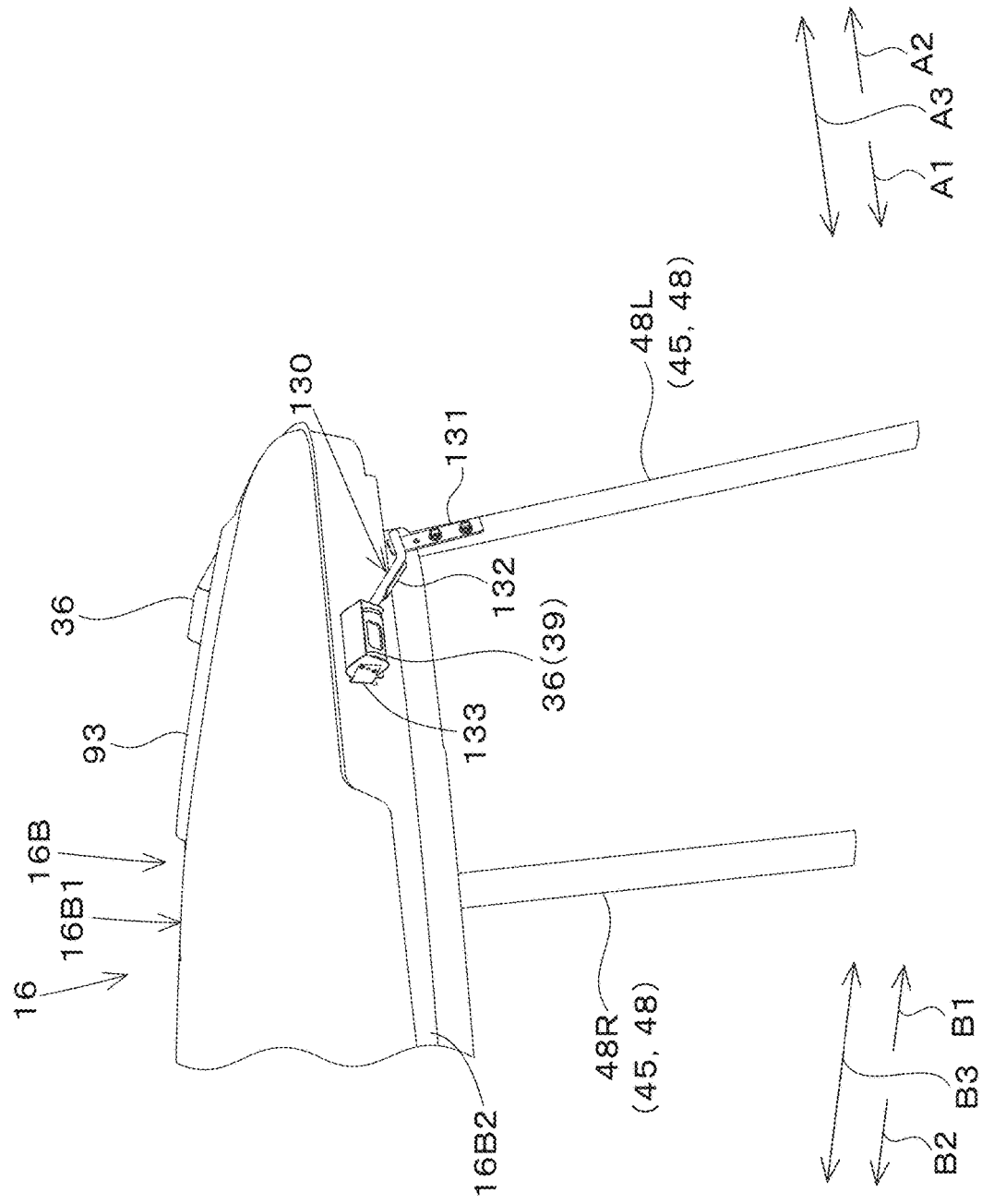

As illustrated in FIGS. 16 and 17, the protection mechanism 9 includes a support stay 130 and a cover 136. As illustrated in FIG. 18, the support stay 130 is connected to a pillar 45, orients a viewing direction of the monitoring device sideways, and supports the monitoring device 36 below a peripheral portion of the roof 16. In the present preferred embodiment, the support stay 130 is connected to an intermediate pillar 47. Note that, although the support stay 130 is connected to the intermediate pillar 47 in the present preferred embodiment, the support stay 130 may be connected to another of the plurality of pillars 45 other than the intermediate pillar 47. For example, in the case of a configuration in which the plurality of pillars 45 include the pair of front pillars 46 and the pair of rear pillars 48 but do not include the pair of intermediate pillars 47, the support stay 130 is connected to any of the rear pillars 48.

The support stay 130 extends from the intermediate pillar 47 to an area above an opening 55 (left side opening 55b), supports the monitoring device 36 above the left side opening 55b, and extends outside the range of opening/closing movement of the entry/exit door 14. Specifically, as illustrated in FIGS. 17 to 20, the support stay 130 includes a fixed portion 131, an intermediate portion 132, and a supporting portion 133.

Figure 19:
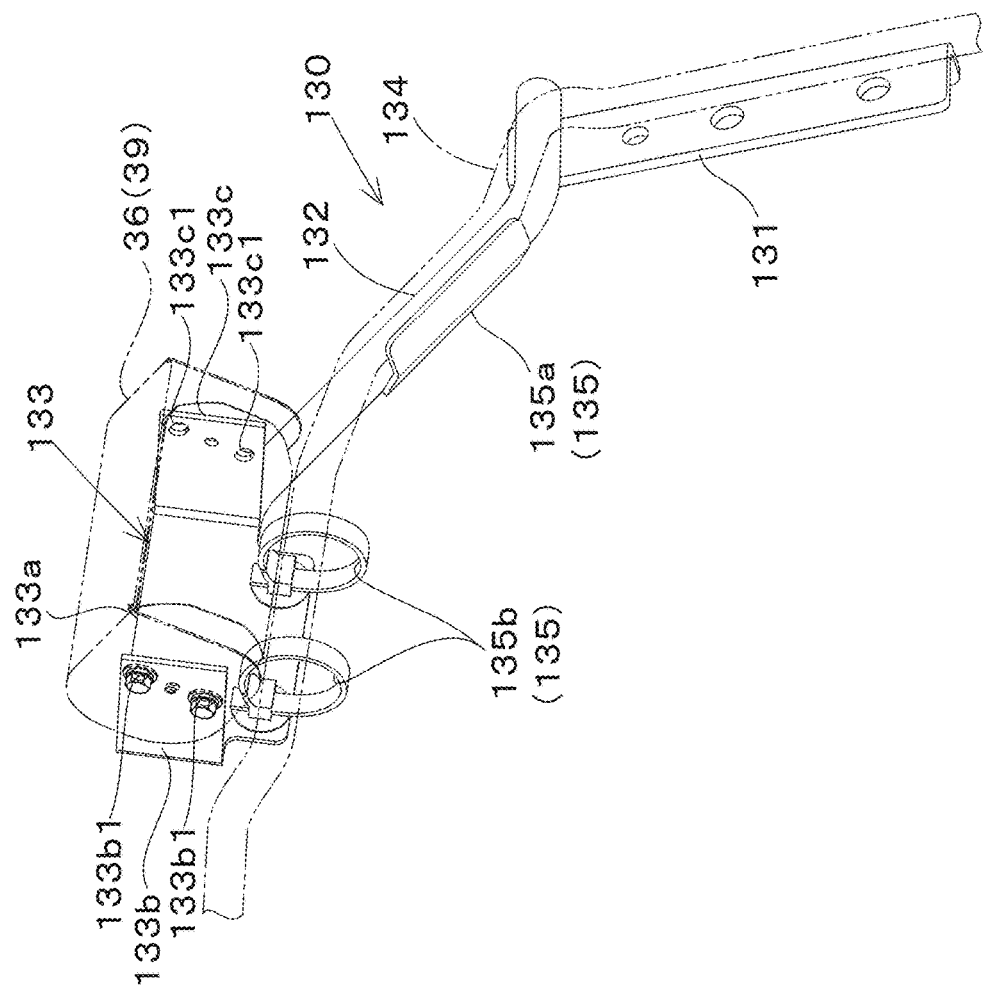
FIG. 19 is a perspective view of the support stay and the camera unit as viewed from the front left side.

As illustrated in FIG. 19, the fixed portion 131 is a part fixed to the pillar 45, and is formed by, for example, subjecting a thick steel plate to bending. As illustrated in FIG. 18, the fixed portion 131 is a long plate-shaped member extending along the top-bottom direction, and is fixed to a mounting bracket 47a provided outward of the intermediate pillar 47 in an outward widthwise direction by a fastener (e.g., bolt) or welding.

As illustrated in FIG. 17, the intermediate portion 132 is a part extending from the fixed portion 131 toward the roof 16, and is formed by, for example, subjecting a bar-shaped member to bending. One end portion (rear end portion, proximal end portion) of the intermediate portion 132 is attached and fixed to an upper portion of the fixed portion 131 by welding or other method or material, and extends from the fixed portion 131 toward the left side opening 55b. An intermediate portion of the intermediate portion 132 is bent from one end thereof diagonally forward and upward, and extends diagonally forward and upward and diagonally rearward and downward with a gap C11 between the intermediate portion 132 and the left side opening 55b along the front-rear direction A3 and the top-bottom direction. The opposite end portion (front end portion, distal end portion) of the intermediate portion 132 is bent forward and extends along the front-rear direction A3 above the left side opening 55b with a gap C12 between the intermediate portion 132 and the left side opening 55b along the top-bottom direction. As described earlier, the entry/exit door 14 is attached to the left side opening 55b and is configured to be opened and closed; therefore, the one end portion of the intermediate portion 132 extends from the fixed portion 131 toward the entry/exit door 14, and the intermediate portion of the intermediate portion 132 is bent from one end thereof diagonally forward and upward and extends diagonally forward and upward and diagonally rearward and downward with a gap C13 between the intermediate portion 132 and the entry/exit door 14 along the front-rear direction A3 and the top-bottom direction. Furthermore, the opposite end portion of the intermediate portion 132 is bent forward and extends along the front-rear direction A3 above the entry/exit door 14 with a gap C14 between the intermediate portion 132 and the entry/exit door 14 along the top-bottom direction.

Figure 20:
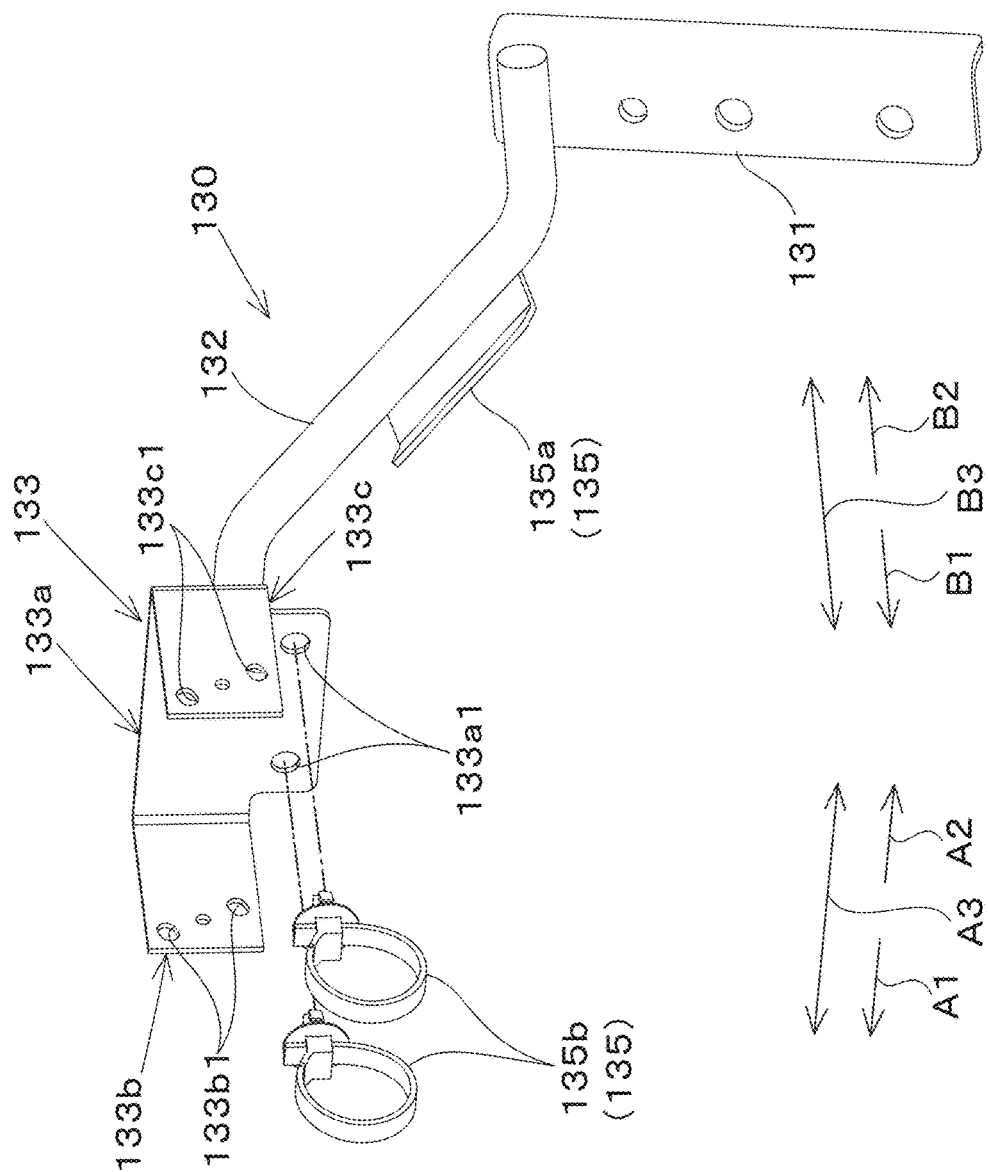
FIG. 20 is a perspective view showing how second routing members are attached.

As illustrated in FIGS. 19 and 20, the supporting portion 133 is provided on the intermediate portion 132 and supports the monitoring device 36 (camera unit 39). The supporting portion 133 is formed by, for example, subjecting a thick steel plate to bending, and substantially in a square U shape in plan view. Specifically, the supporting portion 133 includes a first support wall 133a, a second support wall 133b, and a third support wall 133c. The first support wall 133a is disposed such that a plate surface faces in the vehicle-width direction B3, and one of the opposite sides of the first support wall 133a that is inward of the other in an inward widthwise direction (right side) is attached and fixed to the opposite end portion of the intermediate portion 132 by welding or other method or material. As illustrated in FIG. 20, the first support wall 133a has, in a lower portion thereof, holes 133a1 passing through the first support wall 133a along the vehicle-width direction B3. The holes 133a1 are located lower than the monitoring device 36.

Figure 21:
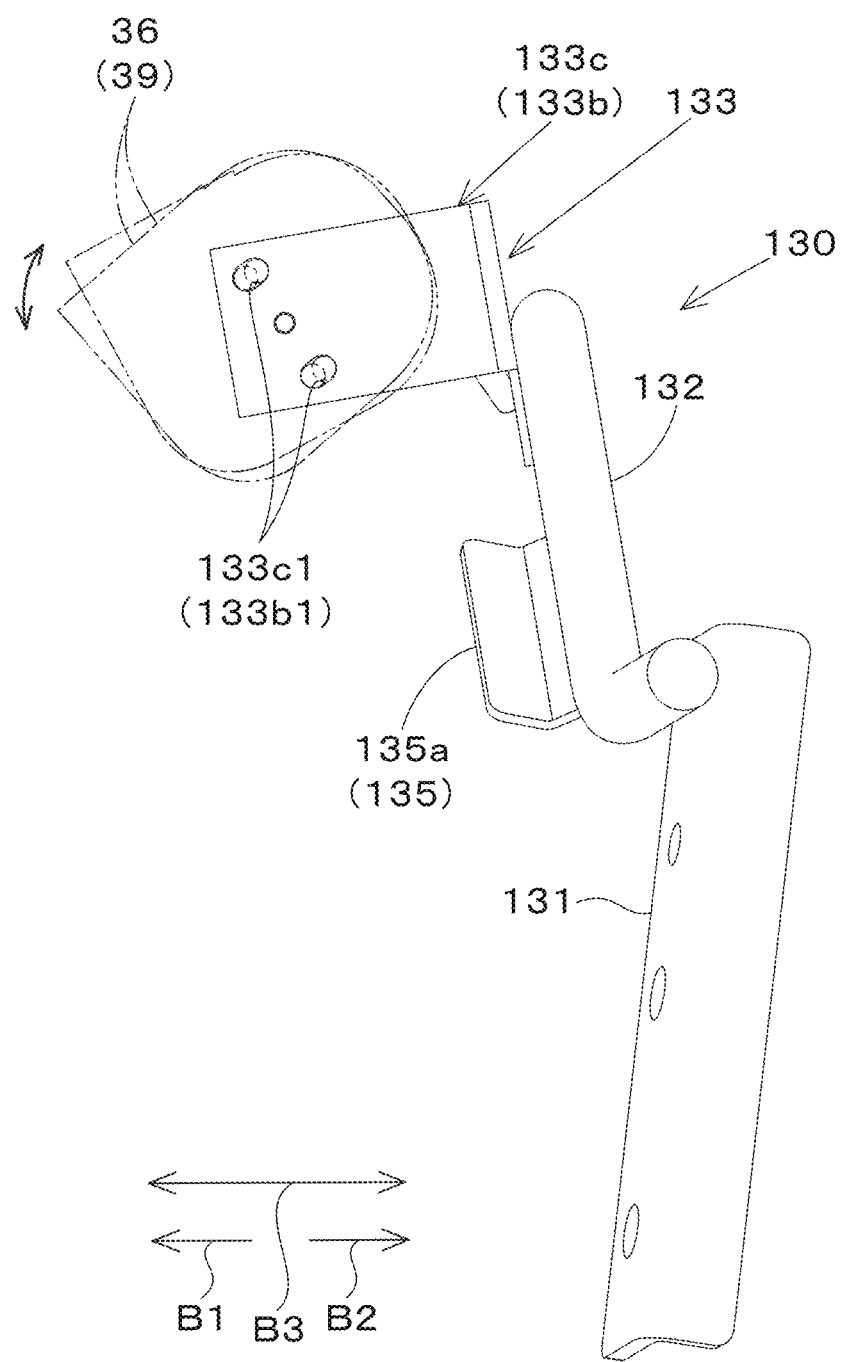
FIG. 21 is a back view showing how the camera unit swings.

The second support wall 133b and the third support wall 133c hold the monitoring device 36 therebetween along the front-rear direction A3 to support the monitoring device 36. As illustrated in FIGS. 19 and 20, the second support wall 133b and the third support wall 133c each have a plate surface facing in the front-rear direction A3 and are spaced apart from each other. The second support wall 133b extends from one end (front end) of the first support wall 133a in an outward widthwise direction. The third support wall 133c extends from the opposite end (rear end) of the first support wall 133a in the outward widthwise direction. The second support wall 133b and the third support wall 133 each have, in one of opposite portions that is outward of the other in the outward widthwise direction (in a left portion), holes 133b1 or holes 133c1 which are arranged along the top-bottom direction. As illustrated in FIG. 21, the holes 133b1 (133c1) are elongated holes extending along the circumference of an imaginary circle centered on the midpoint (pivot axis) between the upper hole 133b1 (133c1) and the lower hole 133b1 (133c1). The holes 133b1 and the holes 133c1 have fasteners such as bolts inserted therethrough, and the monitoring device 36 is attached to the second support wall 133b and the third support wall 133c via the holes and fasteners. Note that, when fasteners are loosened, the holes 133b1 and the holes 133c1 are guided by the fasteners, making it possible to allow the camera unit 39 (monitoring device 36) to pivot about the pivot axis to adjust the optical axis of the camera unit 39. Note that the configurations of the second support wall 133b and the third support wall 133c are not limited to those described above, provided that the second support wall 133b and the third support wall 133c are configured to pivotably support the camera unit 39 to adjust the optical axis of the camera unit 39.

As illustrated in drawings such as FIGS. 17, 19, and 20, the support stay 130 includes a routing unit 135 (guide). The routing unit 135 is a guide to route a transmission line 134 from the intermediate pillar 47 to the roof 16. The transmission line 134 is, for example, a transmission line 134 such as an electric wire or a cord which connects the stack indicating lamp 85 attached to the intermediate pillar 47 and the control device 26. The routing unit 135 includes a first routing member 135a (first guide portion) and second routing members 135b (second guide portions).

As illustrated in FIG. 17, the first routing member 135a is attached to the intermediate portion 132 and routes the transmission line 134 along the intermediate portion 132. As illustrated in FIGS. 19 and 20, the first routing member 135a is formed by, for example, subjecting a thick steel plate to bending, and is attached to and fixed to a lower portion of the intermediate portion 132 by welding or other method or material. The first routing member 135a extends from the lower portion of the intermediate portion 132 in an outward widthwise direction (rightward direction), and is bent at its intermediate portion diagonally upward and in the outward widthwise direction. The first routing member 135a is configured to have the transmission line 134 placed thereon, and is configured to route the transmission line 134 in the gap C11 (C13) below the intermediate portion 132.

As illustrated in FIG. 17, the second routing members 135b are attached to the supporting portion 133 and route the transmission line 134. As illustrated in FIGS. 19 and 20, the second routing members 135b are each, for example, a cable tie configured to route the transmission line 134, and a pair of the second routing members 135b are arranged along the front-rear direction A3. The second routing members 135b are located lower than the monitoring device 36, are attached to the holes 133a1 in the lower portion of the first support wall 133a of the supporting portion 133, and are configured to route the transmission line 134 in the gap C12 in a direction away from the intermediate portion 132, i.e., in a forward direction.

As illustrated in FIGS. 17 and 18, the cover 136 is attached to the intermediate pillar 47, routes the transmission line 134 on the intermediate pillar 47, and covers the transmission line 134. The cover 136 is formed by subjecting a thick steel plate to bending, and is substantially in a square U shape in plan view. The cover 136 is elongated in the top-bottom direction, overlaps the fixed portion 131 of the support stay 130 in the top-bottom direction and the front-rear direction A3, and covers the fixed portion 131. Specifically, the cover 136 includes a first cover wall 137, a second cover wall 138, a third cover wall 139, and an extending portion 140.

As illustrated in FIG. 17, the first cover wall 137 has a plate surface facing in the vehicle-width direction B3, and is located outward of the intermediate pillar 47 in an outward widthwise direction. The first cover wall 137 is disposed so as to face one of the opposite sides of the intermediate pillar 47 that is outward of the other in the outward widthwise direction. An upper portion of the first cover wall 137 overlaps the fixed portion 131 of the support stay 130 in the top-bottom direction and the front-rear direction A3.

The second cover wall 138 and the third cover wall 139 each have a plate surface facing in the front-rear direction A3, and the second cover wall 138 extends from the front edge of the first cover wall 137 in an inward widthwise direction. The third cover wall 139 extends from the rear edge of the first cover wall 137 in the inward widthwise direction, and is disposed so as to face the second cover wall 138 in the front-rear direction A3. That is, the cover 136, together with the intermediate pillar 47, defines a space therein, and is configured to route the transmission line 134 in the space.

As illustrated in FIGS. 17 and 18, the extending portion 140 is a portion extending forward from an intermediate portion of the second cover wall 138 in the top-bottom direction, and is a plate-shaped portion having a plate surface facing in the vehicle-width direction B3. The extending portion 140 has holes 140a which are arranged along the top-bottom direction and which pass through the extending portion 140 along the vehicle-width direction B3. The extending portion 140 has fasteners such as bolts inserted through the holes 140a and is fixed to a mounting bracket 47b provided on the one of the opposite sides of the intermediate pillar 47 that is outward of the other in the outward widthwise direction. Note that the method of fixing the extending portion 140 and the mounting bracket 47b together is not limited to using fasteners, and may be welding or other method or material.

The following description discusses routing the transmission line 134 by the support stay 130 and the cover 136. As illustrated in FIG. 17, the transmission line 134 extends from the stack indicating lamp 85, passes through the space defined by the cover 136 and the intermediate pillar 47 to an area above the cover 136, and is routed toward the roof 16. The transmission line 134, which extends from the upper portion of the cover 136, is routed by the routing unit 135 of the support stay 130 from the intermediate pillar 47 to the roof 16. Specifically, the transmission line 134, which extends from the upper portion of the cover 136, is placed on the first routing member 135a. That is, the transmission line 134 is routed as follows. The transmission line 134 extends from the intermediate pillar 47 toward the opening 55 (entry/exit door 14), is bent diagonally forward and upward, and extends diagonally forward and upward and diagonally rearward and downward above the gap C11 (C13) between the transmission line 34 and the opening 55 (entry/exit door 14) along the front-rear direction A3 and the top-bottom direction.

As illustrated in FIG. 17, the transmission line 134, which is routed on the first routing member 135a, extends forward and is routed to the second routing members 135b. That is, the transmission line 134 is routed as follows. The transmission line 134 extends from an upper portion of the first routing member 135a, curves forward, and is routed below the monitoring device 36. Furthermore, the transmission line 134 is routed in the gap C12 (C14) between the transmission line 134 and the opening 55 (entry/exit door 14) along the top-bottom direction. In other words, the transmission line 134 is routed such that the transmission line 134 extends along the front-rear direction A3 above the opening 55 (entry/exit door 14).

The transmission line 134 routed on the second routing members 135b passes through a hole in the lower member 16B2 of the roof 16 and a grommet (not illustrated) attached to the hole and is routed inside the roof 16.

Note that, although the support stay 130 supports the monitoring device 36 provided on the left or right side of the working vehicle 1 in the present preferred embodiment, the support stay 130 may be applied to the monitoring device 36 provided at the front or rear of the working vehicle 1.

Figure 22:
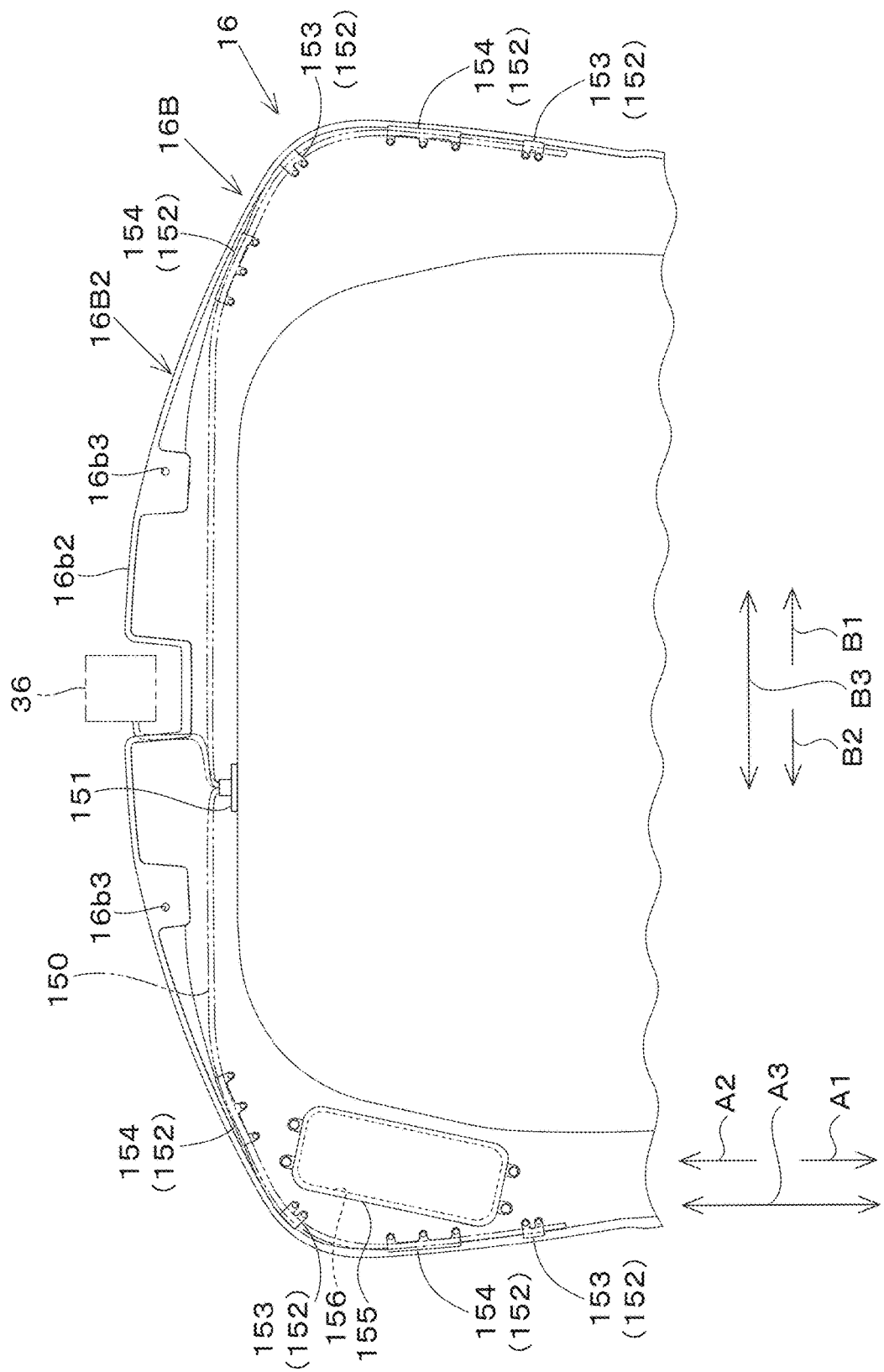
FIG. 22 is a bottom view showing routing of a cable on a lower portion of the roof.
Figure 23:
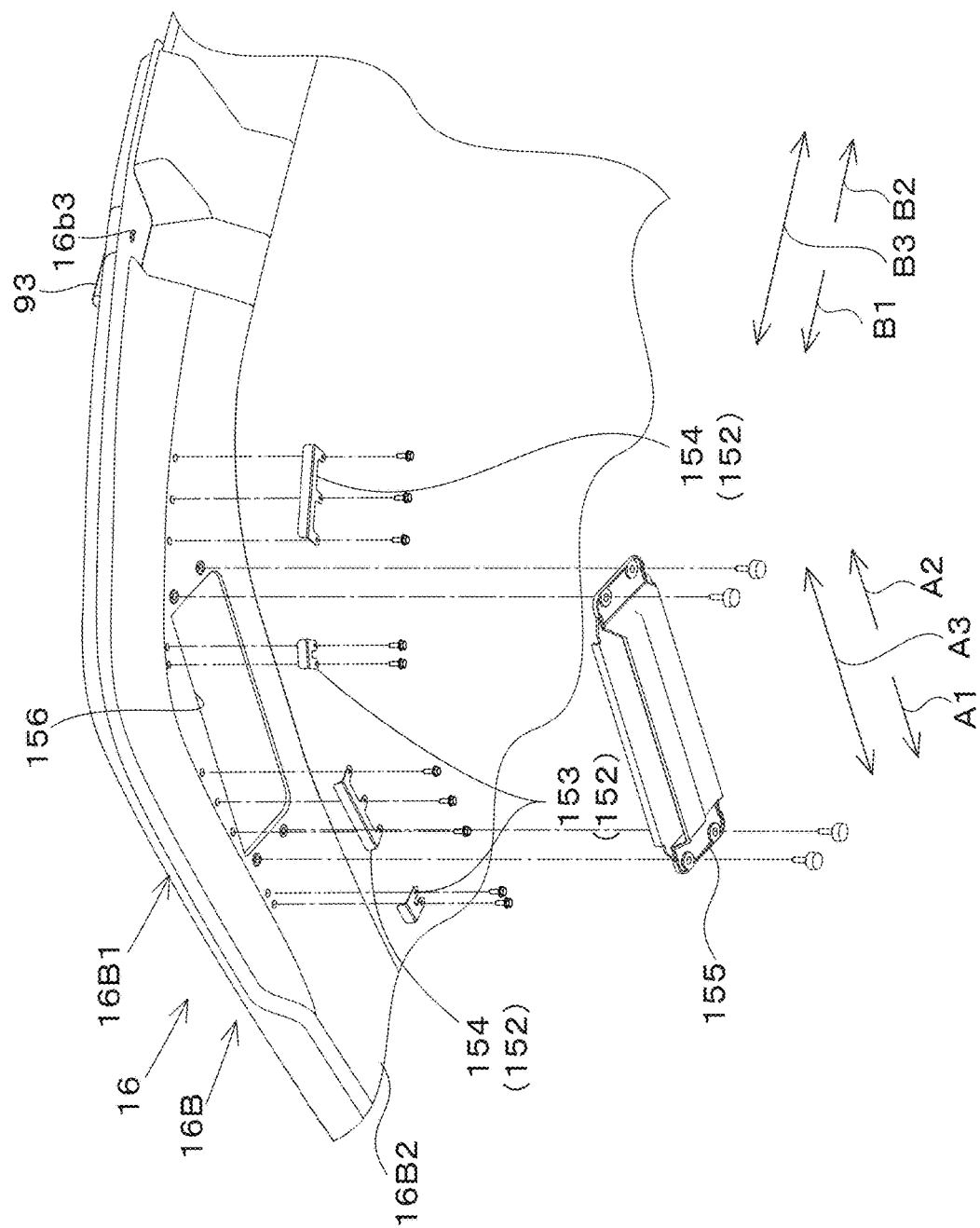
FIG. 23 is a perspective view showing how routing stays and a filter are attached.

The following description discusses routing cables 150 which are connected to monitoring devices 36 provided on the left and right sides of the working vehicle 1 to monitor areas sideward of the vehicle body 5 and which supply electricity to the monitoring devices 36 and/or connect the monitoring devices 36 and the control device 26. As illustrated in FIGS. 17, 22, and 23, the protection apparatus includes a plurality of routing stays 152. The plurality of routing stays 152 are configured to route the cables 150 which supply electricity to the monitoring devices 36 that monitor areas sideward of the vehicle body 5 or which connect the monitoring devices 36 and the control device 26. The cables 150 are electric wires, cords, or the like, and are routed from the monitoring devices 36 into a hole in the roof 16 and a grommet 151 attached to the hole.

As illustrated in FIG. 22, the plurality of routing stays 152 are provided on the peripheral portion of the roof 16 and route the cables 150. The plurality of routing stays 152 are each formed by subjecting a thick steel plate to bending, and are each, for example, a plate member having a cross section substantially in an L-shape.

Figure 24:
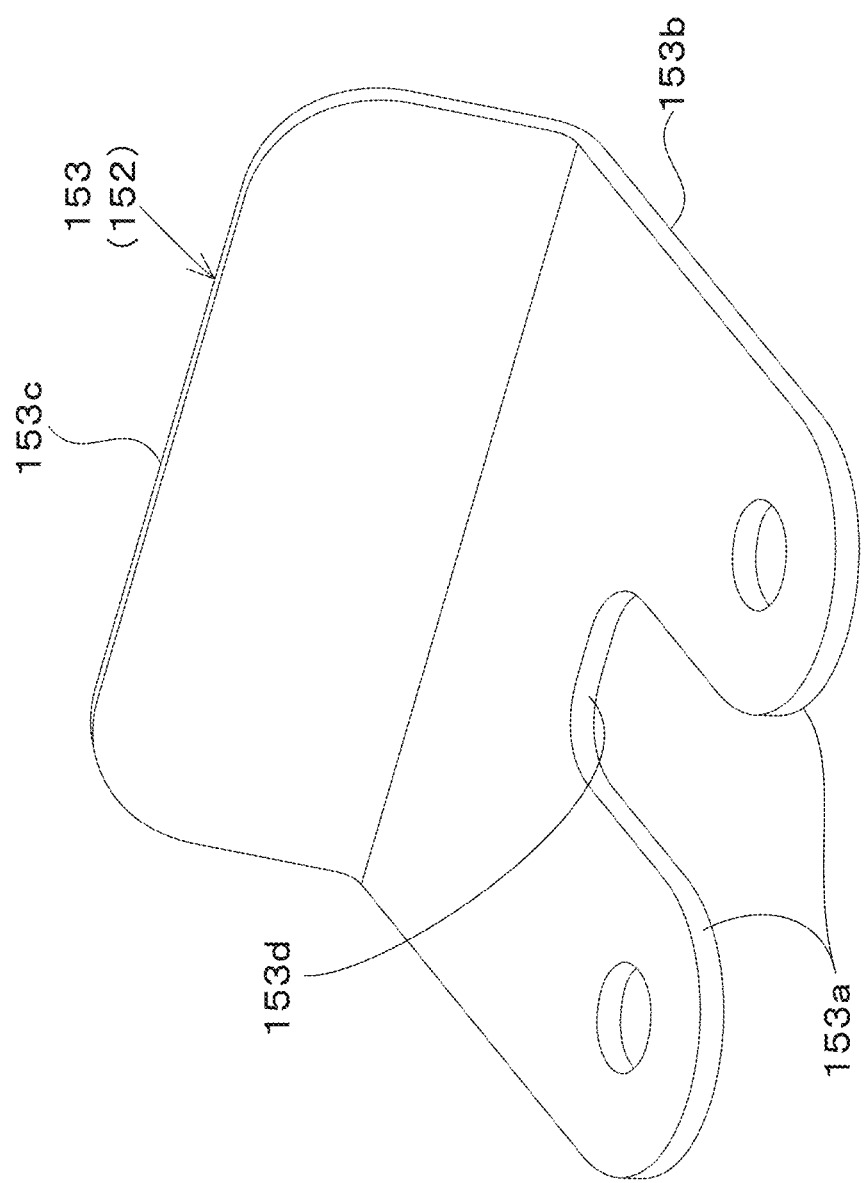
FIG. 24 is a perspective view of a first routing stay.
Figure 26:
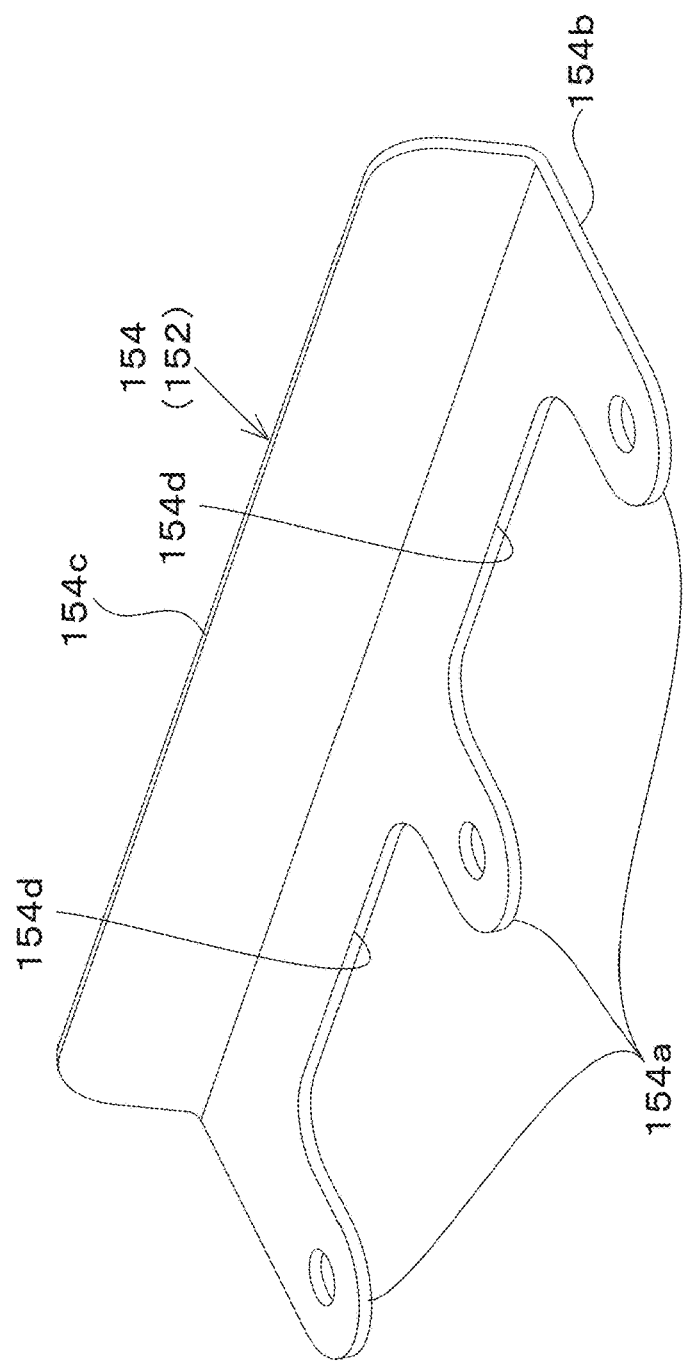
FIG. 26 is a perspective view of a second routing stay.

As illustrated in FIGS. 24 and 26, the plurality of routing stays 152 each include an attachment portion 153a or 154a, a placement portion 153b or 154b, and an upright portion 153c or 154c. The attachment portion 153a (154a) is a portion attached to the peripheral portion of the roof 16. The attachment portion 153a (154a) is attached and fixed to, for example, a lower side of the peripheral portion of the lower member 16B2 by a fastener (e.g., bolt) or welding.

As illustrated in FIGS. 24 and 26, the placement portion 153b (154b) extends from the attachment portion 153a (154a) in a horizontal outward direction and is disposed such that its plate surface faces in the top-bottom direction. The placement portion 153b (154b) is in the shape of, for example, a rectangle having short edges and long edges in plan view. As illustrated in FIGS. 22 and 23, the short edges of the placement portion 153b (154b) extend in a direction orthogonal to the direction of extension of the peripheral portion of the lower member 16B2, and the long edges of the placement portion 153b (154b) extend in the same direction as the direction of extension of the peripheral portion of the lower member 16B2.

Figure 25:
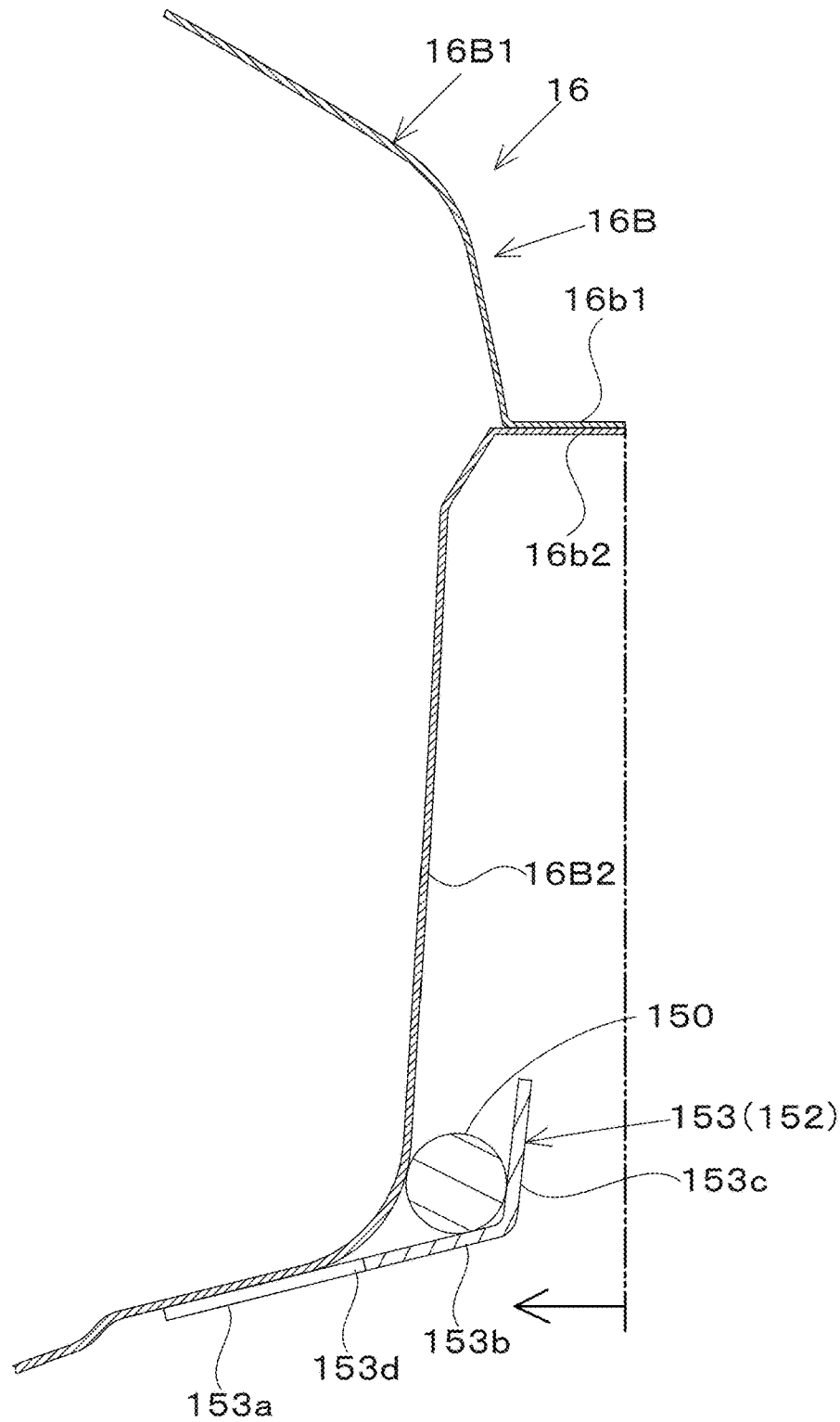
FIG. 25 is a cross-sectional view showing relative positions of the first routing stay and the roof.
Figure 27:
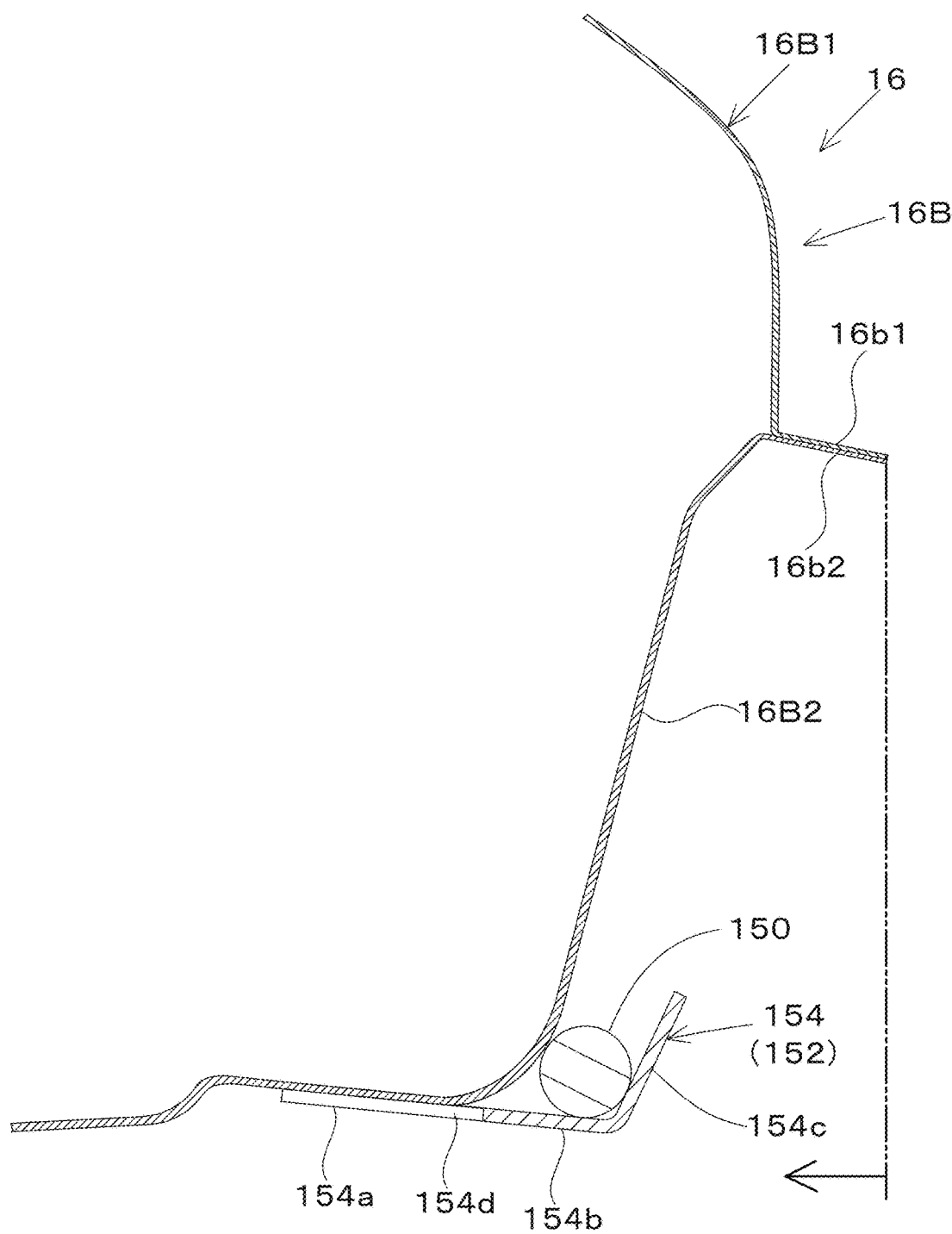
FIG. 27 is a cross-sectional view showing relative positions of the second routing stay and the roof.

As illustrated in FIGS. 24 and 26, the upright portion 153c (154c) extends upward from the opposite side of the placement portion 153b (154b) from the attachment portion 153a (154a). As illustrated in FIGS. 25 and 27, the upright portion 153c (154c) is disposed so as to face a lateral side of the peripheral portion of the lower member 16B2.

As illustrated in FIGS. 24 and 26, the plurality of routing stays 152 may differ in shape from each other, and, in the present preferred embodiment, the plurality of routing stays 152 include, for example, a first stay 153 and a second stay 154 that differs in shape from the first stay 153. The short edges of the first stay 153 and the short edges of the second stay 154 are equal in length to each other, and the long edges of the second stay 154 are longer than the long edges of the first stay 153. That is, the second stay 154 is larger than the first stay 153.

As illustrated in FIGS. 24 to 27, the plurality of routing stays 152 each have a drain portion 153d or 154d. The drain portion 153d (154d) is a portion which passes through the routing stay 152 substantially along the top-bottom direction and which allows passage of rainwater flowing downward from above. Specifically, the drain portion 153d (154d) is a cutout in the attachment portion 153a (154a) depressed in a horizontal outward direction, and, as illustrated in FIGS. 25 and 27, the drain portion 153d (154d), together with the roof 16, defines a space therebetween which passes through the routing stay 152 substantially along the top-bottom direction. For example, the first stay 153 has a single drain portion 153d in an intermediate portion of a long edge in the horizontal direction. For example, the second stay 154 has two drain portions 154d in intermediate portions of a long edge in the horizontal direction. Note that the number and shapes of drain portions 153d (154d) are not limited to those described above, provided that the drain portion 153d (154d) passes through the routing stay 152 substantially along the top-bottom direction and allows passage of rainwater flowing downward from above. For example, the drain portion 153d (154d) may include a plurality of through holes or a single through hole in the attachment portion 153a (154a).

Note that, although the plurality of routing stays 152 as described above each have the attachment portion 153a (154a) attached to the lower side of the peripheral portion of the roof 16, the configuration in which the attachment portion is attached to the lateral side of the peripheral portion of the roof 16 (lower member 16B2) may be used. In such a case, the attachment portion extends downward from the lateral side of the peripheral portion of the roof 16, and the placement portion extends in the horizontal inward direction from the lower edge of the attachment portion. The upright portion extends upward from the opposite side of the placement portion from the attachment portion, that is, the upright portion extends upward from one of the opposite sides of the placement portion that is inward of the other in the horizontal inward direction. Furthermore, the cables 150 are routed between upper surfaces of the placement portions and the lower side of the peripheral portion of the roof 16.

The following description specifically discusses the locations at which the plurality of routing stays 152 are attached. As illustrated in FIG. 22, the plurality of routing stays 152 are disposed in an area ranging from the rear of each camera unit 39 (monitoring device 36) to the grommet 151 attached to the lower member 16B2, that is, disposed on the peripheral portion of the rear portion of the lower member 16B2. The first stays 153 are disposed at locations at which the cable 150 is relatively likely to curve, and the second stays 154 are disposed at locations at which the cable 150 is relatively unlikely to curve. Specifically, the first stays 153 are disposed at locations rearward of the monitoring devices 36 and at locations on the peripheral portion of the lower member 16B2 at which the outer shape of the peripheral portion defines a curve in plan view. The second stays 154 are disposed at locations on the peripheral portion of the lower member 16B2 at which the outer shape of the peripheral portion is substantially straight in plan view. In the present preferred embodiment, each pair of first stays 153 are disposed on opposite sides (left side and right side) in the vehicle-width direction B3 on the peripheral portion of the lower member 16B2, and each pair of first stays 154 are disposed on the opposite sides (left side and right side) in the vehicle-width direction B3 on the peripheral portion of the lower member 16B2. Furthermore, the plurality of routing stays 152 are disposed in the following order in the direction from the rear of the camera units 39 (monitoring devices 36) toward the grommet 151: first stays 153, second stays 154, first stays 153, and second stays 154.

As illustrated in FIGS. 16 and 17, the plurality of routing stays 152 are disposed below the roof 16 (outer roof 16B, lower member 16B2) and are spaced apart from openings 55. Furthermore, as illustrated in FIGS. 25 and 27, the plurality of routing stays 152 are disposed inward and downward of the outer periphery of the upper surface of the roof 16. Specifically, one of the opposite sides of each of the plurality of routing stays 152 that is outward of the other in the horizontal outward direction is located inward of the outer edge 16b1 of the upper member 16B1 and the outer edge 16b2 of the lower member 16B2 in the horizontal inward direction.

Furthermore, as illustrated in FIG. 22, the plurality of routing stays 152 are disposed between the roof 16 and a filter 155 provided on the roof 16. The filter 155 is detachably provided on the lower side of the peripheral portion of the roof 16. The roof 16 has a vent 156 through which outside air is introduced through the filter 155. The vent 156 is a duct which opens downward and which allows outside air to be introduced from the bottom of the peripheral portion of the roof 16 into an air conditioner unit. The filter 155 and the vent 156 are disposed at the lower side of the peripheral portion of the roof 16 at the rear of the roof 16. The filter 155 is detachably attached to the roof 16 by a fastener (e.g., bolt) and can be detached in the downward direction. That is, because the plurality of routing stays 152 are disposed between the roof 16 and the filter 155 provided on the roof 16, the plurality of routing stays 152 are located outward, in the horizontal outward direction, of the range within which the filter 155 moves when the filter 155 is attached or detached.

The following description discusses the locations of the cables 150 which are connected to the monitoring devices 36 for monitoring areas sideward of the vehicle body 5 and which are routed on the foregoing plurality of routing stays 152. A cable 150 which is connected to the monitoring device 36 disposed on the left side of the working vehicle 1 is described. As illustrated in FIG. 22, the cable 150 extends rearward from the monitoring device 36 which monitors an area sideward of the vehicle body 5, and is placed on a placement portion 153b of a first stay 153 (which is one of the plurality of routing stays 152) that is disposed rearward of the monitoring device 36. The cable 150 routed on the first stay 153 extends from the first stay 153 and is placed on a placement portion 154b of a second stay 154 disposed rearward of the first stay 153, curves diagonally rightward and rearward, and is placed on a placement portion 153b of another first stay 153 disposed rearward of the second stay 154. With this, the cable 150 is routed between the roof 16 and the filter 155 provided on the roof 16, and is located outward in the horizontal outward direction of the range within which the filter 155 moves when the filter 155 is attached or detached. In other words, the cable 150 does not overlap, along the horizontal direction, the range within which the filter 155 moves when the filter 155 is attached or detached.

The cable 150 routed on the placement portion 153b of the other first stay 153 curves diagonally rightward and rearward, extends from the other first stay 153 and is placed on a placement portion 154b of another second stay 154 disposed rearward of the other first stay 153, curves rightward, and extends toward the grommet 151.

Another cable 150 which is connected to the monitoring device 36 disposed on the right side of the working vehicle 1 is described. As illustrated in FIG. 22, the cable 150 extends rearward from the monitoring device 36 which monitors an area sideward of the vehicle body 5, and is placed on a placement portion 153b of a first stay 153 (which is one of the plurality of routing stays 152) disposed rearward of the monitoring device 36. The cable 150 routed on the first stay 153 extends from the first stay 153 and is placed on a placement portion 154b of a second stay 154 disposed rearward of the first stay 153, curves diagonally leftward and rearward, and is placed on a placement portion 153b of another first stay 153 disposed rearward of the second stay 154. The cable 150 routed on the placement portion 153*b* of the other first stay 153 curves diagonally leftward and rearward, extends from the other first stay 153 and is placed on a placement portion 154*b* of another second stay 154 disposed rearward of the other first stay 153, curves leftward, and extends toward the grommet 151.

Note that the description in the present preferred embodiment discussed the plurality of routing stays 152 which are provided on the peripheral portion of the roof 16 and which route the cables 150 connected to the monitoring devices 36 for monitoring the areas sideward of the vehicle body 5, using such cables 150 as an example. However, the routing stays 152 may route cables 150 for other electric devices 36 such as illuminating lamps 81 instead of the cables 150 connected to the monitoring devices 36 for monitoring the areas sideward of the vehicle body 5.

The following description discusses the flow of rainwater or the like flowing on the upper surface of the roof 16 (outer roof 16B, upper member 16B1). Once rainwater or the like has fallen on the upper surface of the upper member 16B1, the rainwater or the like is guided toward the periphery of the roof 16 due to the slope of the upper surface of the upper member 16B1 and by the first groove 91 and the second groove 92. Specifically, rainwater or the like fallen on a front portion of the upper surface of the upper member 16B1 flows toward the periphery of the front portion of the upper member 16B1 due to the slope of the upper surface of the upper member 16B1, and falls downward from the outer edge 16*b*1 at the front. Rainwater or the like fallen on the middle portion of the upper surface of the upper member 16B1 falls downward from the outer edge 16*b*1 at the left of the upper member 16B1 or the outer edge 16*b*1 at the right of the upper member 16B1 or flows into the second groove 92 due to the slope of the upper surface of the upper member 16B1. Rainwater or the like that has fallen on a rear portion of the upper surface of the upper member 16B1 falls downward from the periphery of the rear portion of the upper member 16B1 or flows into the first groove 91 due to the slope of the upper surface of the upper member 16B1.

Rainwater or the like that has flowed into the third portion 92*c* or the fourth portion 92*d* of the second groove 92 is guided to the front or rear portion of the upper member 16B1. The rainwater or the like that has flowed into the third portion 92*c* or the fourth portion 92*d*, when guided to the front portion of the upper member 16B1, flows into the second portion 92*b*. The rainwater or the like that has overflowed the third portion 92*c* or the fourth portion 92*d* in an outward widthwise direction flows into the fifth portion 92*e* or the sixth portion 92*f*.

The rainwater or the like that has flowed into the fifth portion 92*e* or the sixth portion 92*f* of the second groove 92, is guided to the front or rear portion of the upper member 16B1. The rainwater or the like that has flowed in to the fifth portion 92*e* or the sixth portion 92*f*, when guided to the front portion of the upper member 16B1, flows into (merges with) the second portion 92*b*. The rainwater or the like that has overflowed the fifth portion 92*e* or the sixth portion 92*f* in an outward widthwise direction flows toward the periphery at the left of the upper member 16B1 or the periphery at the right of the upper member 16B1 due to the slope of the upper surface of the upper member 16B1. The rainwater or the like that has flowed toward the periphery at the left of the upper member 16B1 or the periphery at the right of the upper member 16B1 falls downward from the outer edge 16*b*1 at the left of the upper member 16B1 or from the outer edge 16*b*1 at the right of the upper member 16B1.

The rainwater or the like that has flowed into the second portion 92*b* is guided to the periphery at the front of the upper member 16B1 by the second portion 92*b* and falls downward from the periphery at the front.

The rainwater or the like that has flowed into the first groove 91 is guided to a portion outward (leftward) of the left edge of the rear window glass 13 and to a portion outward (rightward) of the right edge of the rear window glass 13 by the first groove 91, and falls downward from the periphery at the rear of the upper member 16B1. In other words, rainwater or the like that has flowed into the first groove 91 is guided to a portion rightward of the first rear pillar 48L and a portion leftward of the second rear pillar 48R by the first groove 91, and falls downward from the periphery at the rear of the upper member 16B1. Furthermore, rainwater or the like that has overflowed the first groove 91 rearward is stopped by the flow-stopping portion 93 and is guided in outward widthwise direction(s). The rainwater or the like that has been guided by the flow-stopping portion 93 in the outward widthwise direction(s) and has overflowed the first groove 91 flows from end(s) of the flow-stopping portion 93 rearward and falls downward from the periphery at the rear of the upper member 16B1. Furthermore, the rainwater or the like that has overflowed the flow-stopping portion 93 rearward falls from the periphery at the rear of the upper member 16B1 or flows into the cutout 90.

As illustrated in FIG. 7B, the rainwater or the like that has flowed into the cutout 90 flows downward along the first inner side wall 90*a*, the second inner side wall 90*b*, and the first inclined wall 90*c*, flows toward the first fringe portion 90*a*1, the second fringe portion 90*b*1, and the third fringe portion 90*c*1, and falls downward through the clearance C without reaching the monitoring device 36. Specifically, the rainwater or the like, when flowed to the first fringe portion 90*a*1, flows to the fourth fringe portion 90*d*1 and falls downward from the fourth fringe portion 90*d*1. The rainwater or the like, when flowed to the second fringe portion 90*b*1, flows to the fifth fringe portion 90*e*1 and falls downward from the fifth fringe portion 90*e*1. The rainwater or the like, when flowed to the third fringe portion 90*c*1, flows to the sixth fringe portion 90*f*1 and falls downward from the sixth fringe portion 90*f*1.

Furthermore, rainwater or the like that has flowed from the upper surface of the roof 16 (outer roof 16B, upper member 16B1) to any of the cables 150 or any of the plurality of routing stays 152 or rainwater or the like on any of the cables 150 or any of the plurality of routing stays 152 flows along the upright portion and the placement portion 153*b* (154*b*) and falls downward through the drain portion 153*d* (154*d*).

As has been described, a protection mechanism 9 for a working vehicle 1 includes a roof 16 which is provided above an operator's seat 10 and which includes a cutout 90 extending along a top-bottom direction, and an electric device 36 at least a portion of which is located in the cutout 90. The configuration makes it possible to dispose the electric device 36 on the roof 16 in a compact manner without having to increase the dimension of the roof 16 along the top-bottom direction.

The cutout 90 has a dimension along a vehicle-body-width direction B3, the dimension being uniform along a front-to-rear direction or increasing in the front-to-rear direction. This configuration makes it possible to guide rainwater which has flowed from the roof 16 to the cutout 90 so that the rainwater will not fall onto the electric device 36.

The cutout 90 has a thickness along the top-bottom direction, the thickness decreasing in the front-to-rear direction. This configuration makes it possible to increase the speed of flow of the rainwater flowing from the roof 16 to the cutout 90. This makes it possible to allow the rainwater to flow without staying still and thus possible to prevent the rainwater from falling onto the electric device 36.

The roof 16 has, in an upper surface thereof, a first groove 91 which is located on an opposite side of the cutout 90 from the electric device 36, and the first groove 91 extends in a direction away from the cutout 90. With this configuration, rainwater flowing on the upper surface of the roof 16 is guided along the first groove 91 in direction(s) away from the cutout 90. This makes it possible to eliminate or reduce the likelihood that the rainwater will flow toward the electric device 36.

The roof 16 has, at the upper surface thereof, a flow-stopping portion 93 which extends between the first groove 91 and the cutout 90 and which protrudes upward. With this configuration, rainwater flowing on the upper surface of the roof 16 is guided along the first groove 91 in direction(s) away from the cutout 90 and, if the rainwater overflowed the first groove 91, the rainwater overflowed is stopped by the flow-stopping portion 93. This makes it possible to further ensure that the rainwater flowing on the upper surface of the roof 16 will not fall onto the electric device 36. [019B] The electric device 36 is spaced apart from the cutout 90 with a clearance C therebetween. With this configuration, rainwater flowing toward the electric device 36 passes through the clearance C and therefore does not reach the electric device 36. It is also possible to eliminate or reduce the likelihood that the cutout 90 in the roof 16 and the electric device 36 will interfere with each other when the relative positions of the electric device 36 and the roof 16 change due to, for example, vibration of the vehicle body 5.

The electric device 36 is a monitoring device 36 to monitor surroundings of a vehicle body 5. With this configuration, when the monitoring device 36 is located higher than the upper surface of the roof 16, the monitoring device 36 is capable of monitoring the surroundings of the vehicle body 5 from a higher position. This enables monitoring of a wide region.

The monitoring device 36 includes an obstacle detector 38 to detect an obstacle and/or a camera unit 39 to capture an image of the surroundings of the vehicle body 5, and a top cover 105 which covers the obstacle detector 38 and/or the camera unit 39 from an upper side, and an upper edge of the top cover 105 is at the same level as an uppermost portion of the roof 16. With this configuration, the cover 105 is capable of protecting the upper portion of the obstacle detector 38 and/or the camera unit 39 against rainwater, and, because the top cover 105 does not project relative to the upper surface of the roof 16, it is possible to prevent or reduce the contact of the top cover 105 with an obstacle even in cases where the working vehicle 1 is stored in a small space.

The top cover 105 includes a front wall 106 which covers the obstacle detector 38 and/or the camera unit 39 from an upper front side, and a rear wall 107 which covers the obstacle detector 38 and/or the camera unit 39 from an upper rear side. With this configuration, the top cover 105 is capable of eliminating or reducing the likelihood that rainwater will fall onto the obstacle detector 38 and/or the camera unit 39 in the front-rear direction A3.

A working vehicle 1 includes the protection mechanism 9, a vehicle body 5, and a linkage unit 5a to link a working device to a rear of the vehicle body 5, wherein the roof 16 includes the cutout 90 in a rear portion of an upper surface thereof, and the electric device 36 is located at a rear of the cutout 90. This configuration makes it possible to provide a working vehicle 1 which achieves the foregoing superior effects.

A protection mechanism 9 for a working vehicle 1, includes a roof 16 provided above an operator's seat 10, and an electric device 36 provided on a peripheral portion of the roof 16, wherein the roof 16 includes a flow-stopping portion 93 which protrudes upward from an upper surface of the roof 16 to stop rainwater from flowing toward the electric device 36. With this configuration, the flow of rainwater flowing on the upper surface of the roof 16 is stopped by the flow-stopping portion 93, making it possible to eliminate or reduce the likelihood that the rainwater will fall onto the electric device 36.

The roof 16 has, in the upper surface thereof, a first groove 91 which is located on an opposite side of the flow-stopping portion 93 from the electric device 36, and the first groove 91 extends in a direction away from the electric device 36. With this configuration, rainwater flowing on the upper surface of the roof 16 flows along the first groove 91 and therefore is guided in direction(s) away from the electric device 36. This makes it possible to further reduce the likelihood that the rainwater flowing on the upper surface of the roof 16 will fall onto the electric device 36.

The protection mechanism 9 includes a plurality of pillars 45 which support the roof 16 and which are spaced apart from each other. The electric device 36 is located between the plurality of pillars 45. The protection mechanism 9 includes a window 13 which is provided between the plurality of pillars 45 and which is configured to be opened and closed. The first groove 91 extends in a direction away from the electric device 36 to a portion outward of a side edge of the window 13. With this configuration, rainwater flowing in the first groove 91 flows to a portion outward of the window 13. This makes it possible, when the window 13 is open, to eliminate or reduce the likelihood that rainwater flowing in the first groove 91 will flow into the protection mechanism 9.

The protection mechanism 9 includes a plurality of pillars 45 which support the roof 16 and which are spaced apart from each other, and the first groove 91 extends in directions away from the electric device 36 to a portion outward of one of the plurality of pillars 45 and to another portion outward of another of the plurality of pillars 45. With this configuration, rainwater flowing in the first groove 91 flows to portions outward of the plurality of pillars 45. This makes it possible to eliminate or reduce the likelihood that rainwater flowing in the first groove 91 will pass between the plurality of pillars 45 and flow into the protection mechanism 9.

The roof 16 has, in the upper surface thereof, a second groove 92 which is located on an opposite side of the first groove 91 from the electric device 36, and the second groove 92 extends in a direction away from the electric device 36. With this configuration, rainwater flowing toward the electric device 36 flows into the second groove 92 and, even if the rainwater overflows the second groove 92, the rainwater flows into the first groove 91. This makes it possible to further reduce the likelihood that the rainwater flowing on the upper surface of the roof 16 will fall onto the electric device 36.

The first groove 91 and the second groove 92 differ in depth from each other. This configuration makes it possible to allow different amounts of rainwater to flow into the first groove 91 and the second groove 92. With this, more rainwater flows into a deeper one of the first and second grooves 91 and 92, making it possible to eliminate or reduce the likelihood that the rainwater will stay still and possible to allow the rainwater to flow quickly.

The first groove 91 is deeper than the second groove 92. This configuration makes it possible to allow rainwater flowed into the first groove 91 to flow quickly, and the roof is capable of quickly draining off rainwater fallen relatively close to the electric device 36.

A dimension L2 of the second groove 92 along a vehicle-body-width direction B3 is greater than a dimension L1 of the first groove 91 along the vehicle-body-width direction B3. With this configuration, rainwater flowing along the second groove 92 flows to portion(s) outward of the first groove 91. This makes it possible to eliminate or reduce the likelihood that the rainwater flowing along the second groove 92 will flow into the first groove.

The electric device 36 is a monitoring device 36 to monitor an area rearward of a vehicle body 5, the monitoring device 36 being provided at a rear of the roof 16, and the roof 16 has the flow-stopping portion 93 and the first groove 91 in a rear portion thereof. With this configuration, the flow of rainwater flowing on the upper surface of the roof 16 is stopped by the flow-stopping portion 93, making it possible to eliminate or reduce the likelihood that the rainwater will fall into the area rearward of the vehicle body 5 which is monitored by the monitoring device 36.

A working vehicle 1 includes the protection mechanism 9, a vehicle body 5, and a linkage unit 5a to link a working device to a rear of the vehicle body 5. This configuration makes it possible to provide a working vehicle 1 which achieves the foregoing superior effects.

A protection mechanism 9 for a working vehicle 1 includes a roof 16 provided above an operator's seat 10, a pillar 45 which extends upward from a vehicle body 5 and which supports a roof 16, a camera unit 39 with a predetermined viewing direction, and a support stay 130 which is connected to the pillar 45, which orients the viewing direction of the camera unit 39 sideways, and which supports the camera unit 39 below a peripheral portion of the roof 16. This configuration makes it possible, even if the area below the roof 16 is small and the camera unit 39 is difficult to attach in such a small area, to easily dispose the camera unit 39 below the peripheral portion of the roof 16 via the pillar 45.

The protection mechanism 9 includes a plurality of the pillars 45 including a front pillar 46 which supports a front portion of the roof 16 and a rear pillar 48 which supports a rear portion of the roof 16, and the support stay 130 is connected to the rear pillar 48. This configuration makes it possible to easily dispose the camera unit 39 below the peripheral portion of the roof 16 without interfering with the forward view of an operator seated on the operator's seat 10.

The protection mechanism 9 includes a plurality of the pillars 45 including a front pillar 46 which supports a front portion of the roof 16, a rear pillar 48 which supports a rear portion of the roof 16, and an intermediate pillar 47 which is located between the front pillar 46 and the rear pillar 48 and which supports the roof 16, and the support stay 130 is connected to the intermediate pillar 47. This configuration makes it possible to easily dispose the camera unit 39 below the peripheral portion of the roof 16 without interfering with the forward view of an operator seated on the operator's seat 10.

The protection mechanism 9 for a working vehicle 1 includes a support frame 49 which connects the pillars 45, which defines an opening 55 together with the vehicle body 5 and the pillars 45, and which supports the roof 16, wherein the support stay 130 extends from one of the pillars 45 to an area above the opening 55 and supports the camera unit 39 above the opening 55. With this configuration, the support stay 130 locates the camera unit 39 above the opening 55, making it possible to eliminate or reduce the likelihood that the camera unit 39 will interfere with the range of the opening 55.

The protection mechanism 9 for a working vehicle 1 includes an entry/exit door 14 to open and close the opening 55, wherein the support stay 130 extends outside a range of opening/closing movement of the entry/exit door 14. With this configuration, since the support stay 130 extends outside the range of the opening/closing movement of the entry/exit door 14, it is possible to eliminate or reduce the likelihood that the entry/exit door 14 and the support stay 130 will interfere with each other when the entry/exit door 14 is opened or closed.

The support stay 130 includes a routing unit 135 to route a transmission line 134 from the pillar 45 to the roof 16. With this configuration, the support stay 130 also functions to support the transmission line 134 in addition to supporting the camera unit 39.

The support stay 130 includes a fixed portion 131 which is fixed to the pillar 45, an intermediate portion 132 which extends from the fixed portion 131 toward the roof 16, and a supporting portion 133 which is provided on the intermediate portion 132 and which supports the camera unit 39, and the routing unit 135 includes a first routing member 135a which is attached to the intermediate portion 132 and which routes the transmission line 134 along the intermediate portion 132, and a second routing member 135b which is attached to the supporting portion 133 and which routes the transmission line 134. With this configuration, the support stay 130 supports the camera unit 39, and the first routing member 135a and the second routing member 135b reliably route the transmission line 134 from the intermediate pillar 47 toward the roof 16.

The protection mechanism 9 includes a cover 136 which is attached to the pillar 45, which routes the transmission line 134 on the pillar 45, and which covers the transmission line 134, wherein the transmission line 134 is routed to the roof 16 along the cover 136 and the support stay 130. With this configuration, the cover 136 makes it possible to route the transmission line 134 and to prevent or reduce the exposure of the transmission line 134 to the outside environment.

A working vehicle 1 includes the protection mechanism 9, a vehicle body 5, and a linkage unit 5a to link a working device to a rear of the vehicle body 5. This configuration makes it possible to provide a working vehicle 1 which achieves about the foregoing superior effects.

A protection mechanism 9 for a working vehicle 1 includes a roof 16 provided above an operator's seat 10, a plurality of routing stays 152 provided on a peripheral portion of the roof 16, and a cable 150 routed on the routing stays 152. This configuration makes it possible to easily route the cable 150 along the peripheral portion of the roof 16.

The plurality of routing stays 152 include an attachment portion 153a (154a) attached to the peripheral portion of the roof 16, and a placement portion 153b (154b) which extends from the attachment portion 153a (154a) and which is for placement of the cable 150. This configuration makes it possible to more easily route the cable 150 along the peripheral portion of the roof 16.

The plurality of routing stays 152 include an upright portion 153c (154c) which extends upward from the opposite side of the placement portion 153*b* (154*b*) from the attachment portion 153*a* (154*a*). This configuration makes it possible to prevent the cable 150 from falling off the placement portion 153*b* (154*b*).

The plurality of routing stays 152 have a drain portion which passes through the routing stay 152 substantially along a top-bottom direction and which allows passage of rainwater flowing downward from above. This configuration makes it possible to eliminate or reduce the likelihood that rainwater will stay on the routing stay 152.

The protection mechanism 9 for a working vehicle 1 includes a plurality of electric devices 36 which are disposed on the peripheral portion of the roof 16 and which are disposed facing in respective different directions, wherein the cable 150 is connected to the electric devices 36. This configuration makes it possible to easily route a harness for the plurality of electric devices 36 disposed facing in respective different directions.

The plurality of routing stays 152 are disposed inward and downward of an outer periphery of an upper surface of the roof 16, and the cable 150 is routed inward and downward of the outer periphery of the upper surface of the roof 16. This configuration makes it possible to prevent or reduce the exposure of the cable 150 to wind and rain.

The roof 16 includes a filter 155 detachably provided on a lower side of the peripheral portion of the roof 16, and a vent 156 through which outside air is introduced through the filter 155, the plurality of routing stays 152 are disposed below an area inward of the outer periphery of the upper surface of the roof 16 and are disposed between the roof 16 and the filter 155, and the cable 150 is routed below the area inward of the outer periphery of the upper surface of the roof 16 and is routed between the roof 16 and the filter 155 With this configuration, the cable 150 does not interfere with the filter 155 when the filter 155 is attached or detached, making it possible to achieve simple routing of the cable 150 while ensuring maintainability.

A working vehicle 1 includes the protection mechanism 9, a vehicle body 5, and a linkage unit 5*a* to link a working device to a rear of the vehicle body 5. This configuration makes it possible to provide a working vehicle 1 which achieves the foregoing superior effects.

A protection mechanism 9 for a working vehicle 1 includes a roof which covers an operator's seat 10 from an upper side, a monitoring device 36 to monitor an area rearward of a vehicle body 5, pillars 45 which extend upward from the vehicle body 5, a support frame 49 which connects upper portions of the pillars 45 and which supports the roof 16, a first bracket 111 which extends rearward from a rear of the protection mechanism 9, a second bracket 112 which extends rearward from the rear of the protection mechanism 9 and which differs from the first bracket 111, and a connection stay 113 which bridges the first bracket 111 and the second bracket 112, connects the first bracket 111 and the second bracket 112, and supports the monitoring device 36. With this configuration, the working vehicle 1 makes it possible to firmly support the monitoring device 36 on the vehicle body 5 via the protection mechanism 9 while improving the maintainability of the monitoring device 36.

The first bracket 111 extends rearward of the support frame 49 from one of opposite end portions of the support frame 49 in a vehicle-body-width direction B3, the second bracket 112 extends rearward of the support frame 49 from the other of the opposite end portions of the support frame 49 in the vehicle-body-width direction B3, and the connection stay 113 bridges the first bracket 111 and the second bracket 112, connects the first bracket 111 and the second bracket 112, and supports the monitoring device 36 at a position rearward of the support frame 49. With this configuration, the working vehicle 1 makes it possible to more firmly fix the monitoring device 36 to the vehicle body 5 via the support frame 49.

The pillars 45 include a pair of rear pillars 48 which are spaced apart from each other along the vehicle-body-width direction B3 and which extend upward from the vehicle body 5, the first bracket 111 extends rearward from one of the pair of rear pillars 48 which are arranged along the vehicle-body-width direction B3 from the one of the pair of rear pillars 48, the second bracket 112 extends rearward from the other of the pair of rear pillars 48 which are arranged along the vehicle-body-width direction B3 from the other of the pair of rear pillars 48, and the connection stay 113 bridges the first bracket 111 and the second bracket 112, connects the first bracket 111 and the second bracket 112, and supports the monitoring device 36 at a position rearward of the pair of rear pillars 48. With this configuration, the working vehicle 1 makes it possible to more firmly support the monitoring device 36 on the vehicle body 5 via the rear pillars 48.

The monitoring device 36 includes an obstacle detector 38 to detect an obstacle and/or a camera unit 39 to capture an image of surroundings of the vehicle body 5, and the connection stay 113 supports the monitoring device 36 in a middle portion thereof in the vehicle-body-width direction B3. With this configuration, since the monitoring device 36 is disposed in the middle portion in the vehicle-body-width direction B3, it is possible to reduce the difference in detection accuracy of the obstacle detector 38 and/or camera unit 39 between opposite areas in the vehicle-body-width direction B3.

The roof 16 has a cutout 90 in an upper surface thereof, the monitoring device 36 is disposed in the cutout 90, and at least a portion of the monitoring device 36 is located higher than the upper surface of the roof 16. With this configuration, since the monitoring device 36 is located higher than the upper surface of the roof 16, the monitoring device 36 is capable of monitoring an area rearward of the vehicle body 5 from a higher position.

A working vehicle 1 includes a connection stay 113 which bridges a first bracket 111 and a second bracket 112, connects the first bracket 111 and the second bracket 112, and supports a rear portion of a roof 16 from an outer rear side of the roof 16. With this configuration, the connection stay 113 supports the roof 16 separately from and in addition to supporting of the roof 16 by the support frame 49. This makes it possible to more firmly support the roof 16 on the vehicle body 5.

The connection stay 113 includes a pair of support brackets which support opposite end portions in a vehicle-body-width direction B3 of the rear portion of the roof 16. This configuration makes it possible to firmly support the roof 16 on the vehicle body 5 against a force to cause the roof 16 to swing in the vehicle-body-width direction B3.

The working vehicle 1 includes one or more illuminating lamps 81 to illuminate an area rearward of the vehicle body 5, and one or more light supporting portions 120 (121) which support the one or more illuminating lamps 81 and which are connected to at least one of the first and second brackets 111 and 112. With this configuration, since the first bracket 111 and/or the second bracket 112 also function(s) to support the light supporting portion(s) 120 and/or 121, it is possible to support the illuminating lamp(s) 81 with a smaller parts count.

The working vehicle 1 includes an antenna 115 which externally transmits and/or receives a signal and which is supported by the connection stay 113. With this configuration, since the connection stay 113 also supports the antenna 115, it is possible to support the antenna 15 with a smaller parts count.

A working vehicle 1 includes the protection mechanism 9, a vehicle body 5, and a linkage unit 5a to link a working device to a rear of the vehicle body 5. This configuration makes it possible to provide a working vehicle 1 which achieves the foregoing superior effects.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A protection mechanism for a working vehicle, the protection mechanism comprising:
   a roof provided above an operator's seat;
   a pillar which extends upward from a vehicle body and which supports the roof;
   a camera with a predetermined viewing direction; and
   a support stay which is connected to the pillar, orients the predetermined viewing direction of the camera sideways, and supports the camera below a peripheral portion of the roof and inward of the peripheral portion of the roof in a vehicle-width direction of the working vehicle.

2. A protection mechanism for a working vehicle, the protection mechanism comprising:
   a roof provided above an operator's seat;
   a pillar which extends upward from a vehicle body and which supports the roof;
   a camera with a predetermined viewing direction;
   a support stay which is connected to the pillar, orients the predetermined viewing direction of the camera sideways, and supports the camera below a peripheral portion of the roof; and
   a plurality of the pillars including a front pillar which supports a front portion of the roof and a rear pillar which supports a rear portion of the roof; wherein the support stay is connected to the rear pillar.

3. A protection mechanism for a working vehicle, the protection mechanism comprising:
   a roof provided above an operator's seat;
   a pillar which extends upward from a vehicle body and which supports the roof;
   a camera with a predetermined viewing direction;
   a support stay which is connected to the pillar, orients the predetermined viewing direction of the camera sideways, and supports the camera below a peripheral portion of the roof; and
   a plurality of the pillars including a front pillar which supports a front portion of the roof, a rear pillar which supports a rear portion of the roof, and an intermediate pillar which is located between the front pillar and the rear pillar and which supports the roof; wherein the support stay is connected to the intermediate pillar.

4. The protection mechanism according to claim 1, further comprising:
   a plurality of the pillars; and
   a support frame which connects the plurality of the pillars, defines an opening together with the vehicle body and the plurality of the pillars, and supports the roof; wherein
   the support stay extends from one of the plurality of the pillars to an area above the opening and supports the camera above the opening.

5. The protection mechanism according to claim 2, further comprising:
   a support frame which connects the plurality of the pillars, defines an opening together with the vehicle body and the plurality of the pillars, and which supports the roof; wherein
   the support stay extends from one of the plurality of the pillars to an area above the opening and supports the camera above the opening.

6. The protection mechanism according to claim 3, further comprising:
   a support frame which connects the plurality of the pillars, defines an opening together with the vehicle body and the plurality of the pillars, and which supports the roof; wherein
   the support stay extends from one of the plurality of the pillars to an area above the opening and supports the camera above the opening.

7. The protection mechanism according to claim 4, further comprising:
   an entry/exit door to open and close the opening; wherein the support stay extends outside a range of opening/closing movement of the entry/exit door.

8. The protection mechanism according to claim 5, further comprising:
   an entry/exit door to open and close the opening; wherein the support stay extends outside a range of opening/closing movement of the entry/exit door.

9. The protection mechanism according to claim 6, further comprising:
   an entry/exit door to open and close the opening; wherein the support stay extends outside a range of opening/closing movement of the entry/exit door.

10. A protection mechanism for a working vehicle, the protection mechanism comprising:
    a roof provided above an operator's seat;
    a pillar which extends upward from a vehicle body and which supports the roof;
    a camera with a predetermined viewing direction; and
    a support stay which is connected to the pillar, orients the predetermined viewing direction of the camera sideways, and supports the camera below a peripheral portion of the roof; wherein
    the support stay includes a guide to route a transmission line from the pillar to the roof.

11. The protection mechanism according to claim 2, wherein the support stay includes a guide to route a transmission line from at least one of the plurality of the pillars to the roof.

12. The protection mechanism according to claim 3, wherein the support stay includes a guide to route a transmission line from at least one of the plurality of the pillars to the roof.

13. The protection mechanism according to claim 4, wherein the support stay includes a guide to route a transmission line from at least one of the plurality of the pillars to the roof.

14. The protection mechanism according to claim 5, wherein the support stay includes a guide to route a transmission line from at least one of the plurality of the pillars to the roof.

15. The protection mechanism according to claim 6, wherein the support stay includes a guide to route a transmission line from at least one of the plurality of the pillars to the roof.

16. The protection mechanism according to claim 7, wherein the support stay includes a guide to route a transmission line from at least one of the plurality of the pillars to the roof.

17. The protection mechanism according to claim 8, wherein the support stay includes a guide to route a transmission line from at least one of the plurality of the pillars to the roof.

18. The protection mechanism according to claim 10, wherein
  the support stay includes:
    a fixed portion which is fixed to the pillar;
    an intermediate portion which extends from the fixed portion toward the roof; and
    a supporting portion which is provided on the intermediate portion and which supports the camera; and
  the guide includes:
    a first guide portion which is attached to the intermediate portion and which routes the transmission line along the intermediate portion; and
    a second guide portion which is attached to the supporting portion and which routes the transmission line.

19. The protection mechanism according to claim 1, further comprising:
  a cover which is attached to the pillar, routes a transmission line on the pillar, and covers the transmission line; wherein
  the transmission line is routed to the roof along the cover and the support stay.

20. A working vehicle comprising:
  the protection mechanism according to claim 1;
  the vehicle body; and
  a linkage to link a working device to a rear of the vehicle body.

* * * * *